US00RE46299E

(19) United States
(12) Reissued Patent
Fontana et al.

(10) Patent Number: US RE46,299 E
(45) Date of Reissued Patent: Feb. 7, 2017

(54) FRICTION PADS FOR USE WITH A GRIPPING AND/OR CLIMBING DEVICE

(75) Inventors: Richard Fontana, Cape Elizabeth, ME (US); David Reinfeld, Englewood, NJ (US)

(73) Assignee: DMR HOLDING GROUP LLC, New York, NY (US)

(21) Appl. No.: 13/494,580

(22) Filed: Jun. 12, 2012

Related U.S. Patent Documents

Reissue of:
(64) Patent No.: 7,793,911
Issued: Sep. 14, 2010
Appl. No.: 10/969,272
Filed: Oct. 20, 2004

U.S. Applications:
(62) Division of application No. 10/142,738, filed on May 9, 2002, now Pat. No. 7,823,845.

(51) Int. Cl.
*A47F 5/00* (2006.01)
*E04G 21/32* (2006.01)

(52) U.S. Cl.
CPC ..... *E04G 21/32* (2013.01)

(58) Field of Classification Search
None
See application file for complete search history.

(56) References Cited

U.S. PATENT DOCUMENTS

| | | | | | |
|---|---|---|---|---|---|
| 2,974,931 | A * | 3/1961 | Reel et al. | 410/128 |
| 3,110,506 | A * | 11/1963 | O'Brien | 410/151 |
| 4,765,574 | A * | 8/1988 | Thomas | 248/694 |
| 5,351,710 | A * | 10/1994 | Phillips | 137/223 |
| 5,472,301 | A * | 12/1995 | Wallen | 410/151 |
| 5,657,972 | A * | 8/1997 | Blatt | 269/22 |
| 5,769,293 | A * | 6/1998 | Zaretsky | 224/551 |
| 5,795,001 | A * | 8/1998 | Burke | 294/64.1 |
| 5,810,333 | A * | 9/1998 | Hickerson et al. | 254/93 R |
| 5,963,992 | A * | 10/1999 | Bonner | 4/246.1 |
| 6,101,702 | A * | 8/2000 | Claycomb et al. | 29/426.4 |
| 6,210,090 | B1 * | 4/2001 | Wyse | 410/151 |
| 6,619,922 | B2 * | 9/2003 | Illingworth et al. | 416/185 |
| 6,851,652 | B1 * | 2/2005 | Huang | 248/200.1 |
| 2001/0037579 | A1 * | 11/2001 | Akers | 33/286 |

* cited by examiner

*Primary Examiner* — Steven Marsh
(74) *Attorney, Agent, or Firm* — Kelley Drye & Warren LLP

(57) ABSTRACT

The present invention is a novel device for climbing inside corners, outside corners, and a variety of surfaces. The technology presented herein relies on high friction materials, suction devices, adhesive materials, pneumatic devices, etc. Specifically, embodiments of the present invention are designed to clamp onto inside or outside corners such that the devices weight, and an optional load, can be supported. Further embodiments allow the device to climb up, down, and across corners. Moreover, embodiments that can scale flat, rough, or jagged surfaces are also disclosed.

23 Claims, 80 Drawing Sheets

104
307
108
102
111
106
101
105
103
100
107
309
312

5711
5713
5712
5710
5802
5709
5804
5801
5708
5721
5719
5720
5715
5901

5711
5713
5712
5710
5802
5709
5708
5804
5801
5721
5719
5720
5715
6101

FRICTION PADS FOR USE WITH A GRIPPING AND/OR CLIMBING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a Reissue based on U.S. Pat. No. 7,793,911, which matured from application Ser. No. 10/969,272, filed Oct. 20, 2004, which is a divisional of U.S. patent application Ser. No. 10/142,738, filed on May 9, 2002, now U.S. Pat. No. 7,823,845.*

FIELD OF THE INVENTION

The present invention relates to friction pads for use with a gripping and/or climbing device. The device may be either manually operated or robotically controlled. In particular, it is adaptable for climbing and/or gripping both inside corners and outside corners containing a wide range of adjoining wall angles.

BACKGROUND OF THE INVENTION

Using friction to clamp or climb between two parallel or substantially parallel surfaces is well known in various arts. However, the prior art is devoid of clamping or climbing devices that are capable of clamping or climbing planes that are not parallel or substantially parallel.

Climbing requires two basic capabilities: (1) the ability to achieve (and generally, but not necessarily, release) grip and (2) the ability to move. The latter of these requires the ability to lift and/or lower a person or object so that progress can be made in a desired direction. In addition, extended climbing and/or station-keeping requires some means of maintaining stability so that the person or object can maintain proper contact position and direction for extended climbing distances and periods of time.

Humans have always had the ability to climb certain surfaces without the aid of technology. For example, we can climb trees and cliffs as long as there are surfaces that afford a grip which can be used to support weight.

Technological advances have, however, greatly extended the range of climbable surfaces. For example, rock climbers can scale steep surfaces using high friction shoes while utilizing variations in the surface shape to enhance traction. With devices such as these, even extremely steep or overhanging (or inverted) surfaces can be climbed if there are pits, holes, edges, or cracks that can be gripped for traction. Other technological advances which have increased the types of surfaces we can climb or grip include mechanical jamming devices, pitons, bolts for climbing rock, belts for climbing poles, and the like.

However, these devices all have drawbacks. Mechanical jamming devices require a crack with nearly parallel walls to hold securely. Belts used for climbing poles require a way to reach around the pole, and their use is limited to objects with a relatively small diameter, such as trees or telephone poles. Pitons and bolts damage the surfaces on which they are applied and their use is often accompanied by a time consuming or noisy installation process. The various adhesive systems developed to date leave residue and/or damage the surface.

One of the most significant drawbacks of several of the previously-disclosed systems is that they require two parallel or nearly parallel surfaces. These systems do not achieve high friction coefficients and do not use geometric configurations suited to large-angle gripping. The minimum friction coefficient required to maintain an unloaded grip between walls is defined by the tangent of half of the angle between the walls. This minimum value is not adequate to support an object since it provides no capacity to hold a force other than the clamping force that acts directly between the pads. In practice, a high friction coefficient must be achieved to provide a secure grip capable of supporting objects for gripping and/or climbing purposes. In addition, the geometry of the device must accommodate the non-parallel walls.

Using the tangential relationship for the minimum friction requirement and assuming a reasonably high friction coefficient for metal on rock of 0.3 to 0.5, the maximum angle between walls is about 30 to 55 degrees respectively (not including the reduction in angle required to perform any useful function). These angles, however, are far from the 90-degree angle of typical corners. The designs used in the prior art are not suited to angles of 30 degrees or more between walls. The present invention is.

In practice, the angle required to produce sufficient grip based on the prior art is much less than 30 degrees. Thus, it is generally acknowledged that the walls of a crack must be nearly parallel to provide a secure anchor. The inability of the prior art to accommodate an angle of more than 30 degrees is due to both the choice of materials that do not achieve a high coefficient of friction and designs that cannot accommodate non-parallel geometries well. To achieve a useful grip on surfaces at angles on the order of 90 degrees, a geometry that can accommodate such angles and a friction coefficient that is greater than one (1) are required. The use of high friction materials and the ability to grip surfaces at angles substantially near 90 degrees to each other has not been previously illustrated in the prior art.

Previously-disclosed climbing systems generally fall into two categories: those which can be used to climb natural objects (such as mountains, cliffs, caves and rocks) and those which can be used to climb man-made objects (such as buildings, scaffolding, towers and poles).

Many clamping and climbing devices have been devised for climbing on rock. Many are designed to grip by applying a force between nearly parallel adjacent surfaces (cracks) in rock. Small blocks, wedges, rods, and chocks have been jammed in cracks and used to secure ropes for climbing protection and securing or hauling loads. The rod-jamming system in Bohn, U.S. Pat. No. 5,934,635 (hereinafter "the '635 patent") and specially-shaped block devices such as Prohaska, Austrian Pat. No. 395945B (hereinafter "the '945B patent") are examples. However, they are limited in use to jamming in cracks in which the walls of the crack are nearly parallel.

The '635 patent discloses a self-adjusting rock climber anchor device which includes at least one variable length compression arm. The apparatus is formed of two or more arms used to affix the device in a crevice containing parallel or nearly parallel walls. After the device has been affixed in a wedge position in a crevice, a climber may attach a rope to the apparatus for use in ascending and descending the rock face. Such a device is only useful for ascending surfaces containing crevices with nearly parallel walls, such as a mountainside. It is generally not capable of ascending smooth surfaces and/or inside and outside corners where the angle formed by the adjoining walls is approximately ninety degrees The '945B patent discloses a climbing wedge capable of insertion into rock cracks. The wedge is formed of convexly formed strips arranged in a direction from its end remote from the load to its end closer to the load. The device is placed into a rock crack by jamming it into the crack until the wedge is firmly secured. Frictional forces hold the apparatus securely in the rock crack. A rope or other such device may then be affixed to the climbing wedge to support an object or enable a climber to ascend and descend the rock face or other such surface. This device is useful for climbing surfaces containing small cracks in which the climbing wedge can be placed. To utilize this device for climbing, the walls of the cracks must also be parallel or substantially parallel, otherwise the device cannot sustain a gripping force capable of supporting heavy objects. The apparatus is not useful for ascending smooth surfaces and/or surfaces containing inside/outside corners angled at approximately ninety degrees.

Lowe U.S. Pat. No. 3,877,679 (hereinafter "the '679 patent") describes a device based on a cam that is used in similar cracks. Lowe discloses a chock stone device containing a cam used to wedge the main body of the device between opposed pairs of tapered walls (i.e., walls which are parallel or substantially parallel). The device is used by inserting the main body into a crevice and actuating the cam device, thereby causing the upper part of the main body to expand, thereby securing the device between the tapered walls. Objects can then be supported by the device by attaching them to the main body of the apparatus. For example, a climber may attach a rope to the device and use it to ascend a cliff face. This device is only useful for climbing surfaces containing crevices with parallel or nearly parallel surfaces. The apparatus also mars the climbing surface, since the upper portion of the main body contains saw-like teeth used to help secure the device in position. This apparatus is not capable of helping a climber ascend smooth surfaces and/or surfaces in which the tapered walls are not substantially parallel.

There have been many related inventions to the '679 patent, such as: Lowe U.S. Pat. No. 4,645,149 (hereinafter "the '149 patent"), Brodie U.S. Pat. No. 4,712,754 (hereinafter "the '754 patent"), Christianson U.S. Pat. No. 4,643,377 (hereinafter "the '377 patent") and Taylor U.S. Pat. No. 4,575,032 (hereinafter "the '032 patent"). These cam devices were developed to provide a wider range of crack size accommodation, easier placement and removal, and more security in parallel cracks than previous wedging systems.

The '149 patent describes a camming device that is useful in climbing surfaces containing natural or man-made openings therein and into which a camming device may be inserted to facilitate climbing. The camming device is comprised of cam members containing a serrated arcuate (arm positioned adjacent to a support arm. To utilize the device, the serrated portion is first inserted into the crevice. Next, the support arm is moved to a position perpendicular to the arcuate arm. This causes the serrated portion of the camming device to expand and lock the device into the crevice. The cam device is removed by moving the support arm back to its original position and sliding the device out of the crevice. Since the camming device utilizes a serrated edge, it is only useful in applications in which the surface may be marred. In addition, such a device is not adaptable for climbing smooth surfaces and/or surfaces containing inside and outside corners positioned at approximately ninety degrees.

The '754 patent describes an anchoring device for releasably anchoring within a crack within a rock face, the crack having parallel or substantially parallel walls. The device contains a cam member, a load cable, and an expansion and retraction structure. The cam member has a convexly curved surface. The device is utilized by inserting the cam member into the crack within the rock face and actuating the expansion structure which causes the cam portion of the device to grip the opposing walls of the crack. An object may then be attached to the anchoring device via the load cable. To remove the device from the rock crack, the retraction structure is used to release the cam device so it can be removed from the crack. The geometry of this device allows it to be used to anchor in surfaces containing cracks having parallel or substantially parallel walls. The device is not useful for climbing surfaces having inside/outside corners.

The '377 patent discloses an improved climbing aid formed of one or more pair of opposing cam members, two or more parallel axles on which the cam members may pivot, and a looped cable member connected to the main body of the device to which a load may be attached. To expand and retract the cam members, the device also incorporates spring members which act to simultaneously move the cam members toward an expanded position and an operating member connected to each cam member used to retract the cams. The device is used by inserting the cam member portion of the device into a crack containing parallel or substantially parallel walls and actuating the spring members, thereby causing the opposed cams to expand and affix the device in the crack. A load may then be supported by the device by attaching it to the looped cable member. The device can later be removed from the crack by using the operating member to retract the cams. This device is limited to use on surfaces containing cracks and is not applicable to surfaces containing inside corners and outside corners in which the adjoining walls are not parallel or substantially parallel.

The '032 patent describes an apparatus composed of three (3) opposed cams containing teeth on their outer surface. The cams are attached to a shaft and spring loaded to rotate to their widest point of separation. A pull rod is slideably located within a slot in the handle portion of the device. When the pull rod is manually retracted, it forces the cams to also retract. The device can then be placed inside a crack. When the pull rod is released, the cams return to the open position and grip the internal surface of the crack in a chock-like manner. Similar to the previously described prior art, this device aides in climbing surfaces with natural or man-made cracks, but it cannot be utilized to climb surfaces which are not and must not be marred or surfaces containing inside/outside corners arranged at an angle of approximately ninety degrees.

There are also several systems based on multiple sliding wedges and/or rollers such as Byrne EPO Pat. No. 0323391 (hereinafter "the '391 patent"), Frechin French Pat. No. 2553668 (hereinafter "the '668 patent"), and Guthrie et al. U.S. Pat. No. 4,643,378 (hereinafter "the '378 patent").

The '391 patent depicts a self adjusting climbing chock formed of a looped end and first and second cable end sections. A fixed wedge element and a translating wedge element are attached to the cable end sections. The translating wedge element is normally held in a retracted position by a spring. To utilize the apparatus to climb, the chock portion of the device is inserted into a crack and weight is placed on the looped end, causing a spring to expand and the translating wedge element to move away from the fixed wedge element, thereby causing the wedge elements to press against the walls of the crack and support the weight placed on the looped end of the apparatus. The device may be disengaged from the crack by removing the force placed on the looped end of the device. The translating wedge element will then return to its contracted position, allowing the device to be removed from the crack. This device is capable of aiding a climber only on surfaces containing cracks with parallel or substantially parallel walls. This patent does not disclose any method or apparatus of climbing surfaces formed from either inside or outside corners in which the walls meet at approximately a ninety-degree angle.

The '668 patent depicts a nut composed of two adjacent half-wedges. The wedges are joined together by a cable. The wedges can be rotated relative to each other to achieve different wedge geometries. A ring clasp on the rope connecting the two half-wedge can then be used to immobilize the wedges from moving relative to one another. The device can then be inserted into cracks of various sizes by forcing the configured wedge into a crack so that it does not easily slide out. The rope attached to the nut can then be used to aid in climbing a rock wall or other such surface with cracks. However, this device is not capable of aiding a climber in ascending inside or outside corners arranged at an approximate angle of ninety degrees because the wedges, as disclosed, are not designed for use in such a geometry.

The '378 patent discloses a roller-chock climbing aid composed of a wedge shaped chock, a roller, a spring, and a release cable. The wedge shaped chock and roller are arranged next to each other and connected by said spring. When the release cable is pulled downward by a climber's weight, the roller chock moves away from the wedge shaped chock and affixes the apparatus in a crack in a similar manner to the device disclosed by Byrne. To remove the device from a crack, the applied force must be taken off the release cable. The spring connecting the roller to the wedge shaped chock returns the device to its original position, allowing it to easily be removed from the crack. As disclosed, this apparatus is not capable of ascending adjacent corners formed from walls adjoined at approximately a ninety-degree angle.

These multiple wedge devices were developed to achieve the advantages of the cam systems in ease of use and security in application to very small cracks that are too small for a cam design to work. All of these devices have proven useful when properly used in suitable cracks with parallel or nearly parallel faces. They are used to secure safety ropes of people climbing as well as supporting people, temporary shelters, equipment and the like during expeditions. Crack jamming devices have been developed to span a very wide range of crack sizes, yet all of these devices are limited in use to cracks in nearly parallel walls. These devices are useless when the surfaces containing the cracks are not substantially parallel.

In addition to the previously-noted devices for holding in cracks, hooks and other hook-like devices have been used to grip external features projecting from walls. These hooks, however, are severely limited in their application to surfaces that are nearly perpendicular to the direction of the applied force, such as ledges.

Although high friction shoes are commonly used in rock climbing, none of these devices can grip surfaces that are not nearly parallel in nature and none are designed to hold on outside or inside corners that approach right angles.

Drilling and bolting to a rock surface is a means of providing secure attachment to a single surface. Most applications of drilling and bolting are used in rock climbing to leave fixed brackets for mounting protective equipment while climbing. One disadvantage of this approach is that a large supply of components is required since the bolts are left in the wall.

For example, Checkett, PCT App. No. PCT/GB97/00620 (hereinafter "the '620 application") describes a removable and replaceable bolt, which allows the bolt to be removed, but this still requires drilling a hole before placement of the bolt and leaves a hole after removal. Although bolting allows a grip to be achieved on most thick, strong and drillable surfaces, and can thus be used on most rock and many building surfaces, there are many serious drawbacks to the technique. Drilling rock is time consuming, noisy, and requires a lot of power. The hole mars and weakens the rock or building surface. The pressure generated by bolting is also very high, so that the surface must be of a relatively high strength material to hold the bolt when loaded. Thus, drilling and bolting is not a suitable means of clamping when minimizing weight, time, noise, surface damage, and/or power is of value or when speed, stealth, reusability, and/or the ability to leave no trace is required.

Clamping and climbing devices have also been developed for man-made structures. Many skyscrapers and large structures have tracks or other features built into them to aid with building and window washing. Special climbing devices made to fit specific features of specific buildings have also been developed. None of these approaches are suited to general use because they rely on specific features of each building that are not common on most structures or natural surfaces.

Scaffolding is commonly used to overcome the limitations on available building surface climbing and holding technology. Many climbing and clamping systems have been developed for scaffolding, so instead of attempting to climb the building directly, the scaffolding is climbed. Scaffold climbing devices, typified by inventions such as Swager U.S. Pat. No. 3,933,220 (hereinafter "the '220 patent"), Lewis U.S. Pat. No. 4,368,801 (hereinafter "the '801 patent"), and Fullam et al. U.S. Pat. No. 5,806,628 (hereinafter "the 628 patent") are very specific to the features of the scaffolding. All rely on the basic concept of reaching around or inside a consistent feature of the scaffold structure to provide a secure clamp.

The '220 patent discloses a safety clamping device for use by climbers mounted in an elongated slot in a support rail. The clamping device and the support rail contain wedges configured such that the two sets of wedges interlock. The safety clamping device contains a trigger arm which allows the wedges of the clamping device to be disengaged from the wedges of the support rail. The climber can then slide the clamping device to a new position to aid in ascending or descending the structure to which the support rail is attached. This device is only applicable to geometries containing some type of support rail containing wedges and is not useful for ascending or descending natural phenomenon containing an unstructured geometry. This device is additionally not suited for climbing inside or outside corners, even if the adjoining walls are substantially parallel.

The '801 patent depicts a column climbing device for climbing columns such as girders having flanges. The device is designed to be worn on the feet of a climber and is equipped with a gripping member having spaced apart jaws adapted to grip a column flange. The gripping member on each foot is mounted for selective swinging between two positions. In one position, the jaws of the gripping member extend in the direction of the climber's toes. In the retracted position, the jaws extend laterally outwardly and behind the heel of the climber's foot so as to be out of the way when not used in climbing. This apparatus is useful for ascending highly organized, man-made surfaces. It is not designed for use in climbing any other surface geometry.

The '628 patent describes a climbing device for attaching to building frames having a pair of jaw members movable with respect to the other. The spacing between the jaw members may be adjusted using a lever device to permit a user to detachably affix the device to the frame of the building. The climbing device additionally contains a foothold and a harness to support a user. Similar to the apparatus disclosed by Lewis, this apparatus is useful for ascending highly organized, man-made surfaces. It is not useful for climbing surface geometries onto which the jaw members cannot grip All of these prior art devices are designed so that a component of the normal force (the force perpendicular to the contacting surfaces) provides a net force that at least partially assists with retaining the device. Although there are some towers with scaffold-like construction, clearly most natural and building structures do not have features that can be grasped in the manner used by scaffold gripping systems; if they were, there would be no need for the scaffold.

There are also many clamping/climbing devices for climbing poles and trees. Johnson U.S. Pat. No. 6,264,000 B1 (hereinafter "the '000 patent") and Brust WO Pat. No. 59,682 (hereinafter "the '682 patent") describe clamp systems based on encircling a tree or pole with a belt or rope.

The '000 patent discloses a tree stand and climbing apparatus. The device utilizes a plurality of belts which may be flexible in nature and/or contain teeth. The belts are looped around the tree in a U-shaped manner and attached to a person's body or stand. A person may utilize such a device to climb a tree/pole by alternately moving the belt and the climber's feet up the tree, which results in the overall upward motion of the climber. The climber may also descend the tree/pole in a similar fashion. This invention is useful for attaching a stand to a tree or pole or climbing such an object. However, the object cannot be used to ascend any surface which the belt cannot encompass, such as the corner of a building or a rock face.

The '682 patent discloses a fall prevention device which may also be used for climbing pole shaped objects. The device utilizes a rope or other such object which is wrapped around the pole. On the side of the pole where the ends of the rope meet, the ends are fed through a connecting element. The ends of the rope are then looped back around the post structure along their original path. Each end of the rope is affixed with an attachment structure, such as a loop or clip. A climber utilizes this device for safety by attaching the ends of the rope to some structure located on the climber's body. The force that a climber's weight exerts on the rope during a fall causes the rope to tighten around the pole, thereby preventing the fall. The device may also be used for climbing a pole type structure by relieving the tension from the belt, moving the belt up the pole, and then re-tensioning the belt. In this manner, a climber may either ascend or descend a pole type structure. However, as is the case with other belt devices, this invention is only useful as a fall prevention device on pole type structures and is not readily applicable to other geometries Andruchiw U.S. Pat. No. 4,527,660 (hereinafter "the '660 patent") and Swett U.S. Pat. No. 4,410,066 (hereinafter "the '066 patent") describe climbing systems based on similar techniques of reaching around a tree or pole combined with a stepwise climbing motion. In addition to reaching around the tree or pole with a belt, it is apparent that a relatively stiff structure such as a hook or closed U reaching part way around a tree or pole can work in a similar manner to a belt or rope.

The '660 patent discloses a pole climbing aid comprising a belt member attached to the waist of the climber as well as a hand grip member which is meant to aid in climbing and serve as an extra precautionary measure. The belt attached to the climber's body is used to climb the pole as is well known in the art. The hand grip member is an additional component of the device which is connected to the belt member via a connection means, such as a rope. The device may include any number of hand grips. As the climber ascends the pole, the hand grip device is disengaged from the pole and repositioned at a higher position on the pole. In this manner, a climber may descend a pole with this apparatus. This device may be used to climb any pole type structure which a belt may encompass and which a hand grip may be attached to. However, such a device may not be useful for ascending large diameter poles because the handgrip could not easily be attached to the pole's surface. The device is not adaptable for climbing most other geometries, such as the corners or surfaces of buildings.

The '066 patent discloses a tree stand apparatus which utilizes a U-shaped frame surrounding the tree to suspend the tree stand at the desired elevation. The device provides a covered frame, with openings in the top and bottom and means to securely close the openings. The tree stand may be fashioned from wood or any other similar lightweight and durable material. The entire frame may be elevated by a single operator. Such a device is only useful in geometries in which a U-shaped frame can encompass the entire object. No other means is disclosed to suspend the tree frame at the desired elevation.

A major disadvantage of such devices is that since they encircle all or most of the tree, they do not easily allow limbs to be passed. Like the scaffold climbing apparatus, none of the tree and pole climbing devices can be utilized for general climbing of common building features.

Ingro U.S. Pat. No. 3,810,515 (hereinafter "the '515 patent") describes a magnetic crawling device that utilizes magnetic forces to achieve traction to climb and maneuver on walls. Clearly, the requirement of magnetic walls is a severe limitation for many applications, since most walls are not surfaced in and/or made of magnetic material. Such magnetic climbers, in addition to severe limitations on what materials can be climbed, have numerous other problems such as attraction of debris due to the magnetic field and the relatively low forces that can be generated. Although they have application to specific situations, magnetic systems are severely limited and not suited to general use on the majority of surfaces. Ingo also describes use of suction power to achieve attractive force so that a ferrous wall is not required.

You U.S. Pat. No. 4,477,998 (hereinafter "the '998 patent") describes a system of suction cups on a belt for climbing on walls. The '998 patent describes a wall-climbing toy consisting of a belt drive mechanism with suction cups attached along the surface of the belt. To climb a wall, the toy is first affixed to the wall using the exposed suction cups attached to the belt drive mechanism. As the belt rotates, new suction cups are introduced to the wall surface as old suction cups are forcibly removed from the wall surface. In this manner, the toy may ascend or descend the wall. Such a device will only work on very smooth surfaces to which a suction cup will adhere. Additionally, the device must also be lightweight because the only force affixing the toy to the wall is provided by the suction cups. The device lacks the ability to ascend rough surfaces and the ability to navigate corners.

German Pat. No. 19727421A1 (hereinafter "the '421 patent") to Schmierer describes a similar tracked suction-cup climbing robot. The '421 patent discloses a wall-climbing apparatus also consisting of a belt drive mechanism with suction cups attached to the surface. The Schmierer device improves on the You device by pairing the suction cups on the belt. By doing so, this device can navigate bumpier surfaces because of the increased number of pads. It also has the capability to carry a larger weight load. However, the device also has the same limitations as other suction cup device. For example, the surface must be relatively smooth or the suction cups will not adhere. This device also cannot navigate corners or other such obstacles.

Winkler WO Pat. No. 37,728 (hereinafter "the '728 patent") describes a vacuum action climbing system based on suction modules that can be mounted to a user's hands and feet and driven by a vacuum-generating device to allow a person to climb the walls of buildings. The '728 patent discloses a backpack mounted vacuum system and fan shaped suction pads on hands and feet that would allow climbing of relatively smooth and walls and ceilings. All of theses devices require a wall with the proper characteristics for achieving traction. Due to the fact that atmospheric pressure is generally less than 14 psi, there are inherent limitations on the lifting capacity for a given size for any suction based device because adequate area is required to achieve a required force. If a wall is too rough or porous, the suction cups will not work. If the vacuum-generating device disclosed in the '728 patent is capable of achieving adequate suction on a rough surface, then it must continually pump air, requiring an impractical amount of power for climbing many building and natural surfaces. A device capable of producing suction force on rough surfaces efficiently would clearly be useful for clinging to surfaces, but still would not enable extremely long duration gripping, very high forces, or completely silent operation compared with mechanical based gripping systems. Incorporated by reference is co-pending App. No. 09/316,318 which discloses a vortex attractor capable of use in the present invention.

Crabbe British Pat. No. 2,131,475 (hereinafter "the '475 patent") describes roof top gripping and climbing appliances that utilize high friction material to achieve grip on slanted surfaces such as roofs. The '475 patent describes achieving a coefficient of friction greater than one in experiments. Crabbe achieved an effective coefficient of friction of 1.5 for gritty concrete using high friction surfaces made of foam materials. Required thicknesses suitable for several types of roofing are described. Gripping on roofs of steeper than 45-degree pitch was achieved only for a few specific surfaces and conditions. The invention of the '475 patent, although useful for roofs, has no use in scaling vertical surfaces and thus has no use in most climbing applications.

As stated above, each piece of prior art has its own particular disadvantages, but one of the most basic shortcomings of the prior art as a whole is that nothing disclosed therein is capable of climbing and/or gripping one of the most common surface features—inside and outside corners. Such corners are typically of relatively large opening angle. Often, surfaces meet at approximately 90 degrees in corners. The Applicant is unaware of any prior art which discloses a gripping and/or climbing device that is capable of clinging to and climbing a corner where the walls meet at approximately 90 degrees. The present invention accomplishes this.

Clearly what is needed in the art is a device for gripping and climbing corners utilizing the available adjacent surfaces. An invention that makes use of nearly universally available surface features, requires little power, makes little noise, does not damage the surface, and can be scaled up or down to accommodate a wide range of applications including small robots, humans, or large systems is an advancement of the art and is disclosed herein as the present invention.

SUMMARY OF THE INVENTION

The present invention is directed at an apparatus for clamping to and climbing surfaces. It utilizes high friction material acting on adjacent surfaces, such as corners between adjacent walls, to achieve grip. The invention is capable of achieving grip between surfaces at angles from approximately parallel or enclosed relative to the angle of force, as are many of the above inventions. However, unlike previous art, the present invention is able to grip surfaces that are not parallel or nearly parallel. The present invention is capable of gripping and climbing inside or outside corners where the walls meet at approximately right angles. It utilizes high friction materials or adhesives to develop grip. Depending on the achievable coefficient of friction, this invention is capable of gripping and scaling corners of walls and/or ceilings that meet at approximately right angles or even more adverse angles.

Most buildings have internal and external features, such as corners, arches, ceilings and the like, that have surfaces with normal components that intersect at approximately right angles. Thus, almost any building can be climbed inside or out with the present invention. The ability to grip and climb features such as inside (convex) and outside (concave) corners enables many tasks to be performed more quickly and/or at a lower cost than by using the available alternatives, which are typically limited to building a scaffold or using a lift or ladder. In many cases, such as military operations or surveillance, these options are frequently not available.

Objects that can be climbed with the present invention are not limited to corners. They include many types of surfaces and intersections of surfaces and curved surfaces. For example, a quarter pillar in a corner can be gripped and/or climbed using the present invention. Many natural objects also have climbable features. Many cliffs and trees have features that can be gripped with the present invention.

The present invention may be used alone or in conjunction with other mechanical or electrical systems. It has the functional ability to clamp, climb, lift, hold, suspend, jump or bounce. The general uses and additional examples described herein are accomplished by providing a gripping and/or climbing device capable of supporting loads in an inside or an outside corner geometry. Embodiments of the present invention generally include pads used for gripping inside and outside corners, wherein the pads are adjoined via a connection means. The pads may be of any shape to suit the particular geometry being climbed and/or gripped. For example the pads may be circular, round, inflatable, flexible, stiff, etc. The pads may additionally be suction cups or any other such device capable of gripping a surface. The connecting means may also be of any shape or size. For example, the connecting means may be formed of a telescopic pole containing a spring. Generally, the connecting means provides the grip force. It may even be part of the pads.

Materials of construction may vary depending upon the desired application. Materials may either be high friction, depending upon the desired application of the device. The body of the device may be composed of any suitable material. For climbing purposes, the material would more likely be lightweight; however, this is not a required condition. The pad material may be made of any high or low friction material; although there are some applications in which low friction pads might have applications, most applications described require high friction materials. The material may be flexible, so as to be compressible, compliant, inflatable or bendable, or it may be solid.

The material may be flexible, so as to be inflatable or bendable, or it may be solid.

In short, the present invention provides a general-purpose climbing and clamping tool that is (or can be designed to be) noiseless in operation, non-marking, non-damaging, fast, relatively insensitive to weather conditions, and is lightweight. The device may be employed for numerous purposes and has many military, commercial, industrial, household, recreational and entertainment-related uses.

Military

The present invention has many military applications. For example, it can be used to aid with mobility. Mobility applications include the ability to move personnel over natural terrain (such as cliffs and mountains) as well as man-made structures such as walls and buildings. On natural terrain such as cliffs, the invention allows rapid, silent, non-marking, and secure gripping and releasing of surface features for which no other capable technology currently exists. The present invention has advantages even where current devices which can grip parallel or nearly-parallel could also be used. Aside from the obvious advantage of not having to carry additional devices other than the invention for these parallel sided cracks, the invention provides a non-marking, low noise grip capability. When the crack does not have nearly-parallel sides, the existing technology of pitons or drilling and bolting are slow, noisy, and leave lasting evidence of use. By making use of common features otherwise of little use, the invention replaces many technologies and provides many advantages over existing technologies where either one can be used.

Thus, the present invention increases the range of terrain that can be accessed whether it is for maintaining position or climbing up, down, or across. It also reduces the amount of equipment that must be carried and allows rapid, covert deployment in terrain otherwise inaccessible.

On man-made environments, the present invention has all the advantages over existing technology as previously described for natural objects. An additional advantage is that most man-made obstacles such as fences, walls, and buildings are not suited to any other means of climbing. However, they are extremely well-suited to climbing using corner features which are inherent to most man made obstacles. The rapid, non-marring, and silent operation of the invention also provides substantial advantages in avoiding detection. Since the same equipment can be used for both natural and man-made terrain, there are additional advantages in logistics and ease of use. These advantages in mobility can be applied to both personnel and machines.

The present invention can also be used for surveillance. Surveillance applications include the ability to get in and out of a surveillance position using people and/or machines. The present invention is especially useful for maintaining or moving in and out of a position with a good vantage point. A camera, microphone, electronic listening or relay device, etc. can move along and/or be secured in suitable positions on cliffs, trees, buildings, etc. using the present invention. The silence and non-marring qualities can be augmented by camouflage to match the surrounding materials so that a good surveillance position can be obtained with low odds of detection.

The present invention can also be used to create various traps. Traps, whether for personnel or equipment, can be based on the present invention. For example, a system mounted in a corner could detect, verify the identity, and disable personnel or equipment. The corner-mounted system might activate other devices surrounding the target or track and paint the target for smart weapons launched or in standby mode. The corner-mounted system might utilize self-contained weapons, tear gas, nets, concussion bombs, skunk (odor) bombs, markers, or other devices. Thus, the present invention can be the basis for a trap and/or a trigger that can be covertly located in an unexpected place.

The present invention can also be used to create an element of surprise during covert operations where no such surprise was previously technologically possible. The present invention's ability to move silently and without marring the surface allows it to aid in a stealth mission or otherwise create an element of surprise. The present invention can move into and out of position without being detected, and it can often do so in plain sight since it is unlikely that anyone would look for the invention in the unexpected, often-inaccessible places it is able to reach. In addition to providing covert information which it could record from its position, the present invention can also be used to attack and/or distract using noise, weapons, gas, liquids, etc. Such as system could aid with causing confusion regarding the origin of an attacker, how an attack was performed or how information was received. Thus, the element of surprise provided by the invention can be used in many ways to achieve advantage over an enemy.

The present invention can also be used in electronic warfare. Existing electronic warfare systems are often very limited in range. The present invention's ability to move around on walls, buildings, cliffs, mountains, etc. quickly and silently would allow it to position and reposition an electronic warfare device to maintain its effectiveness even as a target moves.

The present invention can also be used for communication purposes. Rugged terrain is often a major range-limiting factor for communication systems, many of which rely on line-of-sight types of antennas. The present invention provides a means of rapidly deploying, optimizing and removing a cell phone-like system of antennas, repeaters, transmitters, etc. The invention would also allow light, laser, acoustic, or the physical passing of packages to be performed in a similarly convenient and covert manner.

The present invention can also be used for target marking. Using the technology of the invention, a device stationed in a corner can mark a target using any number of devices including laser markers or a marker delivered as a gas or projectile.

The present invention can also be used for target spotting. The surveillance capability provided allows targets to be seen from angles that, by being in unsuspected locations, may provide easier and more accurate identification and location of a target than were previously possible, because the present invention will allow spotting from previously unreachable locations.

The present invention can also be used for image recognition. Image recognition in a real environment has historically proven itself to be a difficult task. However, the performance of image recognition systems can be enhanced by providing advantageous and/or multiple lighting angles and viewpoints. Multiple lighting angles and viewpoints help to define the three dimensional positions of objects in a scene which allows the otherwise two dimensional patterns to be separated into definite objects. This in turn allows the size and shape of targets to be defined as patterns and recognized as associated with an image that is to be identified. Thus, two or more recognition systems working together could recognize a target much more quickly and reliably than a single system. The mobility of the present invention can create a potentially advantageous positioning capability and can be applied to image recognition based on light, acoustics, radar, etc. The use of light and/or acoustics out of the visible/hearable range provides the ability to perform image recognition in the dark.

Commercial

The present invention also has a number of commercial uses. For example, it can be used for building maintenance. Many building maintenance tasks, such as cleaning, window washing, painting, repair of caulking, etc. can be performed by one or a team of people or robots located at a corner. Maintenance workers can use a corner clamp to provide increased security on ladders or ropes, or replace these objects with corner climbers. Tasks which previously required scaffolding can also be performed using the present invention.

The present invention can also be used for building inspections. It can provide a means of gripping corners and climbing up, down or along corners to inspect buildings for damage, leaks, etc.

The present invention can also be used for window washing. Aside from alleviating the need for scaffolding, the present invention can also be used to clean windows that were previously almost unreachable. The Jacob Javits Center in New York City, for example, is a glass building with large glass atriums. The interior of the glass can be extremely difficult to clean due to an abundance of truss work on the inside. The present invention can be used to grip features on and around the glass to enable cleaning by a robot or human with less effort that would be required by the use of ropes or scaffolding. The ability to grip the corner between the glass and the frame provides a simple and consistent location for a climbing system. A cleaning system based on such a simple and consistent interface has many advantages over a robot based on holding the truss work, which may vary in position relative to the glass and other structures. For example, the supporting trusses typically are at angles to the glass surfaces so that the spacing between the truss and the glass varies over a wide range. In contrast, the window frame is always adjacent to the window. A robot that grips between the window and window frame can be smaller and simpler than a robot that must deal with the wide variations in spacing and angles associated with a truss structure and its position relative to the glass.

The present invention can also be used for roofing and siding. The corner gripping technology of the present invention can provide convenient and secure safety systems for roofers. A peak grip that will not damage the surface is easy to move and lightweight could prevent many deaths and injuries resulting from the performance of this hazardous activity. The high friction pads developed for use with the present invention could also enhance the safety of shoes and braces currently used in applying roofing and siding.

The present invention can also be used to solve a plethora of other general construction needs. Occasions arise in general construction where clamping materials at a corner (plywood sheathing, etc.) would be useful. A general-purpose clamp that can clamp parallel and at angles and even a mitering fixture which does angle setting and clamping can be developed using the corner clamp technology. For example, two pieces to be mitered at a 90 degree angle can be clamped by pads fixed at a 90 degree angle. The clamp based on the present invention can be located entirely inside or entirely outside the corner formed by such a miter. Existing miter clamps are relatively large and complex since they must clamp from both inside and outside the mitered corner. For very large sheets of plywood in which the joint can be several feet long, a one sided clamp is much more compact and practical than existing clamps. For picture frames with delicate lacy carvings on either the outside or the inside, the ability to clamp a mitered joint securely using only the outside or only the inside edges of the frame is an advantage over existing devices which press on both sides of the frame edges.

The present invention can also be used in advertising. It can be used in laser light shows; it can be used to transport and hold robots bearing ad copy up the inside or outside of buildings. The present invention allows ads to be placed in previously unreachable positions. It also provides a non-marring, portable, low cost alternative to billboards.

The present invention can also be used to hold any other sign, poster, flag or similar item for decorative or identification purposes. Using the present invention, these items can be secured inside or outside of a building without damaging or requiring modification to the surface. It also alleviates the need to have supports jammed in windows for temporary signs and posters hung out of windows.

The present invention can also be used for painting. As with roofing, using the present invention for this activity adds security and will reduce ladder shake (it can also alleviate the need to use a ladder altogether). The present invention can also be used as part of an automated or remote controlled painting system. Using clamping and/or climbing systems on each corner of a wall and/or the wall/eve interface, a tether based painting system could cover an entire wall without the aid of ladders or scaffolding.

The present invention can also be used for emergency escape devices. For example, a high-rise building might be too tall for a rope or ladder to be used as an escape mechanism. Most buildings do have an inside or outside corner or similar features. One or more corner grippers (possibly combined with a shorter rope or ladder) could be used by a human to descend from a dangerous situation on a high floor.

The present invention can also be used by firefighters and police in rescue operations. The ability to quickly attach and remove grippers to different building features, including corners, can greatly aid in rescue efforts where additional leverage, support or safety backup is desired, especially if such an ability is integrated into one light weight and compact device.

Industrial

The present invention can also be used in a variety of industrial settings. One use is clamping. Clamping mitered frames can be performed with this invention without damaging finishes or material. This enables much simpler fabrication and repair of picture frames, for example. Existing clamps for mitering are bulky and can damage surface finishes. Machinists often use double-sided sticky tape to secure objects to be machined. The corner clamp could allow many such time-consuming fixture-related tasks to be replaced with a clamping system and might also aid in assembly operations by allowing non-parallel surfaces to be used for clamping. Currently, clamping non-parallel surfaces and even parallel surfaces, especially while gluing, can be a problem because motion can occur. Clamps based on the high grip material allow the position of the materials to be maintained securely while clamping and while the glue sets.

The present invention can also be used to clamp surfaces together in a temporary manner. Temporary structures can be clamped together. It would be difficult and require special features to deal with the corners in clamped-together structures using the technology disclosed in the prior art. With the present invention, it is possible to clamp plywood together in the corners to make a box without fasteners or special features.

Household

The present invention can also be used for a number of household activities. For example, the corner clamp of the present invention can be used for bathroom and shower racks. Because the clamps are movable, the shelves can continually be placed in new, convenient locations. Many of the racks on the market hang from showerheads, a bath fixture or are held by suction cups. The present invention can be placed in many places relative to the showerhead, and can grip surfaces that are not easily gripped by suction cups.

The present invention can also be used to hold decorative hangings. The present invention can be used to hold curtains without marring the wall and without the use of attachments. It can also be used to hang pictures or other wall hangings. Using adjacent or opposite walls, the present invention could be used to place partitions within a room.

The present invention can also be used to hang fixtures or assist with remodeling experiments. Lights, bookshelves, party decorations, etc. can be supported by the invention. During a remodeling effort, test sheets can be hung from these clamps to see if a color, texture or pattern is desirable in the actual room environment.

The present invention can also be used to secure televisions, computer screens or other components to a corner. It can be used to change the position of these items easily. For example, a monitor or television could be positioned in a corner at a height suitable for a child, and then raised later that day for use by an adult, or adjusted over time as the child grows.

Recreational

The present invention can also be used for a number of recreational activities. Rock climbing, for example, is generally based on using primarily human support for all of the climbing, while mechanical anchoring devices are used for security in case of a fall. Currently, the most secure anchors are drilled and bolted hangars, which permanently deface the rock, are a hazard to bump into, and can become dangerous as they age. The present invention can be used to supplement or replace many of the existing rock climbing safety systems, and it also has the added benefits of being quick to place and remove, and it is non-marring.

The present invention can also be used in mountaineering. Mountaineering most often utilizes assisted climbing, where an apparatus is relied on for actual climbing and not just for backup. The present invention can be used to replace the existing apparatuses, which are unsightly, heavy, slow, and often utilize single-use pitons and require drilling and bolting. In contrast, the present invention is lightweight, quickly engaged and disengaged, reusable, and utilizes non-marking and non marring grippers.

The present invention can also be used for gear hauling. In mountaineering, river rafting, and elsewhere, providing a secure clamp for mounting a pulley, securing platforms, or for hauling gear up or down is a useful capability. The present invention can be used on many features for which no other gripping technology will work and can be used to supplement grips where conventional grips can be used.

The present invention can also be used for roof racks. The non-marring clamping capabilities make the present invention ideal for securing gear on vehicles. Most current roof racks and storage systems must be permanently attached to the vehicle, and installing them can also be difficult and time consuming. The present invention alleviates these concerns because it is not permanent and does not require installation.

The present invention can also act as a research tool. Researchers may use the device for their research activities involving the study of cliff living organisms, or might perform research on materials, clamping, and friction using apparatus based on those of the present invention or with the intent of improving on the present invention.

Toys and Games

The present invention has wide applicability in the area of toys and games. The clamps can be used to suspend toys in corners and on walls by direct adhesion or support them in space or along walls using two or more corner devices in different corners connected or communicating in some way. The present invention could be used to create a toy that jumps from wall to wall to climb, like Jackie Chan in Rumble in the Bronx. The present invention can be used to make toys that are thrown or aimed at the wall, as well as toys and games that integrate skill, chance, and technology. For example, a toy that, when thrown at a corner, springs upwards some distance depending on the speed and angle of impact making one or more impacts with adjacent wall surfaces could be created. Apparatuses for holding targets such as dart boards, basketball hoops, baseball batters and/or catcher's mitts, golf game targets, nets or targets for projectiles, helicopter landing pads, "enemy" targets such as a toy figure(s), aircraft, etc. could also be created using this technology.

The present invention can also be used in creating action figures or action figure accessories. The ability to grip corners, poles, other toys, etc. provided by the invention enables action figures to perform feats that cannot be performed in any other way without marring surfaces. Some of the friction materials used with the present invention provide enough adhesive-like grip that even some flat surfaces could be gripped. Action figures such as Spiderman, Batman, their machines and enemies, etc. can be made to cling to walls, roost in corners, cling to doors, attach to other toys, etc. The corner clinging (or climbing) features of the present invention can be built into the toy, or integrated with accessories such as clothing, exoskeletons, etc. Corner clamps could deploy nets, projectiles, or ropes for action games. Such toys could be positioned by hand or be actuated to provide climbing or other capabilities. Examples of toys based on the invention include figures that cling to a corner and then jump off, parachute down, hang glide down, shoot light beams or the like. Wheeled climbers could be made into Matchbox™ type toy vehicles that can roll on corners, and using the adhesive properties of some of the materials, can even roll down vertical surfaces or possibly cling to ceilings. More sophisticated toys could also be made to climb or descend robotically and could be controlled manually or by radio, voice, or light control.

In addition to the primarily toy/action figure uses just described, games can be based on the present invention. For example, a device such as a ball could be thrown at or bounced at a corner and points scored based on how many bounces occurred or if and for how long the device stuck and stayed in the corner. The device could have facets or be spring-loaded or even use control systems to provide an enhanced mix of luck and skill to the game.

The present invention can also be used to create racing toys. Corner climbing cars, insects, etc. could be raced over a surface, up corners, and around rooms.

This invention will also allow "super powers" of movie, television and comic book characters to be more accurately reproduced in the accompanying toys and games.

Most toy applications can be envisioned as robots. Often there is potential for a low cost toy based on manual operation and a higher priced toy with one or more robotic features. The present invention can be easily used to create both types of toys.

Miscellaneous Uses

The present invention is not limited to the uses described herein. It can be used wherever a need for a clamping and/or climbing device exists.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Certain terminology will be used in the following description for convenience in reference only and will not be limiting. The words "in" and "out" will refer to directions toward and away from, respectively, the geometric center of the device and designated and/or referenced parts thereof. The words "up" and "down" will indicate directions relative to the horizontal and as depicted in the various figures. The words "clockwise" and "counterclockwise" will indicate rotation relative to a standard "right-handed" coordinate system. Such terminology will include the words above specifically mentioned, derivatives thereof and words of similar import.

Embodiments of the present invention comprise devices that are capable of climbing surfaces that are at various angles to each other. In fact, the present invention can climb corners wherein two surface meet at right, or even more adverse angles. Furthermore, the present invention is capable of climbing a variety of different surfaces including, but not limited to, pillars, trees, cliffs, poles, etc.

Figure 1:
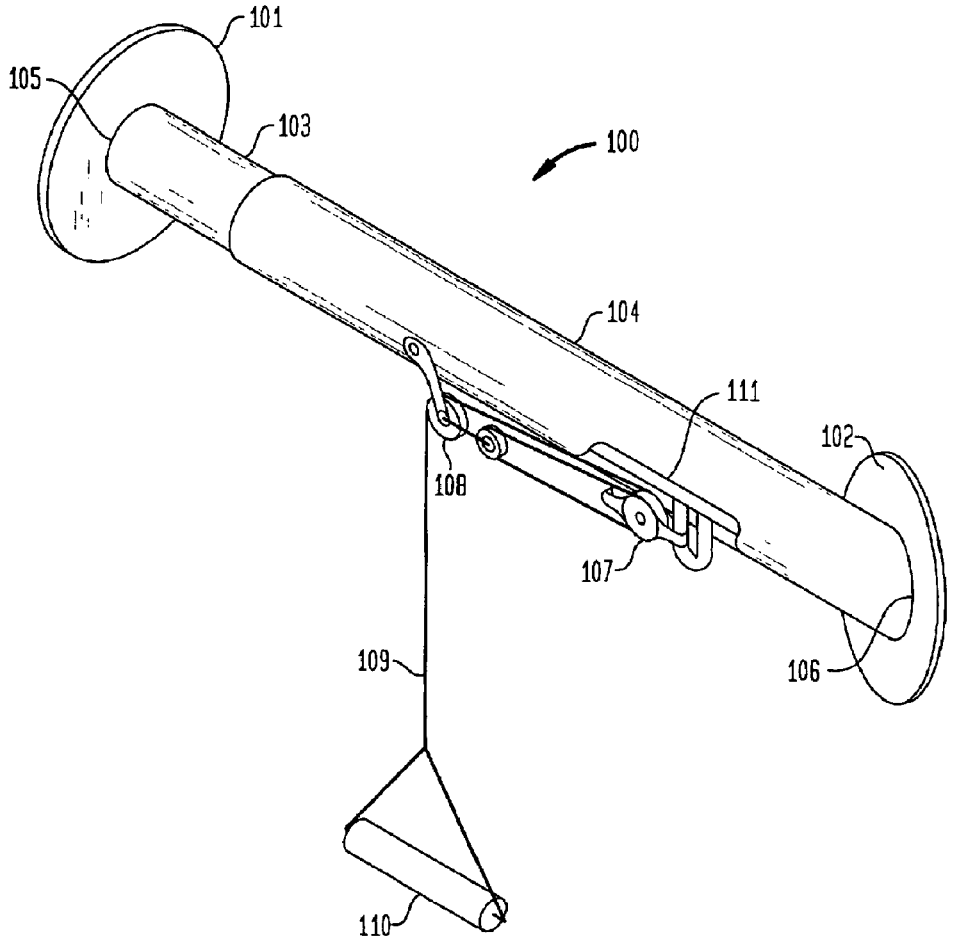
FIG. 1 depicts a perspective view of an inside corner climber tube clamp in accordance with the preferred embodiment of the present invention.

Referring first to FIG. 1, shown is a human operated inside corner climber tube clamp 100 according to the present invention. Herein, the corner climber tube clamp 100 is comprised of pads 101 and 102 attached to inner tube 103 and outer tube 104 by joints 105 and 106, respectively. Pads 101 and 102 according to the present invention comprise preferably a high friction material such as Dycem®, Versaflex®, Dynaflex®, Kraton™, Versalloy®, Five-Ten™ Stealth and Stealth C4 climbing shoe rubber, etc. (These materials are discussed in greater detail below.) Inner tube 103 and outer tube 104 preferably telescope (i.e., are slidably engaged with one another) such that corner climber tube clamp 100 is adjustable. Bearings, lubrication, or any other friction minimizing or eliminating means may be used to facilitate smooth telescoping of inner tube 103 with outer tube 104. Inner tube 103 has a pulley assembly 107 mounted thereto such that it protrudes through an opening 111 in outer tube 104. An additional pulley assembly 108 is positioned on outer tube 104 in alignment with pulley assembly 107. Both pulley assemblies 107 and 108 have clamp actuator line 109 running therethrough such that it controls the telescoping of inner and outer tubes 103 and 104. The free end of the clamp actuator line 109 comprises stirrup 110 for easy control of actuator line 109.

In operation, exerting a force on stirrup 110 causes the telescoping inner and outer tubes 103 and 104 to extend and clamp into an inside corner. Additionally, inner and outer tubes 103 and 104 may be spring loaded such that they automatically contract upon release of stirrup 110. The pulley system shown (i.e. pulley assemblies 107 and 108) results in a 3:1 block and tackle ratio. Various other pulley systems may be used for a variety of reasons, such as altering the block and tackle ratio, without departing from the scope of the present invention.

Figure 2:
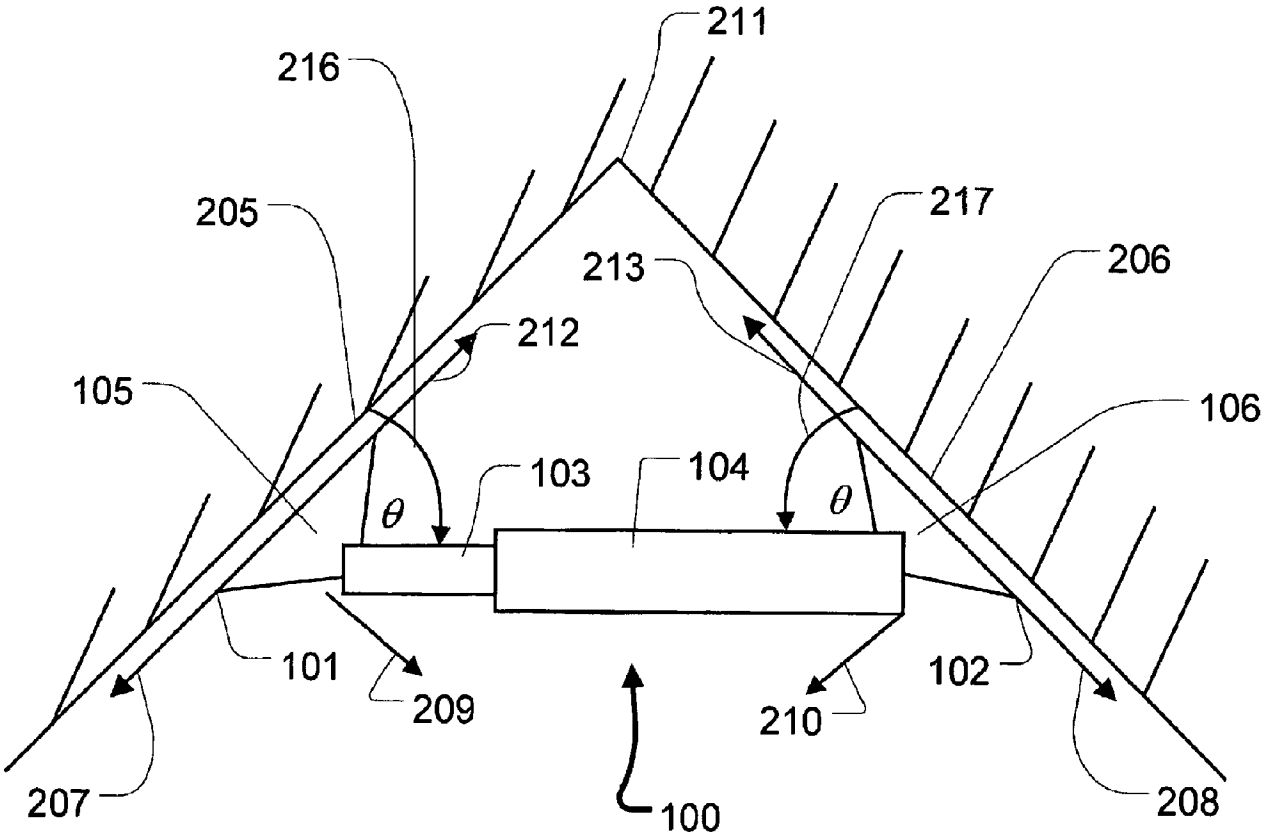
FIG. 2 depicts a top view of the corner climber tube clamp of FIG. 1 as it is aligned or positioned within an inside corner.

When placed inside a corner, as shown in FIG. 2, the inner and outer tubes 103 and 104 of corner climber tube clamp 100 can extend until pads 101 and 102 contact surfaces 205 and 206. The friction between the pads 101 and surface 205 and between pad 102 and surface 206 prevents the inside corner tube clamp 100 from slipping out of corner 211. Joints 105 and 106 allow pads 101 and 102 to adjust to the angle of surfaces 205 and 206 such that pads 101 and 102 are flush with surfaces 205 and 206, respectively. However, the system necessitates a minimum coefficient of friction for pads 101 and 102. In order to determine the minimum coefficient of friction, the individual force components must be analyzed. The outward force created by the extension of inner and outer tubes 103 and 104 can be broken into two separate vector components for each of the surfaces 205 and 206. One component is directed orthogonally into surfaces 205 and 206. Naturally, surfaces 205 and 206 respond by exhibiting an equal and opposite normal force illustrated in FIG. 2 by vectors 209 and 210. The second component is directed away from corner 211 parallel to surfaces 205 and 206. These forces are illustrated in FIG. 2 by vectors 207 and 208. The corresponding frictional forces, represented in FIG. 2 by vectors 212 and 213, oppose forces 207 and 208. In order to prevent the pads 101 and 102 from slipping away from the corner 211 thereby causing corner climber tube clamp 100 to become dislodged, the coefficient of friction must be great enough such that the magnitudes forces 212 and 213 are greater than or equal to the magnitudes of forces 207 and 208, respectively. The magnitude of the force of friction is represented by the following equation: $F_F=\mu F_N$ wherein $\mu$ is the coefficient of friction of pads 101 and 102 and $F_N$ is the normal force (shown in FIG. 2 as vectors 209 and 210. Simple vector analysis demonstrates that the normal force, $F_N$, equals $F_o \sin(\theta)$ wherein $F_o$ is the outward force generated by corner tube clamp 100 and $\theta$ is the angle between the surface 205 or 206 and inner and outer tubes 103 and 104. This angle $\theta$ is shown in FIG. 2 by arrows 216 or 217. Further, simple vector analysis shows that the magnitudes of forces 207 and 208 equal $F_o \cos(\theta)$. At the very minimum, the magnitude of $F_F$ must equal the magnitude of forces 207 and 208. Thus, $F_F=\mu F_o \sin(\theta)\geq F_o \cos(\theta)$, which means that $\mu\geq\text{cotan}(\theta)$. Therefore, the coefficient of friction must be greater than or equal to the cotangent of $\theta$, (or greater than or equal to the tangent of one half of the angle between the two walls) the angle between the corner tube clamp 100 and surfaces 205 and 206. Under the assumption that surfaces 205 and 206 are orthogonal and the angle $\theta$ on both ends of corner tube clamp 100 is the same, i.e., $\theta=45°$ or $\pi/4$, $\mu\geq\text{cotan}(\pi/4)=1$. Thus, $\mu$ must be greater than or equal to 1 in order to prevent corner tube clamp 100 from slipping from corner 211 if created by two orthogonal surfaces. Of course, it is possible that the angle between corner climber clamp 100 and surface 205 is different from the angle between corner climber tube clamp 100 and surface 206. In this case, the smaller angle should be used to determine the minimum coefficient of friction.

Figure 3:
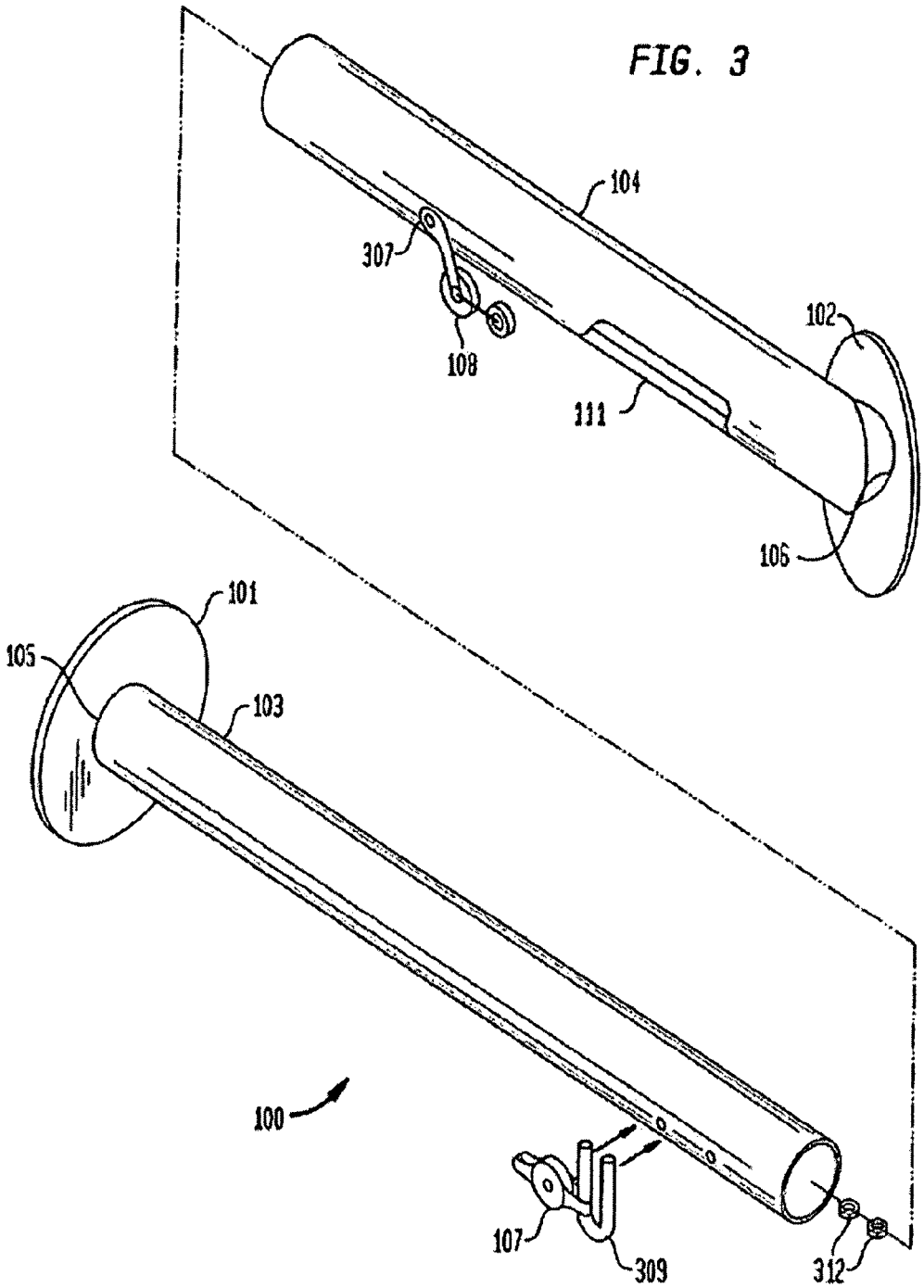
FIG. 3 is an exploded view of the inside corner climber tube clamp of FIG. 1.

A closer look at the mechanism by which corner climber clamp 100 operates is illustrated in the exploded view of FIG. 3. Here, pads 101 and 102, inner and outer tubes 103 and 104, and joints 105 and 106 are shown. Also, outer tube 104 includes pulley strap 307 which secures pulley assembly 108 to outer tube 104. Similarly, inner tube 103 includes U-bolt 309 and nuts 312 to fasten pulley assembly 108 to inner tube 103. Opening 111 in outer tube 104 permits access to pulley assembly 107 when corner climber tube clamp 100 the apparatus is fully assembled.

Figure 4:
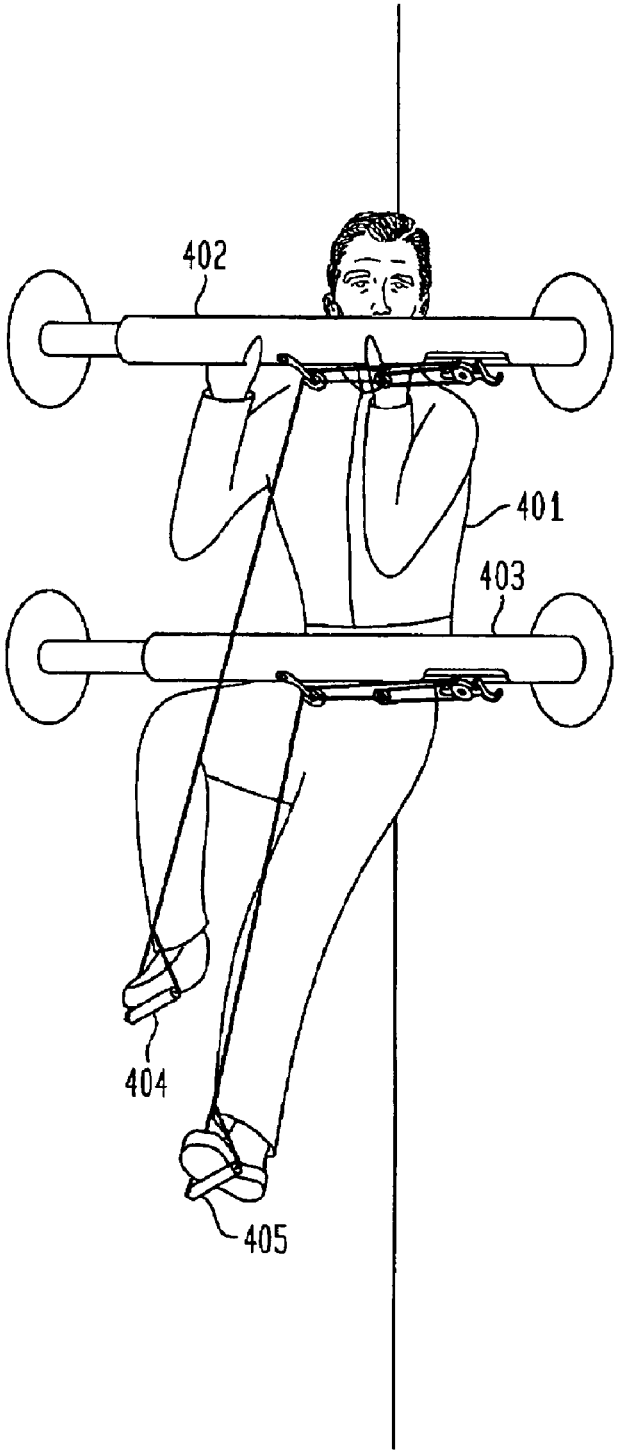
FIG. 4 depicts a person climbing an inside corner using two of the inside corner climber tube clamps of FIG. 1.

Referring next to FIG. 4, depicted are two inside corner climber tube clamps 402 and 403 of the present invention being operated to climb an inside corner. As depicted, corner climber tube clamp 402 has stirrup 404 attached thereto. Similarly, corner climber tube clamp 403 has stirrup 405 attached thereto. Here, the user 401 places each of his feet into one of stirrups 404 and 405 of inside corner climber tube clamps 402 and 403, as shown. User 401 then grasps one of clamps 402 and 403 with his hands for balance. As user 401 places weight into one of the stirrups 404 or 405, the corresponding inside corner climber tube clamp 402 or 403 clamps or secures itself into the corner. If user 401 places all of his weight into one stirrup, the inside corner tube clamp corresponding to the opposite stirrup will be free to be moved up or down. For example, if user 401 puts all of his weight on stirrup 405, then clamp 403 will be securely clamped to the inside corner. User 401 may then reposition clamp 402 either high (if climbing upward) or lower (if climbing downward) in the inside corner. Likewise, user 401 may then shift his weight once again to stirrup 404 so that clamp 402 becomes secured, and he can reposition clamp 403. Consequently, by shifting weight entirely from one foot to the other and raising or lowering the clamps, the user 401 is able to ascend or descend inside corners. Further, user 401 may lean into the corner of the walls for added stability while moving the clamps. (Wearing clothing or pads with high friction material in appropriate areas such as elbows, may enhance climbing ability and comfort.) Alternatively, the corner climber tube clamp of this invention may be used to traverse not only vertical inside corners, but also inside corners created by a ceiling and a wall, or any other inside corners situated at any angle.

Figure 5:
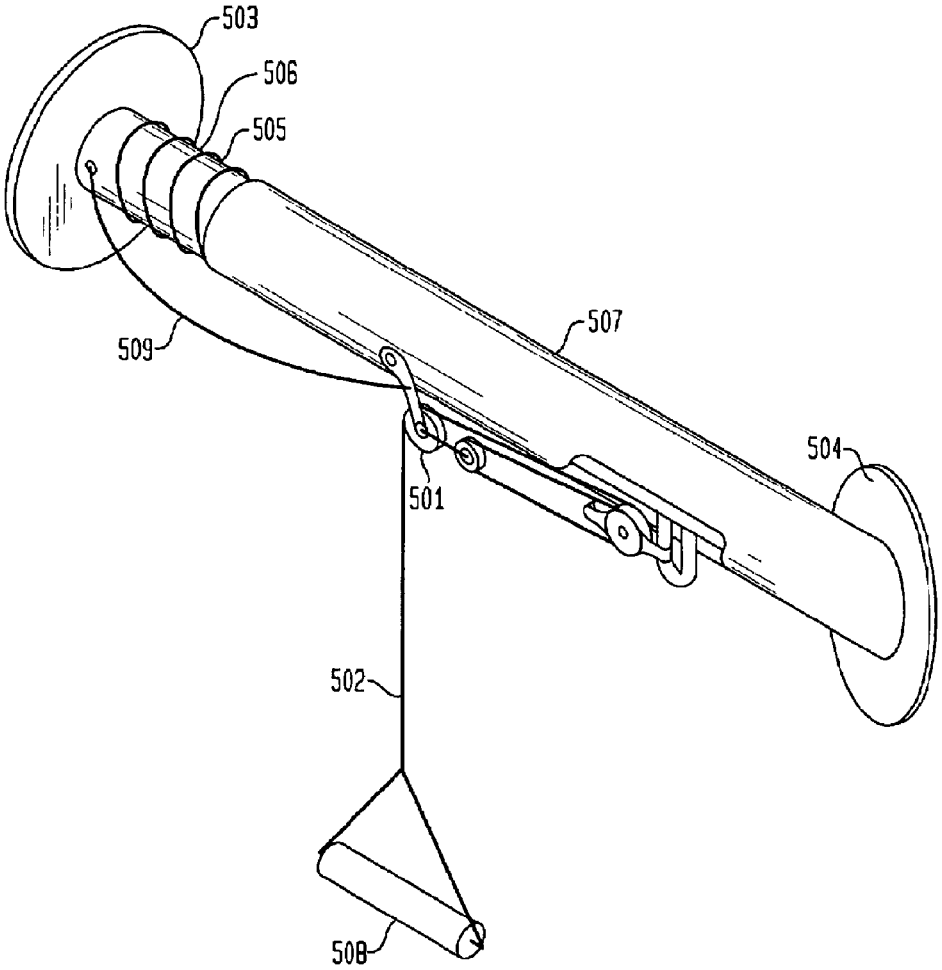
FIG. 5 depicts an alternative embodiment of the inside corner climber tube clamp of the present invention.

Turning to FIG. 5, illustrated is an alternative embodiment of the corner climber tube clamp of the present invention. As depicted, additional components may be included to enhance the performance of the inside corner tube clamp. For example, the pulley assembly may include cleat 501 to lock pulley and maintain clamp force after releasing the stirrup 508. Further elasticity of clamp actuation line 502 may improve the performance of cleat 501 by storing energy to maintain the clamp force even if pads 503 and 504 creep along the wall surfaces. Next, corner climber tube clamp may include spring 505 to allow the inner and outer tubes 506 and 507 to return to a set position when stirrup 508 is released. Additionally, the corner climber tube clamp can be positioned in a corner such that spring 505 creates a clamp force even without depressing stirrup 508. Therefore, the user may be relieved of holding the clamp since it can hold itself in the corner without external influences. Further, shortening line 509 may be included to shorten clamp span in order to aid with positioning of the corner climber tube clamp.

Also, without departing from the spirit of the invention, a number of systems may be employed to replace the pulley system previously described. These include: levers, gears, racks and gears, worm drives, cams, screws, pneumatics, hydraulics, spring hold with actuator release, shape memory materials, etc. Any system that provides force multiplication may be used. Furthermore, external power sources may be used to drive actuators such as motors, shape memory alloys, pneumatic pumps, hydraulic pumps, and the like to achieve actuation. Power for actuation may be obtained from batteries or other means of electric storage, and energy converters such as solar cells, fuel cells, chemically driven generators, and from thermal sources, or gas generators (such as ammunition cartridges). Yet another alternative embodiment could allow a user to store energy (for example, in a spring) to be used at a later, convenient time. Furthermore, the nested tube configuration described thus far may be replaced with any system that can provide an outward clamping force. The tubes can be replaced with expanding linkages or inflatable structures. The joints can be stiff or compliant and can be on any construction from solid or elastomeric, to ball joint, living hinge, chain links, U-joints, linkages, etc. However, the invention is not limited to these features, various other features may be added without departing from the scope of the present invention.

In regard to previously discussed embodiments of the present invention, the friction pads will now be described in greater detail. FIGS. 1-5 illustrate the corner climber being applied to flat surfaces. However, the corner climber is not limited to flat surfaces, but rather, may be used on concave, convex, flat, curved, rounded, bumpy, and/or multi-angled surfaces at any angle relative to gravity. The present invention may also be used in space-based applications and/or underwater applications wherein gravity is not the primary force of interest. Similarly, other applications such as machining fixtures and gluing clamps might involve conditions where forces other than gravity are the primary reaction forces involved with clamping. Orthogonal corners are generally used herein for exemplary purposes because of their commonality and convenience. However, embodiments of the present invention may operate on corners of lesser and/or greater angles, provided a sufficient coefficient of friction or sufficient adhesion between the friction pads and surfaces is achieved. As mathematically shown above, the minimum coefficient for an inside corner climber climbing orthogonal surfaces is 1. As the angle between the surfaces increases (i.e., greater than 90°), the minimum coefficient of friction becomes greater. Conversely, as the angle between the surfaces decreases (i.e., less than 90°), the minimum coefficient of friction becomes lower. When materials produce adhesive and/or suction forces instead of or in addition to frictional forces, the required frictional and clamp forces can be reduced. Many of the high friction materials also have adhesive properties that sometimes allow the clamping force to be eliminated and adhesion to be achieved.

Some materials necessary for creating such high coefficients of friction against materials commonly used for surfaces such as walls are disclosed in the U.K. patent GB2131475 by Crabbe, all of which is incorporated herein by reference. Herein, Crabbe utilizes polyurethane foams and other foam plastics and rubbers having similar properties on hard mineral surfaces. Crabbe reports coefficients of friction of up to 1.5 for such materials. However, the materials disclosed in Crabbe are not particularly suitable for very smooth surfaces. Thus, improved high friction materials are necessary. The following readily available materials may be used for the friction pads of the present invention: Dycem®, Versaflex®, Dynaflex®, Kraton™, Versalloy®, TEEBAUD®, Five-Ten Stealth rubber, etc.

Dycem®, produced by Dycem® Limited provides products constructed of polyester plasticizers and polymeric compositions manufactured through an emulsion process. Dycem® is a polyester composite PVC compound with non-migratory plasticizers. Further, Dycemo® may be cleaned with soapy water. Other materials manufactured by the GLS Corporation (GLS) include Versaflex® (referred to herein as "CL-30"), Dynaflex® (contains KRATON™ polymers), Kraton™, and Versalloy®. According to GLS literature, these materials consist of thermoplastic elastomer compounds (referred to herein as "TPE"). TPE's are generally lower modulus, flexible materials that can be stretched repeatedly to at least twice their original length at room temperature without permanent deformation. Dycem® and GLS products have demonstrated coefficients of friction of greater than 1 on a variety of surfaces such as painted wood, brick, wallboard, smooth plywood, glass, and concrete. For some combinations of materials, friction coefficients greater than 2 or even releasable, repeatable adhesive gripping has been demonstrated. For these Dycem and GLS materials, performance is optimal on clean surfaces, however, it has been shown to be adequate on dusty surfaces. Further, these materials are easily cleaned with water.

Another material that may be used with the present invention is TEEBAUD®, a product of Teebaud® Co. L.L.C. TEEBAUD® is a fiber mat with a water-based clean lift adhesive treatment. This, as well as Five-Ten Stealth and Stealth C4 rubber, available in resole kits for mountain climbing shoes, demonstrated sufficiently high coefficients of friction. Five-Ten Stealth rubber is designed for mountain climbing and is consequently very tough and tear resistant. Other climbing sole materials may also be utilized in the present invention.

Additional materials and/or devices may be used for damp or wet surfaces, for example, Five-Ten makes a special rubber for gripping wet surfaces such as rocky stream beds. Moreover, numerous other physical effects that generate forces may also be utilized. These effects include, but are not limited to static electricity, intermolecular forces, Vanderwall's force, adhesives (e.g. the adhesive of Post-It® Note), suction (e.g. suction cups), hooks, foot pads (like on geckos), slime (like slugs or bacteria), surface cleaners and/or adhesives, and/or any other or similar friction technology. Hooks, especially micro-hooks based on Micro Electro Mechanical System (MEMS) technology, also have applications to high friction gripping. That is, even apparently smooth surfaces look like numerous corners at MEMS the scale. A device on this scale would be able to climb a seemingly flat wall. MEMS technology may also provide a high friction capability for larger devices when used in the manufacture of friction pads. MEMS scale technology may also provide a means of reducing or eliminating creep.

Just as the material used to create the friction pads is important, the pad design also has significant effects on the performance of the present invention. Specifically, pad loading is an important concept to consider when designing friction pads. Generally, the coefficient of friction is not constant along the entire surface of a material. Rather, it is dependent on the pad pressure and load conditions. Flexibility and limited strength of high friction materials further complicates the problem. Under heavy loads, the coefficient of friction may drop and shear forces may damage the material.

A variety of design solutions are available to maximize the effectiveness of high friction materials. For example, rounded surface pads, which operate especially well with stiff joints, may be employed since they can accommodate a wide range of angles to the surface. Also, flat pads mounted on flexible or pivoting joints are also useful to accommodate various surface angles. These flat pads are also suited to higher loads when the friction material effectiveness is reduced by high pressures and/or shear forces. Flat or conformal pads allow the force to be more spread out because providing a large area reduces stress on the pad. Other features may be adjusted in order to optimize performance, such as thickness, stiffness, and conformability of the pad. For example, with Dycem® thinner and thicker pads performed better with smooth surfaces and high forces, respectively, in preventing point loading, tearing, and pad damage.

Furthermore, pads may be mounted on materials that are stiff or conformal. In one instance, a foam layer of Dycem® has been used to provide compliance with a thin layer of solid Dycem® material in demonstration devices. A thicker multiple layered pad of solid Dycem® can also be used. (The multiple layered pads can be peeled so that a damaged layer can be removed to expose fresh material.) Such materials can be co-molded with a base material or simply glued to the base material. For instance, cyanoacrilate glue has been used in demonstration devices. These materials hold well when the contact surface area is high and the contact stress is low. A thicker pad with high compliance accommodates peak heights of rough surfaces well. If the peaks are not well accommodated, overstressing at the point of peak loading will tear the grip material of the pad.

Moreover, for many materials, the coefficient of friction falls to lower values at high stress conditions. Thus, for many materials pads should be designed to distribute loads optimally thereby minimizing peak stress and maximizing contact area. Some pad materials have an optimum pressure to achieve maximum friction, so the pressure and area must be matched to the task. Pad features such as camber that make the load more uniform may be advantageous. Creep behavior is also dependent on pad load distribution, edge conditions, and other details of design.

Multiple pad systems that may be supported on one or more a pivoting trusses may also prove useful for uneven surfaces. This is because each pad can contact appropriately to its corresponding surface such that the contacted surface area is maximized or optimized.

Figure 6:
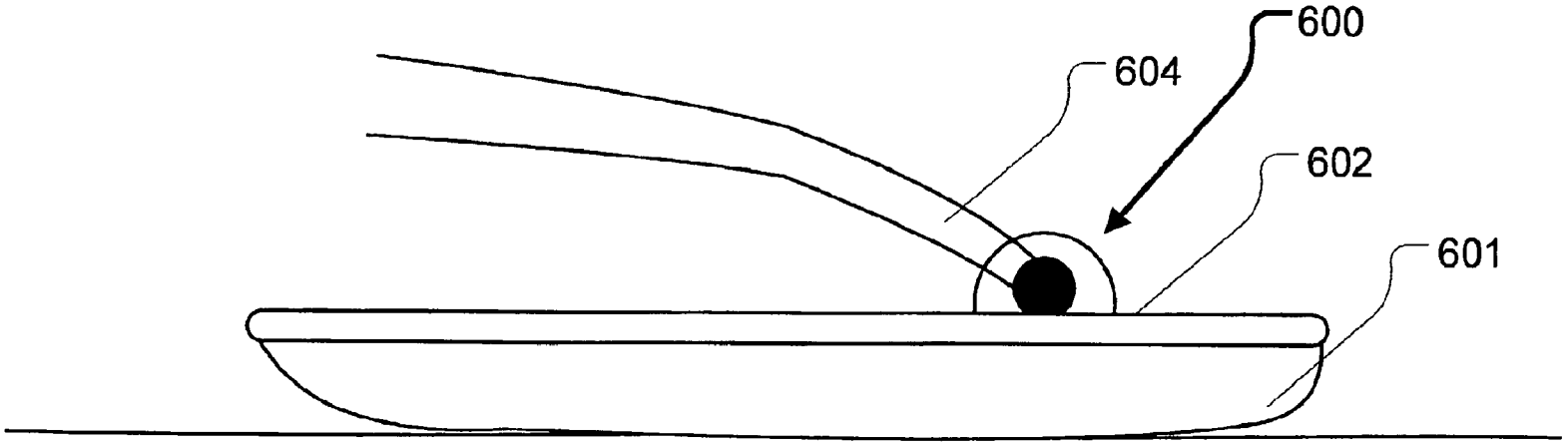
FIG. 6 depicts a fluid, gel, or air-bladder pad for use with the present invention.

Referring now to FIG. 6, illustrated is one of many possible pad configurations for use with a corner climber in accordance with the present invention. Here, pillow pad 600 which is attached to the end of pivot arm 604 is depicted having high friction grip material 601 on its surface. High grip material 601 may include a reinforced backing 602, and is typically mounted in a gas tight (and/or fluid tight) manner forming a type of gas pillow. Pillow pad 600 produces a relatively uniform surface contact pressure when applied against a surface. Gas, fluid, foam, gel, structural components, suspension components, and/or phase change material alone or in combination may be used. Further, pillow pad 600 may be compartmentalized such that each pad contains a plurality of airtight sections. This design allows the pressure distribution of pillow pad 600 to be controlled, thereby providing enhanced tolerance to damage. The design of pillow pad 600 may be applied to most of the alternative friction pad embodiments.

Figure 7:
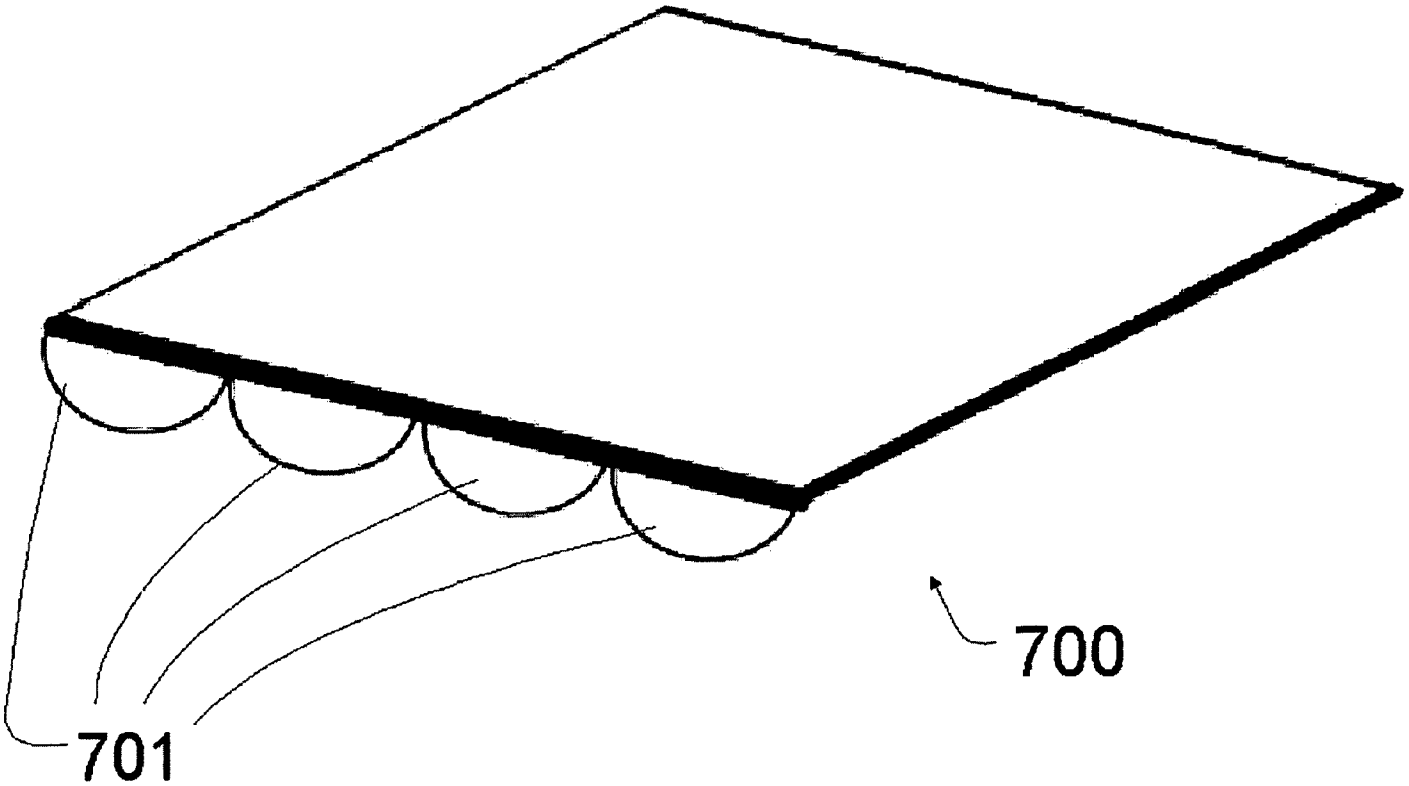
FIG. 7 depicts a ribbed pad for use with the present invention.

Turning next to FIG. 7, shown is another pad design having ribbed structure. Specifically, the pad may consist of strips and/or bumps 701 instead a single smooth surface. Any number of such strips or bumps 701 may be used on a given pad 700 depending on their size as well as the site of pad 700. This allows the force to be applied in any direction. Further, strips or bumps 701 may be solid, layered, composite, or fluid filled, and each may also be segmented in individually controlled compartments, as previously described. Other designs, such as a series of rings, non-linear strips, round, or rectangular bumps, etc., may also be employed.

Figure 8:
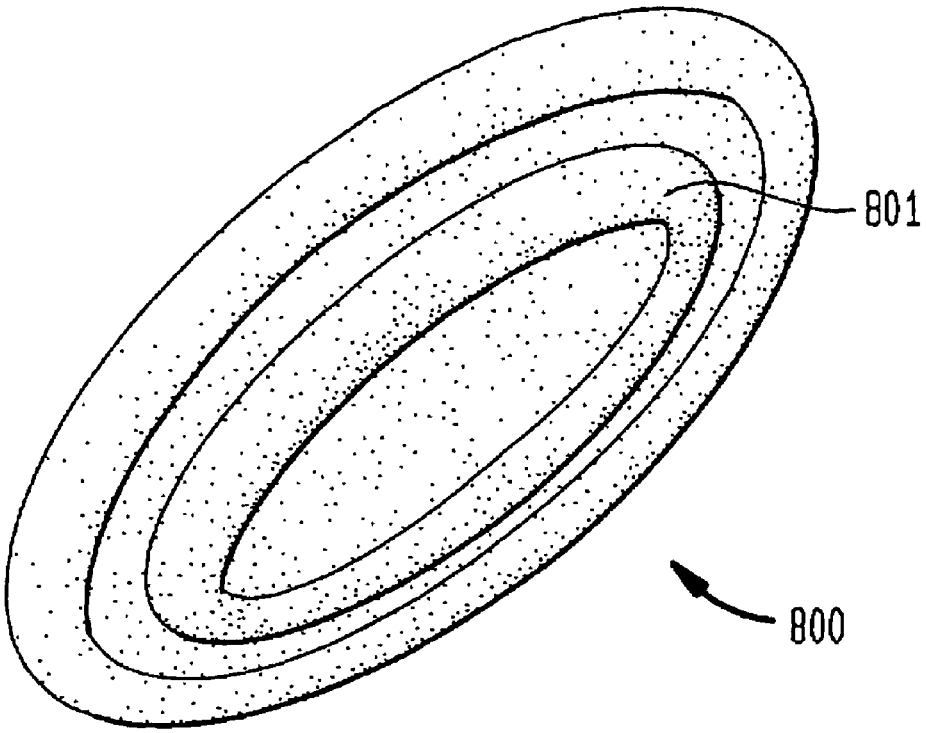
FIG. 8 depicts a ring pad for use with the present invention.

Yet another design is shown in FIG. 8. Here, concentric pad 800 is depicted having a series of concentric rings 801. Such configuration may also act as a suction cup during use. A feathered edge and/or a gel may be added around or even oozed or pumped from the perimeter of the pad to provide a better seal between pad 800 and the surface. Generally, the shape of concentric pad 800 (i.e., similar to that of a suction cup) is also suited to distribute force from a mounting point to a large area including the perimeter. Consequently, it well suited for high friction gripping. Of course, a variety of shapes may be used. Circular or concentric is preferred. Moreover, such a suction cup design can provide enhanced capability in some situations. That is, when suction cups are on a surface that provides good suction, the clamp force may be reduced or even eliminated. Because clamp force contributes to creep, its reduction or elimination can in turn reduce or eliminate creep. Also, the clamp force may be applied intermittently to recompress the suction cup-action thereby further reducing the creep rate and power requirement. Another benefit of this design is that if creep motion takes the clamp mechanism into a position where clamp force alone is insufficient to maintain grip, then the suction cups can supplement the clamp force and maintain the grip. Other common shapes of suction cups, not shown in the figures, are well known in the art and therefore, are within the scope of the present invention.

Figure 9:
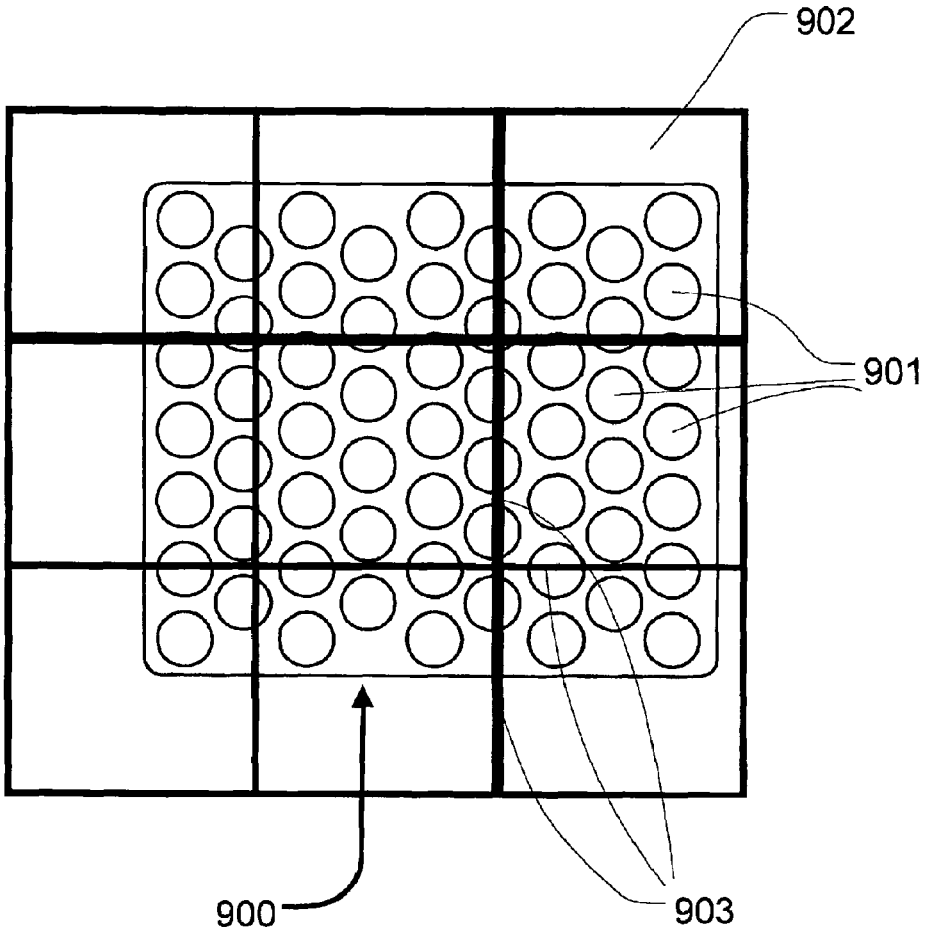
FIG. 9 depicts a patterned suction cup "octopus" grip pad for use with the present invention.

In addition to having the pad in the form of a typical single suction cup, an alternative design may comprise several suction cups like an octopus arm. FIG. 9 depicts such a multiple suction cup pad 900 having multiple suction cups 901 on the pad surface. Even though suction cups 901 can be defeated by rough surfaces, they work well on smooth surfaces. Such a design is advantageous because even though individual suction cups 901 may be defeated on interrupted smooth surfaces such as tiled surface 902 at, for example, tile joints 903, the pattern spacing is configured so that even if some suction cups 901 are positioned at tile joints 903, other suction cups 901 are on the smooth section of tile surface 902 where good suction is maintained. In addition, the particular suction cups 901 that are positioned at joints 903 may provide an improved effective wall angle, which may also enhance grip. When suction cups 901 work well, there is also the potential to grip and move on surfaces with corners that are too widely angled for normal operation or even on surfaces without corners. For example, a climber could grip and/or traverse flat glass surfaces. There are many variations in friction pad design and friction pad surface patterning including suction cups 901 of various shapes, sizes and patterns and directional and non-directional patterns with other functions. Suction cups 901 and/or suction cup shaped pads may be configured from most of the high friction materials disclosed herein.

Some of those high friction materials exhibit peelable adhesive gripping behavior on smooth surfaces. For example, CL-30 friction material (from GLS Corp.) in contact with glass, or some other smooth surface such as Plexiglas™, and smooth fiberglass structures may be placed or rolled onto the surface and maintain grip force without requiring a normal force. Thus, gripping and climbing capabilities based on an adhesive like grip may be achieved with or without the use of suction cup features. A rolling pad configuration based on such material interactions might allow for the climbing of smooth surfaces, flat surfaces, as well as on corner like structures.

Figure 10:
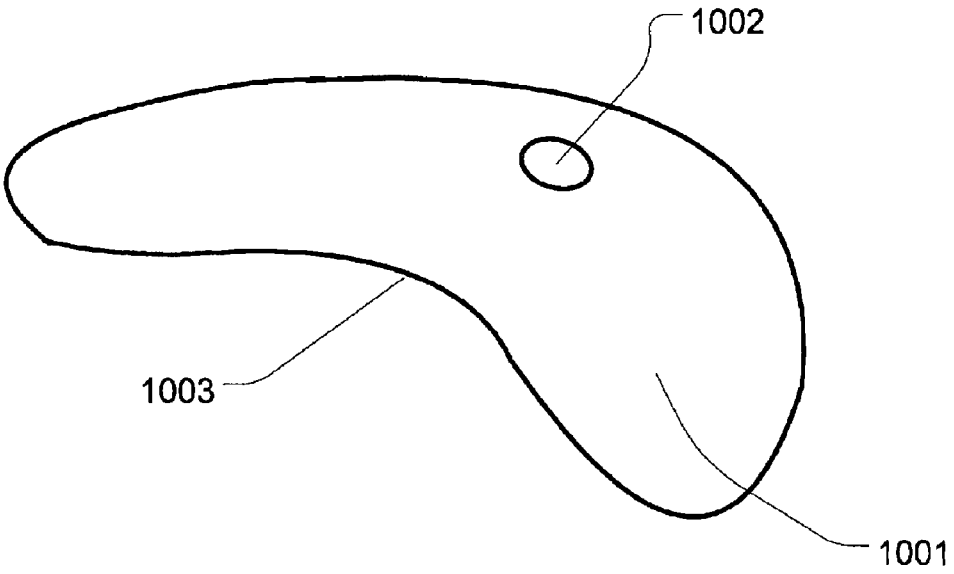
FIG. 10 depicts a boomerang shaped pad for use with the present invention.

Another configuration for a friction pad is depicted in FIG. 10, which shows boomerang shaped pad 1001. Also shown is the primary direction of force 1002 for optimum performance of boomerang pad 1001. The surface of pad 1001 preferably provides a type of camber 1003 to assist in load distribution by spreading the load more evenly to the outer span of pad 1001. Again, any of the high friction materials described herein may be used for the surface of boomerang pad 1001.

Figure 11A:
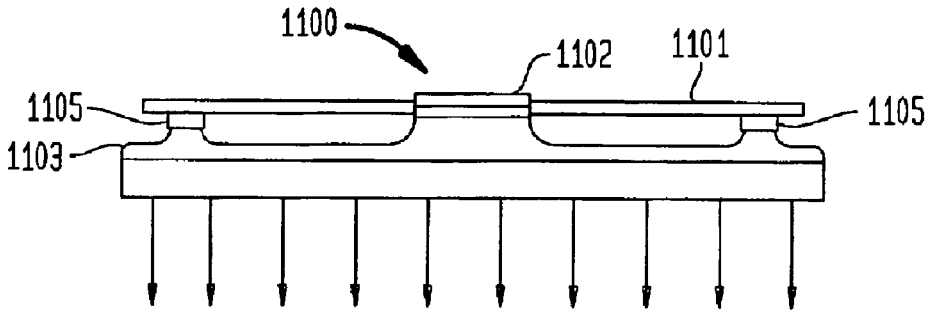
FIGS. 11A and B depict side and perspective views, respectively, of a controlled camber pad for use with the present invention.
Figure 11B:
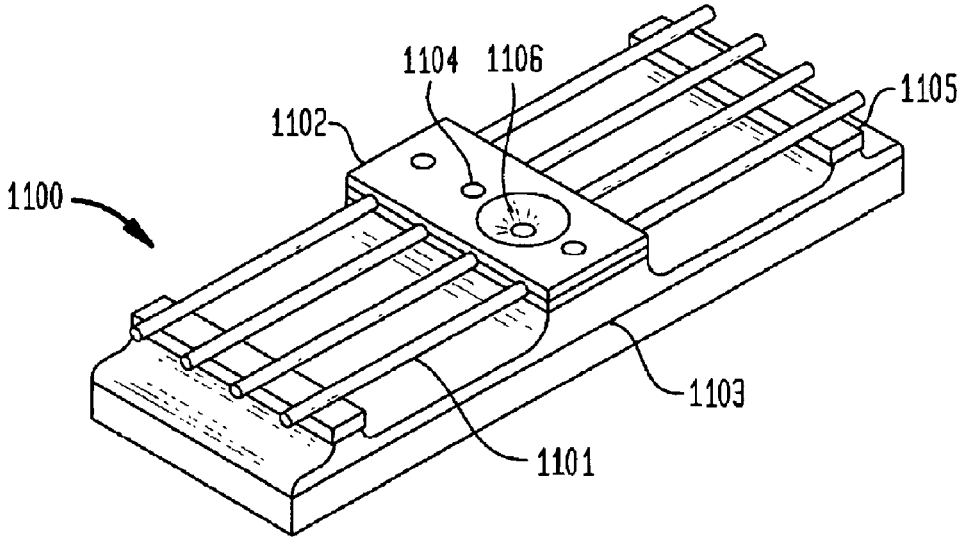

Turning next to FIGS. 11A-B, shown is a controlled camber inducer pad 1100. As shown, controlled camber inducer pad 1100 comprises a base 1103, spring retainer 1102, camber springs 1101, and pressure wedges 1105. Camber springs 1101 are mounted in spring retainer 1102, which is in turn mounted to pad base 1103 pressure screw 1104. Of course, other types of fasteners may be used to secure spring retainer 1102 to pad base 1103. During use, camber springs 1101 press on pressure wedges 1105 which put pressure on the ends of pad base 1103 to induce camber. A pad pivot 1106 is positioned offset from the center of the pad, as shown.

Operation of controlled camber inducer pad 1100 is achieved by utilization of the pressure screw 1104 and pressure wedges 1105. That is, spring force may be adjusted to control the pressure distribution of pad 1100 when pad 1100 is clamped to a surface by applying pressure at the pad pivot location 1106. Typically, the object is to increase the uniformity of the pad pressure by taking advantage of the force of camber springs 1101 on the pressure wedges 1105. The pad pivot 1106 is preferably located towards the trailing edge of pad 1100 such that the net force on pad 1100 acts through or near the center of the contact surface area. Therefore, the pressure distribution on pad 1100 may be made more uniform from the leading to the trailing edge, as well as from end to end. Once again, any of the high friction materials described herein or found or developed at a later date may be used as the surface of pad 1100.

Many embodiments of the controlled camber inducer pad 1100 may be employed. Such alternative embodiments include a combination of one or more aspects of both cambered/spring pad 1100 and pressure the distribution features of boomerang curved pad 1001 (FIG. 10). For example, any number camber springs (or even none) may be utilized in accordance with the invention. Also, camber springs 1101 may contact one or more wedges 1105 or even one or multiple locations directly on pad base 1103. Moreover, camber springs 1101 may be of various sizes and shapes and materials. For example, pad 1100 may include an octopus like array of camber springs 1101 putting pressure on pad base 1103 which may comprise a plurality of suction cup portions. Preferably, camber springs 1101 would put pressure on each suction cup portion of pad 1100. Optionally, camber springs 1101 may be attached to individual pads. Further rather than utilize "springs", pad 1100 may be curved such that the inherent elasticity of the friction material on the surface of pad 1100 and its backing combined with stiffness of pad base 1103 provides improved load distribution. There are also many different structural configurations that may be employed to distribute the pressure in a variety of multiple directions and utilize controllable shape members to vary the pressure distribution on the pads as required. For example, suction cup shaped pad may be made to include such load distributing features. It is also possible to construct the pad in a non-uniform shape or thickness and/or to pressurize portions of the pad so that distribution of the force on the pad may be optimized.

Figure 12:
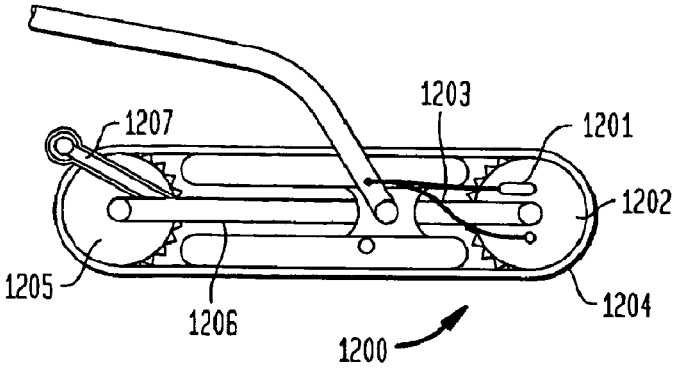
FIG. 12 depicts a track/belt pad for use with the present invention.

Still another type of pad that may be used in accordance with the invention is shown in FIG. 12. Specifically, shown is a belt/track type pad 1200 comprising high friction belt 1204, right and left drums 1202 and 1205, and connecting rod 1206. Pad 1200 may incorporate drive system and/or cleaning system 1207. A gear motor 1201 may be employed internal to right drum 1202 to control such drive and/or cleaning system 1207. A driven pad of this type may obviate creep and/or the need for a multiple clamp drive system. Such a system may be deployed alone, on each pad, or multiple systems on each pad to provide steering, etc. In addition to drive and/or cleaning system 1207, a friction enhancer and/or adhesive application system may be incorporated. Such a system may be used on wheels or modified for use on pads as well. Further, adding a rotation control actuator on belt/track track pad 1200 of FIG. 12 to control the angle of pad 1200 on wall surface to the drive system would provide an improved means of traveling, obtaining clamp force, and of minimizing creep. Yet again, any of the high friction materials described herein may be used as the surface of belt 1204 of belt/track pad 1200.

Figure 13A:
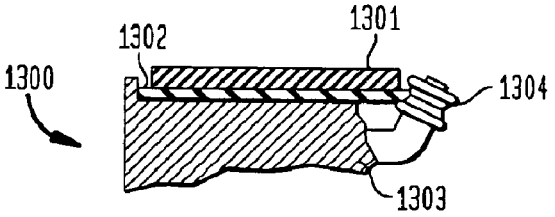
FIG. 13A depicts a cross section of a reinforced belt pad with a side roller for use with the present invention.

Next, FIG. 13A shows a cross-section of a reinforced belt drive pad 1300 with a side roller 1304 where the grip material 1301 is backed by belt 1302 for reinforcement which slides along base surface 1303 of low friction. If a thin metal belt is used, then one ore more side rollers 1304 may be used to help distribute the force on grip 1301 along the entire span of the belt 1302. Once again, any of the high friction materials described herein may be used as the surface of belt 1304/track pad 1300.

Figure 13B:
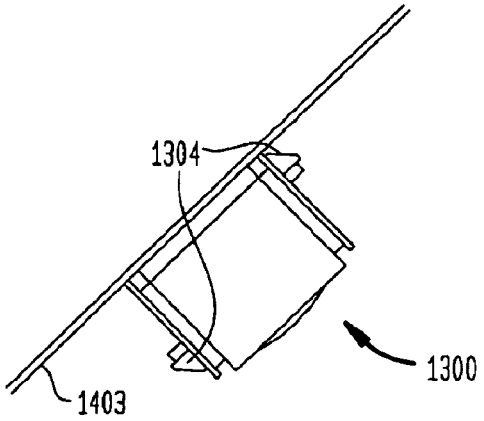
FIG. 13B depicts a top view of a reinforced belt pad and side roller system for use with the present invention.

Looking at FIG. 13B, shown is a top view of the embodiment of belt drive 1300 as used on a wall 1403 of an inside corner. The side rollers 1304 are positioned diagonally opposite one another in this embodiment so that an outside corner may be gripped merely by turning belt drive 1300 around. Alternatively or in combination, rollers 1304 may be mounted on opposite edges of the belt so that the same surface may be used on either an inside or an outside corner. Further, a round belt or half round belt or some other shape, with or without teeth may be used with the appropriate roller and/or slider shapes in accordance with the invention.

Figure 14:
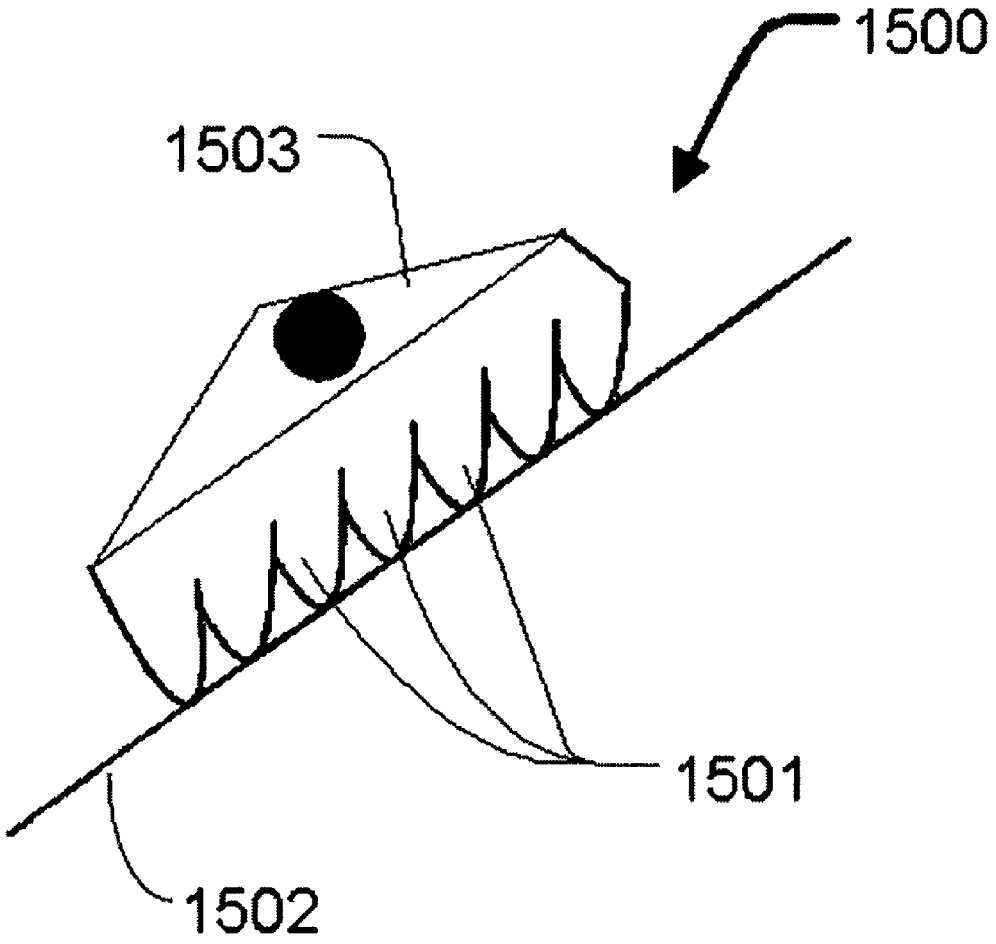
FIG. 14 depicts a side view of a vibrating traveling pad for use with the present invention.

Referring next to FIG. 14, shown is friction pad 1500 having angled pad elements 1501 that, when vibrated, cause pad 1500 to travel along surface 1502. Such pad 1500, combined with a vibration control device (not shown) may be used to climb, descend, and/or regrip a surface to minimize creep.

Of course, any of the high friction materials described herein may be used for angled pad elements 1501. Further, angled pad elements may take the form of any number of previously described shapes and sizes or be fabricated of a mix of or layers of materials. The vibration control device (not shown) may be contained within base 1503 of pad 1500 to individually vibrate each of pad elements 1501, or may be provided as a separate component to cause the vibration of the entire pad 1500. In either event, such devices to control the vibration of pad 1500 or pad elements 1501 are know to a person of skill in the art.

The edge conditions are important considerations in the pad. High shear stress and loading at the edge can lead to reduced friction, increased creep, rapid wear, and/or peeling. In general, any pad contact points that do not achieve high friction on the surface contribute adversely to the performance of the device. When the pads are mounted on flexible joints, the location of the effective center of rotation is an important consideration. For example, a ball joint pivot must be close to the surface so that an overturning moment does not cause the pad to flip onto its edge or overload the leading edge.

Figure 15:
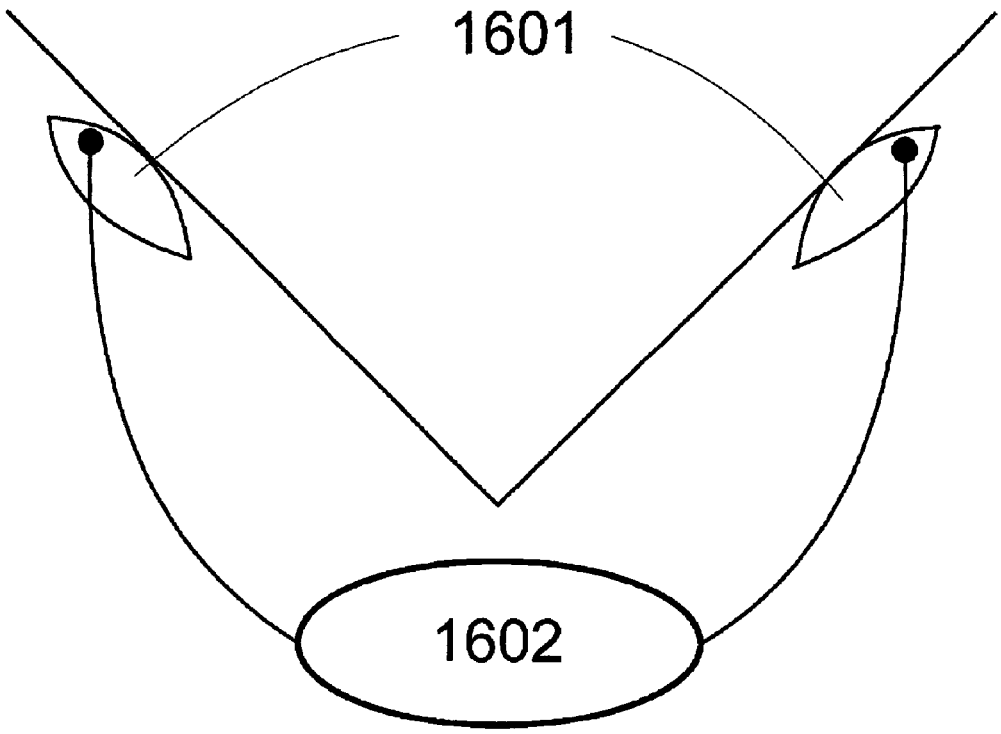
FIG. 15 depicts a top view of vibrating regripping pads for use with the preferred embodiment of the present invention.

Similarly, the pad 1601 and pivot 1602 embodiment shown in FIG. 15, when vibrated, also provides moving/regripping capability thereby allowing such a device to climb corners. There are many variations on these approaches to pad design that a person of ordinary skill in the art would appreciate and would consider within the scope of the present invention.

Edge conditions are important considerations in any pad configuration. High shear stress and loading at the edge can lead to reduced friction, increased creep, rapid wear, and/or peeling. In general, any friction pad contact points that do not achieve high friction on the surface contribute adversely to the performance of the climbing device. When the friction pads are mounted on flexible joints, the location of the effective center of rotation is an important consideration. For example, a ball joint pivot must be close to the surface so that an overturning moment does not cause the friction pad to flip onto its edge or overload the leading edge.

Figure 16:
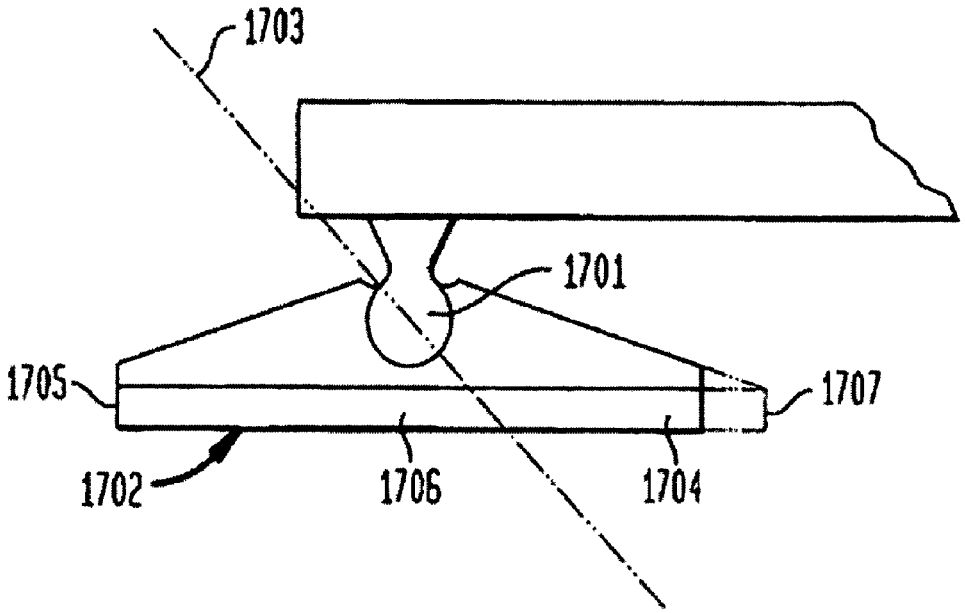
FIG. 16 depicts a side view of a ball joint and pad for use with the present invention.

For example, FIG. 16 shows a successfully used ball joint 1701 and friction pad 1706. As shown, ball joint 1701 is located close to the pad surface 1702. The angled line 1703 in FIG. 16 shows the typical line of action of the major force on pad 1706 when in use. Note that loading along that line tends to generate a moment and load leading edge 1704 of the pad more highly than middle or trailing edge 1705. To compensate for this uneven load distribution, friction pad 1706 may comprise an extended pad leading edge 1707. In some cases, the ball joint 1701 is positioned such that the location of the center of pressure on friction pad 1706 is in front of the center of rotation of the ball joint 1701. Because pad 1706 is generally large and the coefficient of friction high, there is little tendency for pad 1706 to rotate even when there are sources of off center loading, such as surface roughness.

Figure 17A:
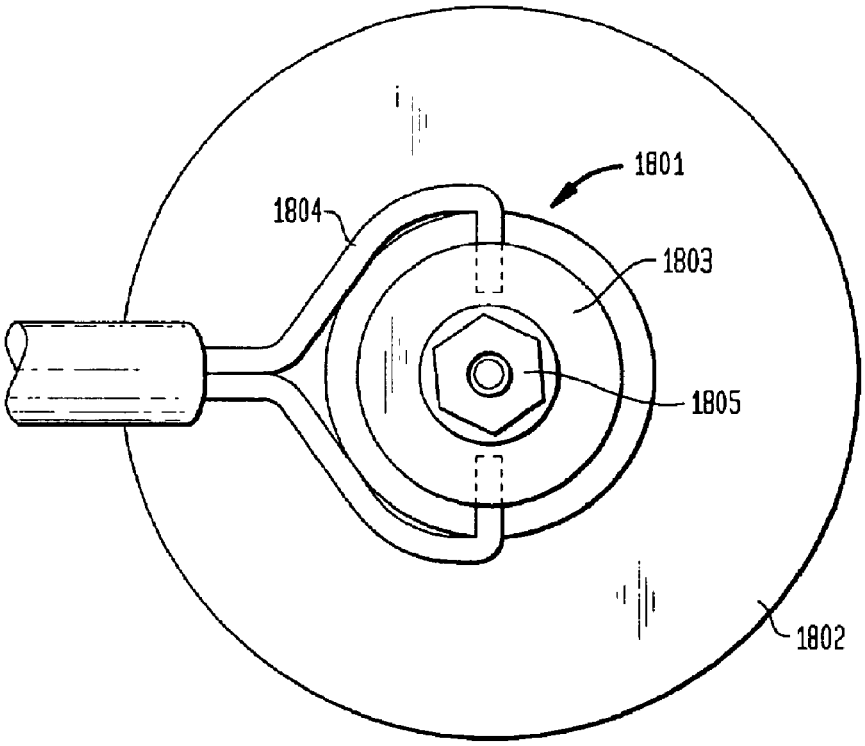
FIG. 17A depicts a top view of a swivel joint with pad for use with the present invention.
Figure 17B:
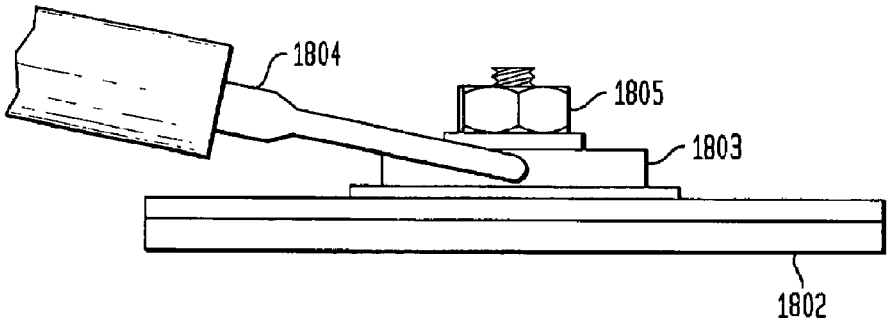
FIG. 17B depicts a side view of a swivel joint with pad for use with the present invention.

Referring next to FIGS. 17A and 17B shown are top and side views, respectively, of an alternative joint device to the ball joint mounted pad of FIG. 16. Here, pad 1802 is attached to swivel joint 1801 which comprises a rotatable disk 1803 slidably engaged with pad 1802, in a circular direction. Disk 1803 preferably comprises openings for attaching one end of actuator arm 1804 such that it provides a pivoting motion of pad 1802. Further, disk 1803 is fastened to pad 1802 preferably with nut and bolt fasteners 1805. Of course other fasteners may be used. It has similar characteristics as the fully pivoted pad. An advantage of this pad design is the ability to rotate over a much larger angle than the ball joint of FIG. 16. Pad 1802 may be flipped completely over which allows simple switching from inside to outside corners. Further, one or more degrees of freedom may be eliminated from the swivel joint 1801 to simplify its construction. Also, the position of pad 1802 when unloaded may be maintained by a spring or springs (not shown) utilizing slight intentional misalignment of the pivot axis, by detents in the pivots, by foam pads, by springs, etc. Again, the surface of pad 1802 may take any size, shape and/or form, including any of the high friction materials, as described for any of the embodiments disclosed herein.

Figure 18:
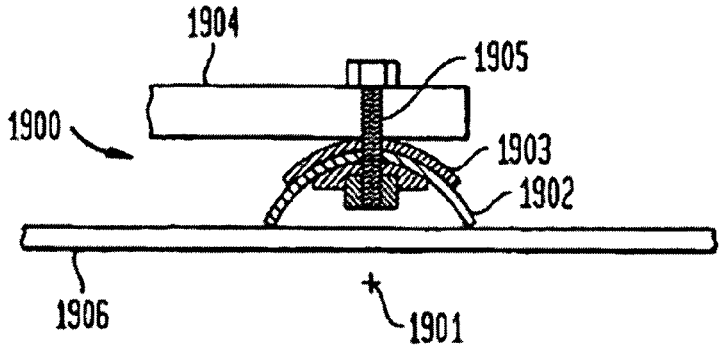
FIG. 18 depicts a side view of a remote center ball joint for pads for use with the present invention.
Figure 19:
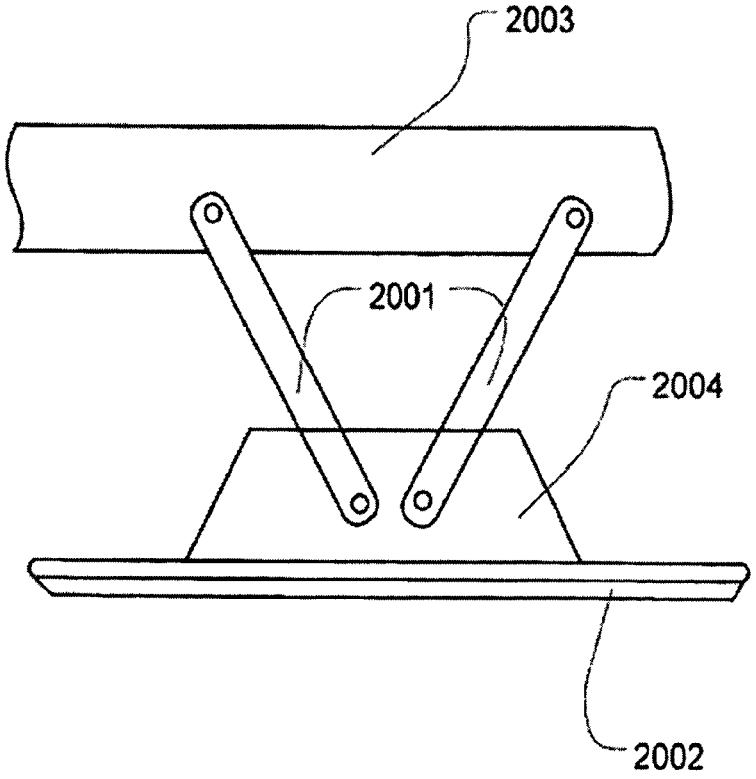
FIG. 19 depicts a side view of remote center linkage for use with the present invention.

Also in accordance with the present invention, joint designs that use remote center geometries such as those shown in FIG. 18 and FIG. 19 may be used. In such embodiments, for example FIG. 18, effective center of rotation 1901 of pad 1906 is below the surface of the wall being climbed. Such positioning of effective center of gravity 1901 can aid in maintaining a consistent contact pressure and reduce the load on the leading edge of pad 1906. Because the leading edge creeps over new terrain, the leading edge may benefit from reduced loading. Optionally, rolling the leading edge slightly up like a ski tip may be beneficial. Specifically, FIG. 18 shows joint 1900 comprised of first and second semispherical members 1902 and 1903. First and second members 1902 and 1903 are positioned relative to one another such that the inner edge of second member 1903 is slidably engaged with the outer edge of first member 1902. First and second members 1902 and 1903 are preferably made from low friction material. Alternatively, a friction reducing material may be used between first and second members 1902 and 1903 to enhance their movement relative to each other. First member 1902 is preferably securely fasted to pad 1906 by any known fastening means. Further, rod 1905 is used to connect first and second members 1902 and 1903 to arm 1904 (which may be part of an actuator or other device or component of a corner climber according to the invention). Rod 1905 is preferably positioned such that full circular rotation of pad 1906 is permitted. Optionally, rod 1905 may be such that no rotation of pad 1906 is permitted, or such that only partial rotation is allowed. Further, first member 1902 preferably has an opening along its length which is wide enough to have rod 1905 positioned therethrough, but which is also long enough to allow for maximum movement of second member 1903, rod 1905, and arm 1904 relative to first member 1902 and pad 1906. Of course, rod 1905 must be secured to arm 1904 and second member 1903 to provide for such movements. Variations on the spherical configuration are also possible, for example surfaces may be modified so that they are elliptical or otherwise asymmetric for alignment or load distribution purposes. Finally, any of the high friction materials described herein may be used for the surface of pad 1906.

FIG. 19 shows yet another alternate embodiment of a friction pad joint according to the invention. Specifically, shown is a linkage of two members 2001 to pad 2002 through base 2004 like the joint of FIG. 18 which also creates a remote center of rotation. It is preferred that members 2001 are rotatably connected on one end to base 2004 of pad 2002 while rotatably connected on the other end to arm 2003 of a corner climber device. Such rotatable joints can be comprised of pin joints, living hinges, or the like. The typically high normal force allows the use of bearing designs that are unidirectional in nature for most pad retention systems. The momentum produced by misalignment of the line of force resulting from such a design relative to the friction and normal force of pad 2002 using the remote center near or under the wall surface allows pad 2002 to match the surface angle of the wall and also provide a more uniform load distribution on the surface of pad 2002.

Figure 20:
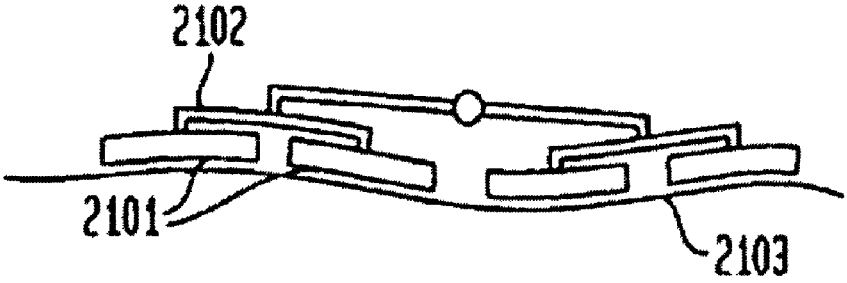
FIG. 20 depicts a top view of a conformal pad linkage for use with the present invention.

Turning next to FIG. 20, for very uneven surfaces 2103, one or a plurality of pads 2101 held on levers 2102 in a manner similar to the way a windshield wiper blade is supported to provide conformal grip capability. One or more flexible pads, similarly held, may be used to provide more accommodation of irregular surfaces 2103 than may be practical with foam backed pads. Even on flat surfaces, the design of FIG. 21 can provide more evenly distributed pad pressure and improved grip performance. However, for most applications, a simple single pad and pivot joint system or ball joint located near the surface of the pad will suffice.

Figure 21:
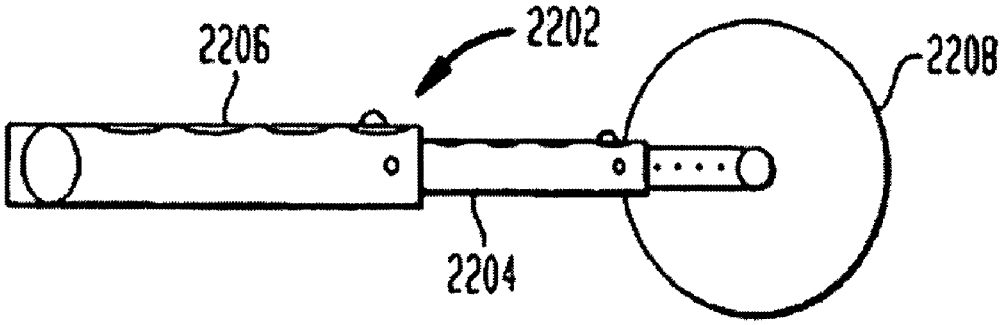
FIG. 21 depicts a telescoping arm of a corner climber in accordance with the present invention.
Figure 22:
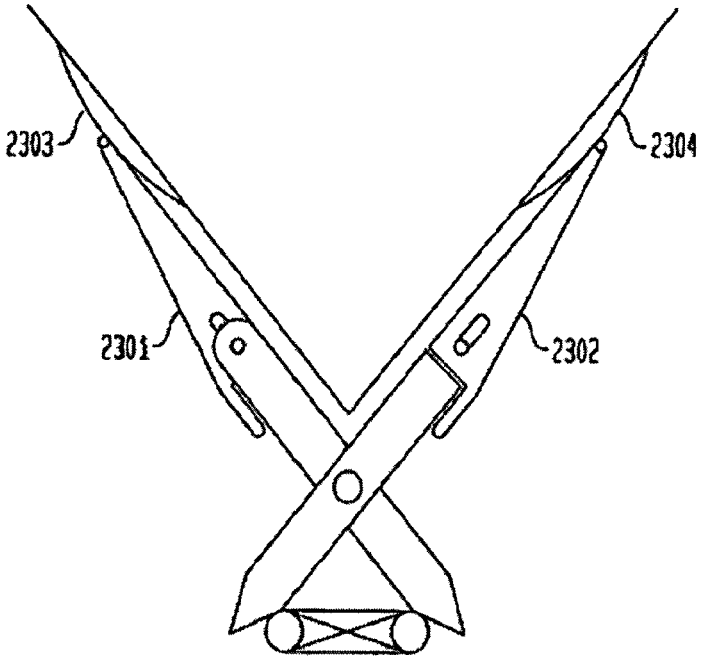
FIG. 22 depicts a top view of flippable arms of a corner climber in accordance with the present invention for use on an outside corner.
Figure 23:
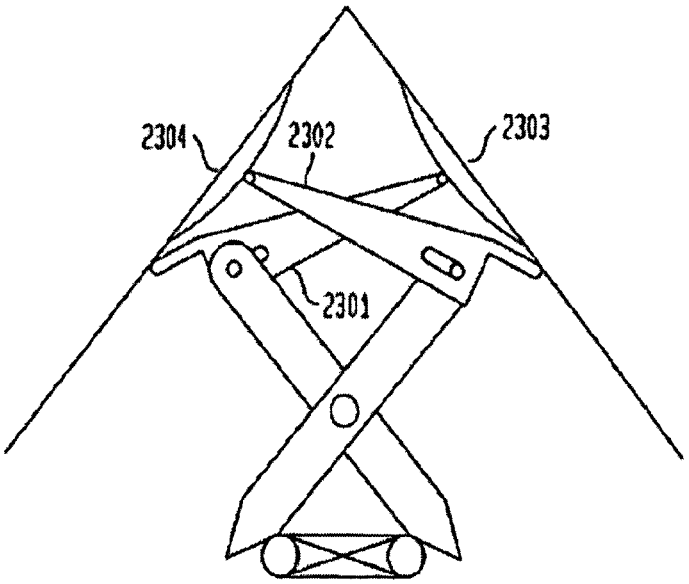
FIG. 23 depicts a top view of flippable arms of a corner climber in accordance with the present invention for use on an inside corner.

To enable use of the above described pads and pad joints in a corner climber according to the invention, they must be attached to an arm or arms, or other means of attachment. For example, a telescoping version of such an arm is shown in FIG. 21. Specifically, shown is telescoping arm 2202 comprising inner and outer tubes 2204 and 2206 slidably engaged to provide an adjustable length which provides a means of changing the location of pad 2208 and accommodating variations in corner geometry, etc. Optionally, the arm may be made automatic, for example, with a screw drive such that it may to screw in or out as required. Preferably, telescoping arm 2202 is connected to pad 2208 using one of the previously described pad joints to allow for maximum rotation of pad 2208. Additionally, non-telescoping arms may be configured with locking joints. For example, FIGS. 22 and 23 depict an embodiment of a corner climber in accordance with the invention that allows arms 2301 and 2302 to be locked in position. Then, arms 2301 and 2302 may be unlocked and repositioned flipped across body to convert from an inside to an outside corner climbing device. Such an embodiment is suitable for anthropomorphic toys, for example. Of course, it is preferred that such arms are connected to friction pads 2303 and 2304 using any of the previously described pad joints. Numerous additional embodiments of arms including arms with locking hinges or detents, arms that can be plugged and unplugged, arms with living hinges and/or compression pads, etc. Many of these additional arm embodiments are shown incorporated in various embodiments of grippers and climbers discussed herein.

Figure 24:
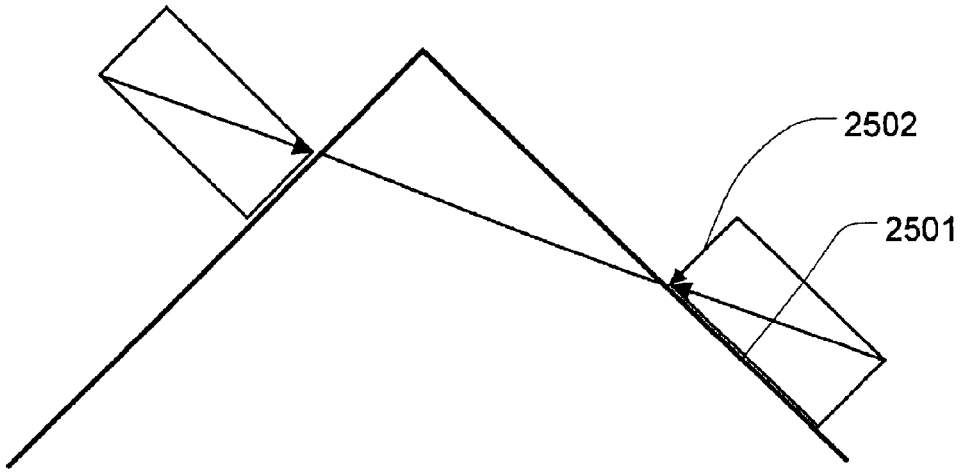
FIG. 24 is a vector diagram showing inside corner creep instability.

For any corner climber, grip stability is one of the most important considerations. For an inside corner, creep can lead to instability and loss of grip position and force. If the pads become asymmetrically (i.e., not equidistant from the corner) located such that the angle of the pad force becomes more tangent to the wall surface for one pad than for the other, as shown in FIG. 24, then the pad furthest from the corner will experience a higher surface tangent force 2501 and a reduction in the surface normal force 2502. Therefore, the outermost pad has a disadvantageous grip condition and will tend to creep faster. On an inside corner with pad creep occurring, this results in the pad positions shifting so that the condition gets worse rather than better. This phenomenon will be termed "inside corner creep instability." Thus, for inside corners, there is a need to maintain a low enough creep rate to avoid reaching a condition where the misalignment becomes so great that the grip is lost, or there is a need to correct the condition so that the inside corner creep instability ("creep instability" for short) is made stable in some way.

The inside corner creep instability can be resolved in several ways. One way to resolve the problem is simply to re-grip or move before the creep position shift becomes too large and grip is lost. If this is not practical, then there are other ways to deal with the inside corner creep instability.

Figure 25:
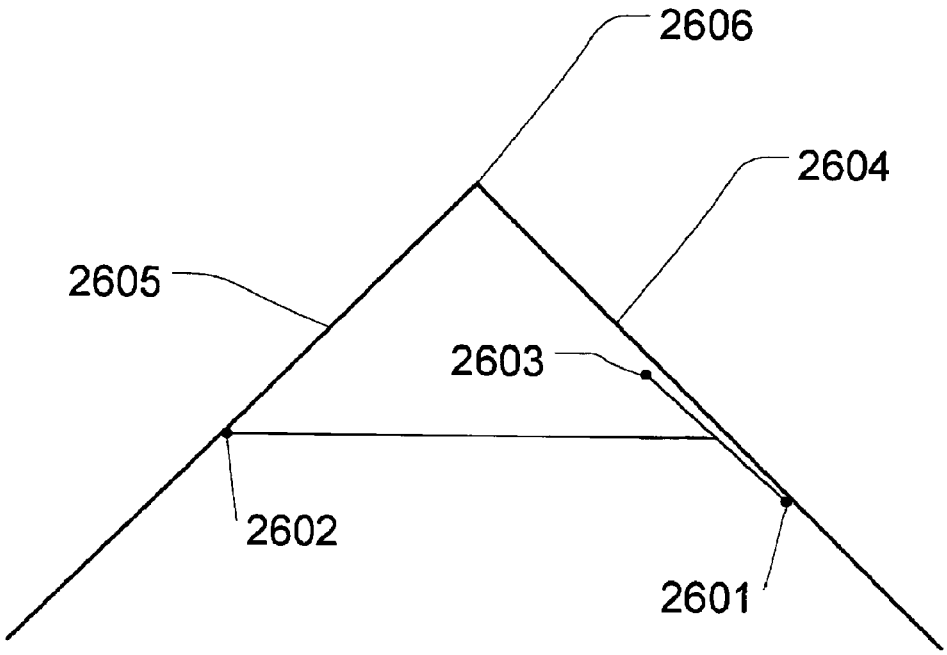
FIG. 25 depicts an inside corner creep-stabilization configuration in accordance with the present invention.
Figure 26:
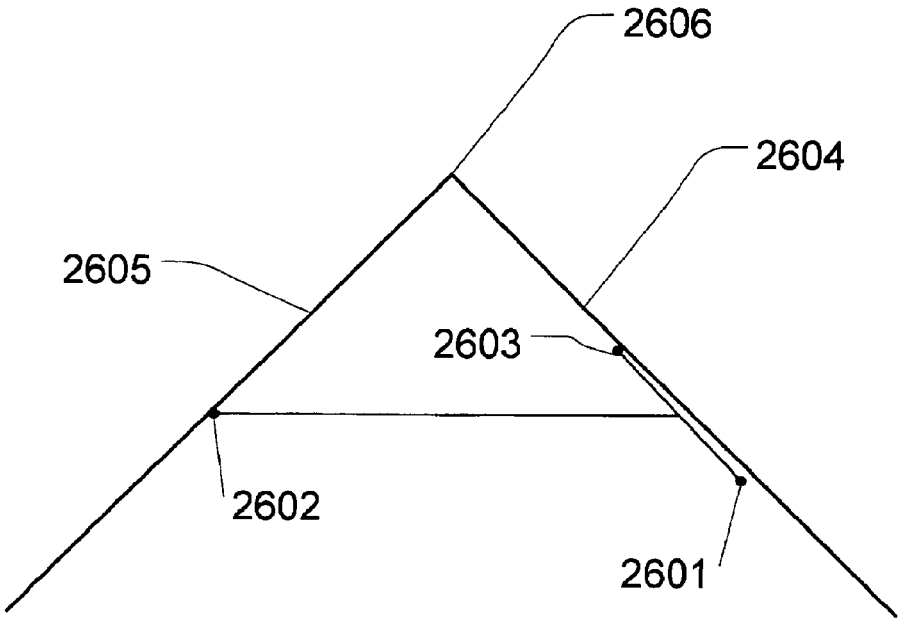
FIG. 26 depicts an inside corner creep-stabilization configuration in accordance with the present invention in opposite tilt condition from FIG. 25.

One such solution that can accommodate a substantial amount of creep on an inside corner is based on a geometric configuration of corner climber system as depicted in FIG. 25. In particular, shown is a system comprising a single left pad 2602 and both inner and outer right pads 2603 and 2601. Note that no telescoping components are shown in this diagrammatic representation despite the fact that, some means of moving pads 2601, 2602, and 2603 is required for all of the configurations used to illustrate inside corner stabilization techniques. The forces acting on the configuration shown in FIG. 25 correspond to those in the diagram of FIG. 24. As shown in FIG. 25, outer right pad 2601 is in contact with the wall 2604. Outer right pad 2601 will tend to creep faster than the left 2602 because it is further from corner 2606. When the creep occurs, inner right pad 2603 comes into contact with wall 2604. If creep were to continue to occur primarily on the right side, inner right pad 2603 would come completely in contact with wall 2604 while outer right pad 2601 becomes completely removed from wall 2604, as shown in FIG. 26. In that position, left pad 2602 is now further from corner 2606 than inner right pad 2603. The primary slip would then occur on the left side. Thus, as long as the system stays in a suitable range of operation, this geometry is now stable to creep in inside corners and in fact the pads do not typically leave the wall surface, but said self alignment generally occurs through variations in load sharing among the pads.

The same type of instability can also occur when the corner climbers are tilted relative to the horizontal. In this case, the lower pad will tend to creep more. Similarly, using a pad whose vertical length is greater than its horizontal length or two pads spaced vertically can stabilize such a system. Generally, the horizontal destabilizing effect is small relative to other effects and can be ignored.

Figure 27:
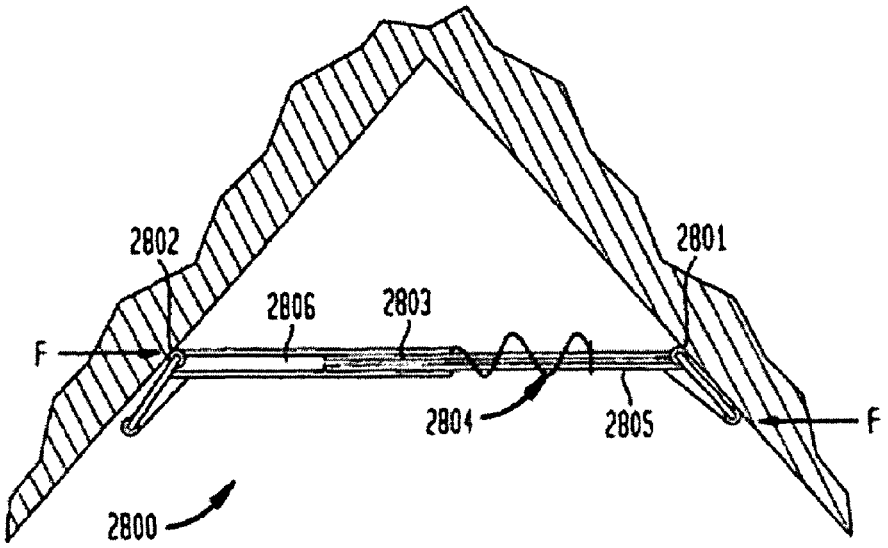
FIG. 27 depicts a "stiff pad" (or four pad) stabilization configuration in accordance with the present invention.

Stability in an inside corner can be achieved based on the same geometric arrangement just described over a limited range by utilizing stiff pad-to-structure joints 2802 and large pads 2801 as shown in the pad system of FIG. 27. Here, prismatically shaped arm 2803 is telescoping having inner arm 2805 and outer arm 2806. Arm 2803 is also spring loaded with spring 2804. If pads 2801 are large and conformal, then the prismatic feature can be eliminated since the high friction of pads 2801 can reliably prevent rotation of pad system 2800. The prismatic joint feature makes the configuration of FIG. 27 more reliable.

Figure 28:
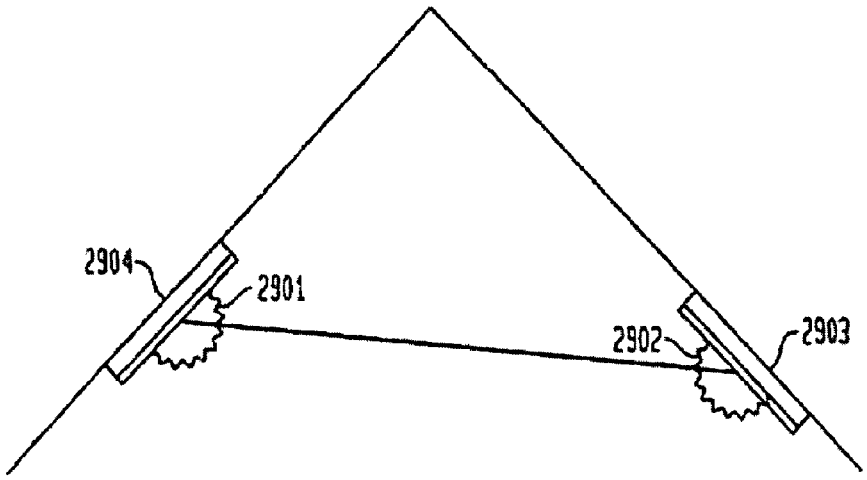
FIG. 28 depicts a spring-based stabilizer for use with the present invention.

However, stiff joints or locking joints may be impractical, especially if the wall is uneven to the point that that the angle changes with creep motion. FIG. 28 illustrates a configuration in which springs 2901 and 2902 are used to accommodate variations in the angle of pads 2903 and 2904 and still provide some stabilization against inside corner creep instability. Springs 2901 and 2902 are mounted such that they provide increased force as the angles of pads 2903 and 2904 change from neutral (or flat against the wall) so that the force shifts in a suitable manner.

Some materials are able to "stick" to a flat wall when they are lightly loaded. Therefore, a very light system might achieve grip and climb without utilizing corners. Adhesives, tape, magnets, or suction techniques might be applied to grip and climb flat walls. The capability to stick to flat walls may greatly assist application and uses of the device and aid the overall mobility of a corner climber according to the invention by making it easy to move from one corner section to another.

Still another option in joint configuration for the corner climber of the invention is a joint that maintains some stiffness while having some flexibility so that it may accommodate wall angle variations, but will also support the shifting of the load distribution on the friction pads enough to provide a restoring torque. Another alternative joint configuration is to utilize a joint that is adjustable or lockable. For example, a slightly loose ball and socket joint having a rough surface finish may be used so that when the friction pads are not loaded the pads are free to tilt to match the wall surface. Conversely, when the joints are loaded, they will lock up and provide enhanced stability. Optionally, a friction pad support outer joint spring that holds the pad lightly at or near the optimum wall angle may make positioning of the full pad simpler. Such a support spring may include a foam piece positioned over the joint but between the pads and telescoping tubes such that it pushes the pads out into the proper orientation. The support spring may also release a self-locking ball joint so that it pivots easily to match the wall angle as the corner climber is reengaged. Numerous additional options are possible with the joint configurations described herein such that they may be applied to many of the alternative embodiments of the corner climber described herein. Also note that when creep is not significant, there may be no need for features that correct for the creep instability.

Figure 29:
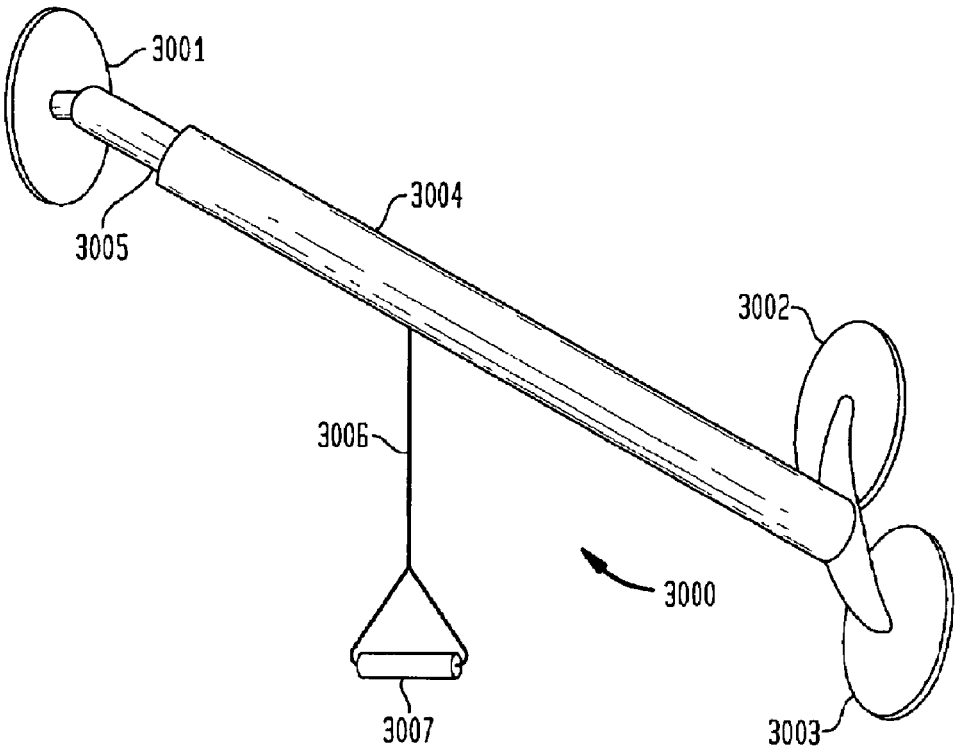
FIG. 29 depicts a three-pad stabilization arrangement with an internal extension system in accordance with the present invention.

Turning next to FIG. 29, depicted is a three-pad stabilization arrangement 3000 of a corner climber in accordance with an alternate embodiment of the invention similar to that of FIG. 5. Here, however, the pulley assembly is mounted internal to inner and outer tubes 3005 and 3004 (only actuator 3006 and stirrup 3007. are shown). Three-pad arrangement 3000 comprises left pad 3001 unchanged from the design of FIG. 5, as well as both an inner right pad 3002 and an outer right pad 3003 (replacing the single right pad 504 of FIG. 5). Such a pad design is used to provide increased inside corner creep stability as discussed with respect to FIGS. 25 and 26. Pad arrangement 3000 provides stability to displacements created by creep of pads 3001, 3002 and 3003 in the manner previously described. Alternatively, a single long pad may be substituted for pads 3003 and 3002. Also, multiple pads may be used to provide better conformation to wall surface variations and enhance stability. Of course, dual-pad arrangement of pads 3002 and 3003 could also be made on the left side instead, or even on both sides. Optionally, more pads (or extended pads) can be added in the vertical direction of the figures to enhance stability in that direction as well. Note that for inside corner climbing the stability in the vertical direction suffers from a similar effect to that previously described relating to the shift in the wall angle with creep. When creep is low enough or can be eliminated, the special features associated with creep instability may be unnecessary and might be eliminated or disabled.

The inside corner climbers described to this point all use an actuation line to apply pressure to the friction pads. Optionally, this line may be clamped (or secured) to maintain the position of the device. Alternatively, a spring may be used to maintain the line tension over some range to minimize or prevent creep. Another alternative is to use a spring to apply a clamp force to the pads and an actuation line to release the clamp force from the pads. This is accomplished by using a spring to extend the tubes and arranging the block and tackle system to pull the pads closer together against the spring force. This might be advantageous when it is desired to set and/or maintain a strong clamp force without pulling the actuation line. Utilizing a tube lock and release system such as a ratchet arrangement (which may replace the actuation line), the tubes could be compressed against the spring and the compressed position of the tubes held by the lock system while the clamp system is positioned. Once positioned, the tubes would be released so that the clamp is achieved using the stored spring energy. If it is desired to reposition the clamp, to climb for instance, then the ratchet can be used to disengage and lock the clamp. The clamp can then be repositioned and the lock released again to provide clamping with the spring force. Thus, it is possible to store most of the energy required for gripping before starting the climb. As the climb progresses, the clamp would gradually extend if creep were large, but steps could be taken long before the climber would have to reload the spring. This concept can be applied to many of the embodiments for inside and outside corner clamps/climbers that follow.

Figure 30:
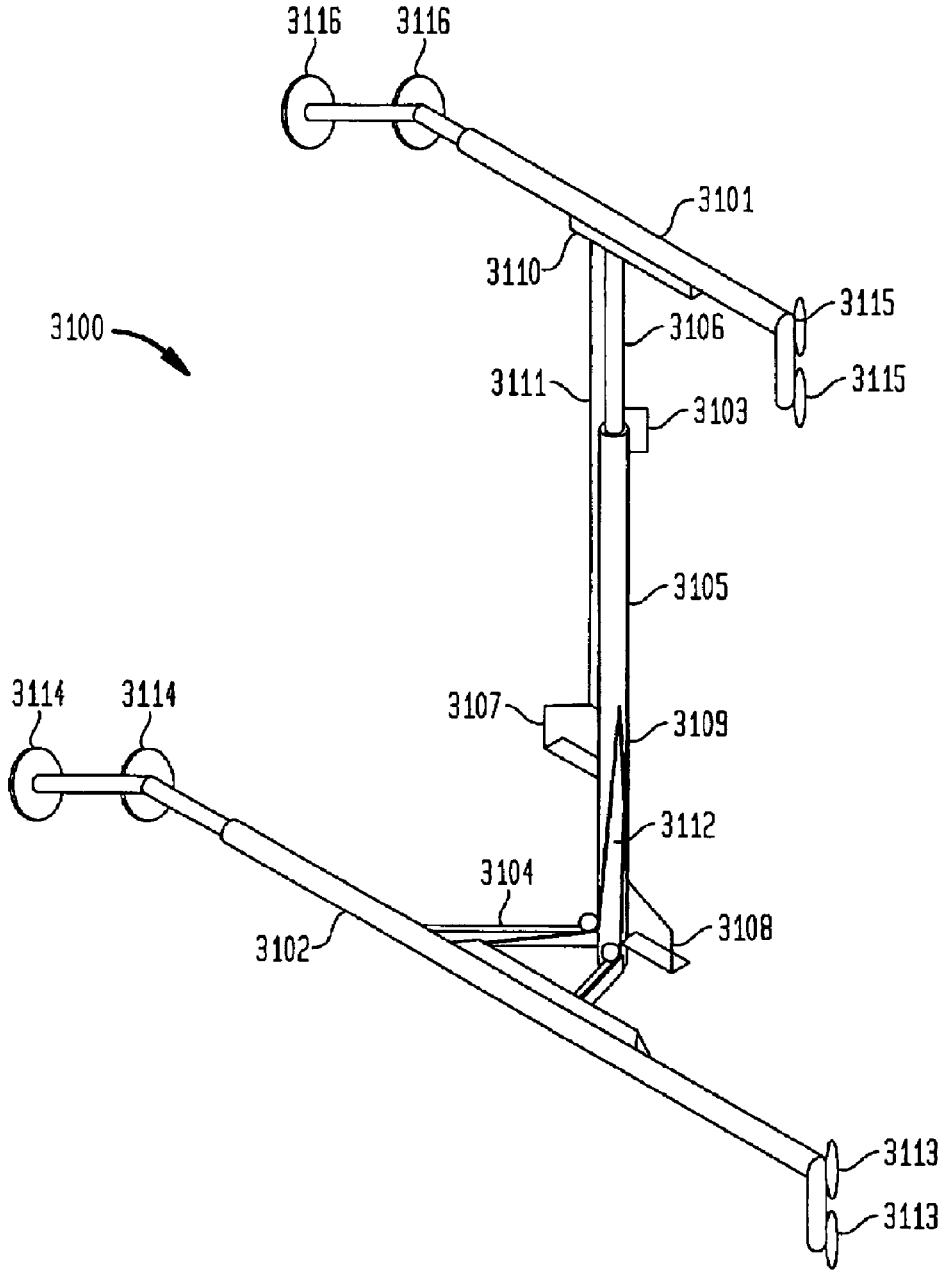
FIG. 30 depicts a human-operated inside corner "spider climber" in accordance with an alternative embodiment of the present invention.

Referring now to FIG. 30, shown is human-operated inside corner spider climber 3100. Spider climber 3100 utilizes four-pad-stabilized clamp assemblies 3101 and 3102 connected together via vertical telescoping rod assembly 3103. This four-pad stabilized embodiment is shown rather than the three-pad stabilized embodiment because symmetry makes the geometry easier to visualize. Lower 3102 and upper 3101 horizontal clamp assemblies preferably use prismatic telescoping tube assemblies similar to that shown in FIG. 27. Upper and lower clamp assemblies 3101 and 3102 are joined by a vertical telescoping rod assembly 3103 comprising inner tube 3106 and outer tube 3105 which are slidably engaged. Specifically, the outer tube of the lower telescoping clamp assembly 3102 is mounted to a bracket 3104, which is attached to outer tube 3105 of rod assembly 3103. Similarly, the outer tube of the upper telescoping clamp assembly 3101 is mounted to inner tube 3106 and a bracket 3110.

An upper clamp actuation stirrup 3107 and lower clamp actuation stirrup 3108 are slidably mounted to the outer tube 3105. Stirrup 3107 is attached to upper clamp assembly 3101 via actuation line 3111. Clamp actuation line 3112 connects stirrup 3108 to lower clamp assembly 3102. First actuation line 3112 runs from stirrup 3108 to pulley 3109. Then, actuation line 3112 runs down to lower clamp assembly 3102. Optionally, intentional or controlled free play may be built into vertical telescoping rod assembly 3103 and/or some of the pad joints to allow compliance and adjustment of the angles of each of the pads as climbing proceeds. Also, expansion and/or compression of telescoping rod assembly 3103 may be manually controlled during use, or optionally may be locked in one position.

This embodiment of the human operated inside corner spider climber 3100 is operated by first placing system 3100 into an inside corner. Lower clamp stirrup 3108 is first raised while lower clamp assembly 3102 is positioned in the inside corner. The same process is repeated with stirrup 3107 such that upper clamp assembly 3101 may also be positioned in the inside corner. The user then places one foot on lower clamp stirrup 3108, which secure lower clamp 3102 in the corner through the force exerted by pads 3113 and 3114 on the wall surfaces. Next, the user extends telescoping tube 3103 by pushing upward on upper clamp assembly 3101. The user then pushes upper clamp assembly 3101 into the corner, and shifts their weight to upper clamp stirrup 3107 to secure upper clamp assembly 3101 in the corner. Then, the user raises the foot in lower clamp stirrup 3108, to release lower clamp assembly 3102 from the corner and raises lower clamp assembly 3102 to a new position in the corner. The user then shifts their weight back to lower clamp stirrup 3108 to secure lower clamp assembly 3102 in the corner at its new position. At this point the lower clamp assembly has moved up the wall, and upper clamp assembly 3101 is then released by releasing all pressure on upper clamp stirrup 3107. Again, upper clamp assembly 3101 is repositioned (at a higher point for ascending) and secured. Now, both the upper clamp assembly 3101 and lower clamp assembly 3102 have been moved up the inside corner. The stepping and moving process is repeated to climb up the inside corner. Of course, the corner can be descended by repeating the process but moving upper and lower clamp assemblies 3101 and 3102 down instead of up.

Optionally, there are enhancements to enable upper and lower clamp assemblies 3101 and 3102 to be secured while stirrups 3107 and 3108 are released during climbing that are described in greater detail below. Also, the human operated inside corner climber 3100 can utilize a block and tackle arrangement or similar means to assist with motion of vertical telescoping rod assembly 3103. Such an arrangement may include a means of latching and releasing inner and outer tubes 3106 and 3105 so that each new position is held for ease of operation. It is also advantageous to use a three-pad clamp arrangement (as shown in FIG. 29) for each clamp assembly 3102 and 3101 rather than the four-pad arrangement shown. The three-pad clamp arrangement is simpler and lighter and may eliminate the need for prismatic joints on the inner tubes of the clamp assemblies.

Operation of inside spider climber 3100 of FIG. 30 has some important features. When climbing it is important to maintain vertical stability and regain sufficient grip with each step. For example, the design shown in FIG. 30 depicts upper clamp assembly 3101 as being of smaller span than lower clamp assembly 3102. This allows the user position his body, and thus the system's center of gravity, both vertically and horizontally between lower pads 3113 and 3114 and upper pads 3115 and 3116 are released. Thus, when upper pads 3115 and 3116 are released, upper clamp assembly 3101 will fall into the corner since the weight of the user is positioned closer to the corner than lower clamp assembly 3102. This serves to prevent the user and spider climber 3100 from falling away from the corner when upper clamp assembly 3101 is released and maintains the grippers position deep in the corner where there is a greater ability accommodate creep of pads 3113-3116.

Similarly, when lower clamp assembly 3102 is released, the weight of the user is further from the corner than upper clamp assembly 3101 and upper pads 3115 and 3116. Thus, lower clamp assembly 3102 will swing towards the corner. Preferably, lower clamp assembly 3102 may be held at a minimum length to prevent the lower clamp from moving too far in. Otherwise, spider climber 3100 may swing into a position which places the center of gravity further from corner than the lower clamp assembly 3102 resulting in spider climber 3100 and its user falling away from the corner. Alternatively, this problem may be eliminated if the user moves to adjust the center of gravity as needed.

Figure 31:
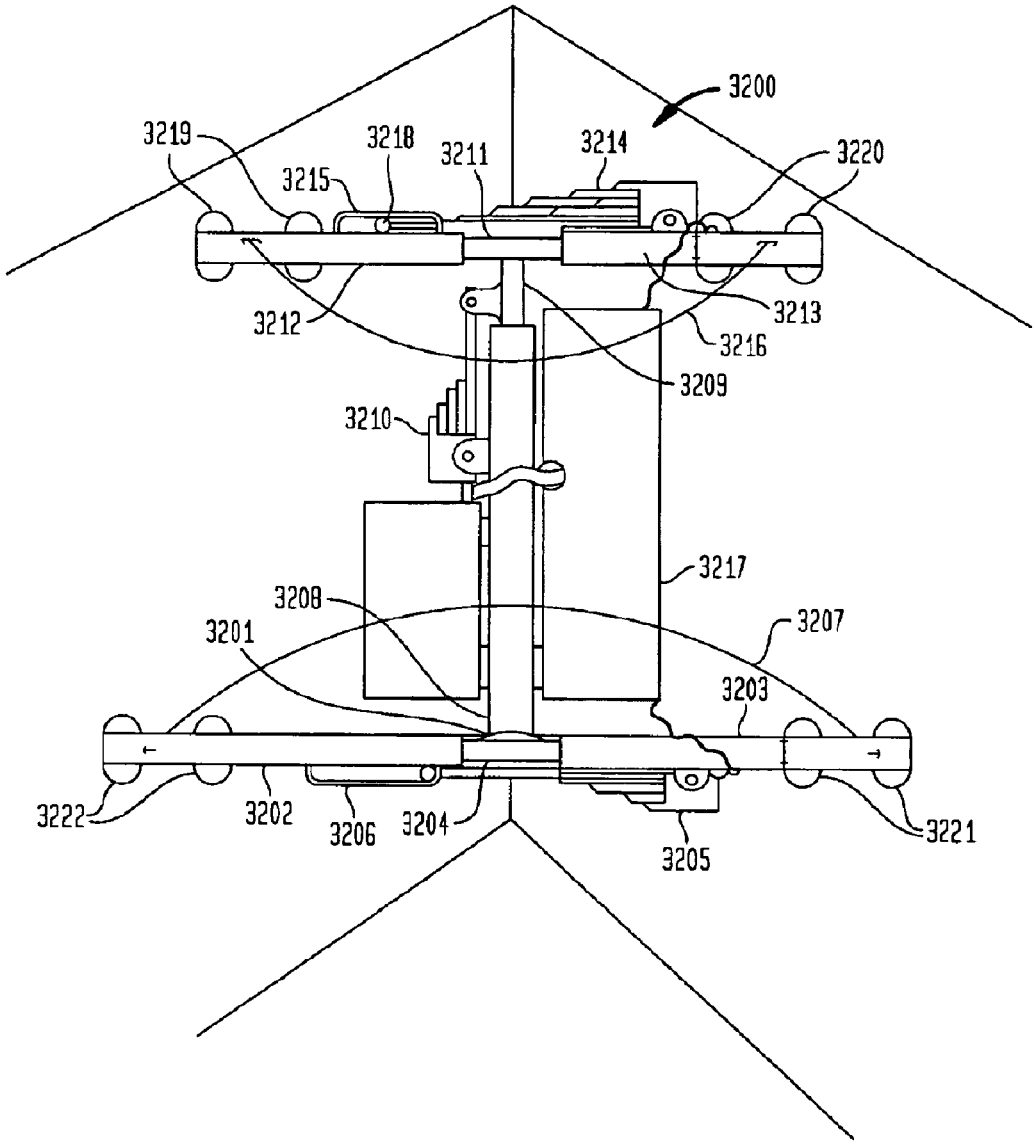
FIG. 31 depicts an automated "spider robot" climber in accordance with an alternative embodiment of the present invention for use in climbing inside corners.

A robotic spider climber 3200 for inside corners is shown in FIG. 31. Here, spider climber 3200 utilizes the basic configuration of human operated inside spider climber 3100 of FIG. 30. FIG. 31 shows a plan view of spider robot 3200 as it is positioned in an inside corner.

In spider robot climber 3200, features are added to replace the actions of the human in human spider climber 3100 of FIG. 30. The basic configuration of the upper and lower clamp assemblies differs from previously described assemblies in that telescoping clamp tubes 3202 and 3203 slide prismatically and telescopically on both ends of inner clamp guide tube 3204 while tubes 3212 and 3213 slide prismatically and telescopically on inner tube 3211. The bracket 3201 is mounted on inner tube 3204 (similar to bracket 3103 of FIG. 30). Lower clamping actuator 3205 is mounted to both left and right outer tubes 3202 and 3203 to control the expansion and contraction of the lower clamp. One end of the clamping actuator 3205 is constrained by slider bearing 3206 such that clamping actuator 3205 has a limited range of movement. A lower clamp spring 3207 is mounted to left clamp tube 3202 and to right clamp tube 3205.

A lower vertical strut 3208 is mounted on bracket 3201 and has upper vertical strut 3209 telescopically positioned therein such that they are slidably engaged. Vertical strut actuator 3210 is connected to both lower strut 3208 and upper strut 3209 and controls the movement of strut 3209 with respect to strut 3208, and consequently controls the ascent or descent of spider robot 3200. Similar to the lower clamp assembly, upper clamp tubes 3212 and 3213 slide prismatically on both ends of inner clamp guide tube 3211 which is mounted to the upper end of upper vertical strut 3209. Also, upper clamping actuator 3214 is mounted to the left and right outer tubes 3212 and 3213 similar to lower clamping actuator 3205. One end of clamping actuator 3214 is constrained by slider bearing 3215 on left clamp tube 3212 such that clamping actuator 3205 has a limited range of movement. Also, upper clamp spring 3216 is mounted to left clamp tube 3212 and right clamp tube 3213. Finally, power source and/or battery/control/payload module 3217 is mounted on the lower vertical strut 3208 to supply the necessary power to actuators 3205, 3210 and 3214.

During operation, vertical strut actuator 3210 can extend and retract the upper vertical strut 3209 relative to the lower vertical strut 3208. This allows the upper and lower clamp assemblies to be raised and lowered relative to each other and thereby raise and lower spider robot 3200. The lower clamp spring 3207 provides the clamp force for the lower clamp system and the lower clamping actuator 3205 allows the clamp to be released by pulling the left and right clamp tubes 3202 and 3203 together. The end of the clamping actuator 3205 is connected to limited throw slider 3206. When the clamping actuator 3205 is activated, as is shown in FIG. 31 for lower actuator 3205 and slider 3206, slider 3206 is pulled to the end of its range of motion such that the lower clamp assembly is retracted against the force of clamp spring 3207. When the clamping actuator 3205 is not pulling tubes 3202 and 3203 together, the lower clamp assembly is free to move under the influence of clamp spring 3207. This free-to-clamp-under-spring-force actuator and slider position 3218 is shown for the upper clamp assembly where upper clamping actuator 3214 and upper clamp slider 3215 are shown with free play within slider 3215. When there is free play in slider 3215 (or 3206), clamp spring 3216 (or 3207) pushes the grip pads 3219-3220 (or 3221-3222) apart and against the walls of the inside corner.

Climbing is performed by placing spider robot 3200 in an inside corner with clamping actuators 3205 and 3214 activated, then releasing clamping actuators 3205 and 3214 so that clamp springs 3207 and 3216 cause pads 3219-3222 to engage the walls of the corner. To climb, the upper clamp assembly is released by activating upper clamping actuator 3214. Then vertical strut actuator 3210 extends telescoping tubes 3208 and 3209 to raise the upper clamp assembly to a new position. Because the center of gravity is horizontally between the upper and lower clamp assemblies, the upper clamp tends to fall into the corner. When vertical actuator 3210 has fully extended tubes 3208 and 3209 (i.e., it has reached the top of its stroke cycle), upper clamping actuator 3214 is released so that the force from the spring 3216 again presses pads 3219-3220 of the upper clamp assembly against the walls of the corner and grip is obtained. Next, the lower clamping actuator 3205 is activated to release pads 3221-3222 of the lower clamp assembly from the walls so that the vertical strut actuator 3210 can be retracted to raise lower vertical strut 3208, payload module 3217 and the lower clamp assembly to a new position. The lower clamp assembly also swings towards the corner because the center of gravity is horizontally between the upper and lower clamps. The function of the center of gravity was described in more detail in the description of the human spider inside corner robot with respect to FIG. 30. Finally, the lower clamp assembly is re-engaged with the walls of the corner by extending lower clamping actuator 3205 so that the force from spring 3207 again presses pads 3221-3222 apart and against the walls. This stepping process is repeated to continue upwards or reversed to climb downward.

The actuators on which inside spider robot of 3200 is based can be made from shape memory alloy or can be any actuator capable of extending and retracting the telescoping tubes and grippers. Examples of integrated actuators utilizing shape memory alloy are available from NanoMuscle, Inc. These actuators may require spring biasing for extension tasks such as the vertical stroke actuator. These actuators are referenced because they are very small and light.

Nevertheless, many other types of actuators could be used for this embodiment of the invention.

Inside corner spider robot 3200 may also be built with many variations. In practice, vertical strut actuator 3210 would likely be mounted directly above or below the vertical strut. Similarly, battery/payload/control modules 3217 may be mounted in other places, noting, of course, that replacement of these components will likely shift the center of gravity of the robot. The left and right sliding struts provide symmetry, but can be replaced with the same basic configuration as shown in FIG. 30 for reduced complexity. The actuators may be of any type and the role of the actuator and clamp spring can be reversed and/or combined. Orientation of the inner and outer tubes may also be reversed.

The symmetric design present in FIG. 31 allows for symmetrical motions. A position maintaining system might be beneficial for inner tube 3204 and/or 3211 if centering thereof is desired. This could be as simple as making the spring a double bow spring with the center of the spring constrained to the center strut. Such a constraint would maintain symmetry. A gear and rack system could also be used to enforce centering if desired. Many variations are possible including adding degrees of freedom and/or clamp systems.

Optionally, the inside corner climber robot 3200 of FIG. 31 may be modified to operate in a wall-to-ceiling corner by modifying the device such that a good grip position may be achieved when stepping. There are several ways of achieving this objective, which are described below, while others are described or can be derived from and/or combined with other embodiments of the invention, for instance, including the use of a tail. A simple way to provide for a high moment capacity for climbing wall-to-ceiling corners is the use of a wide pad geometry that can support the robot even when one end is released. Multiple clamps or even a plurality of robots attached to make a snake that can support an overhung load would also provide a means of transitioning from one type of corner to another. Then, when one end of the climber is released, the other grips are able to support it.

Figure 32:
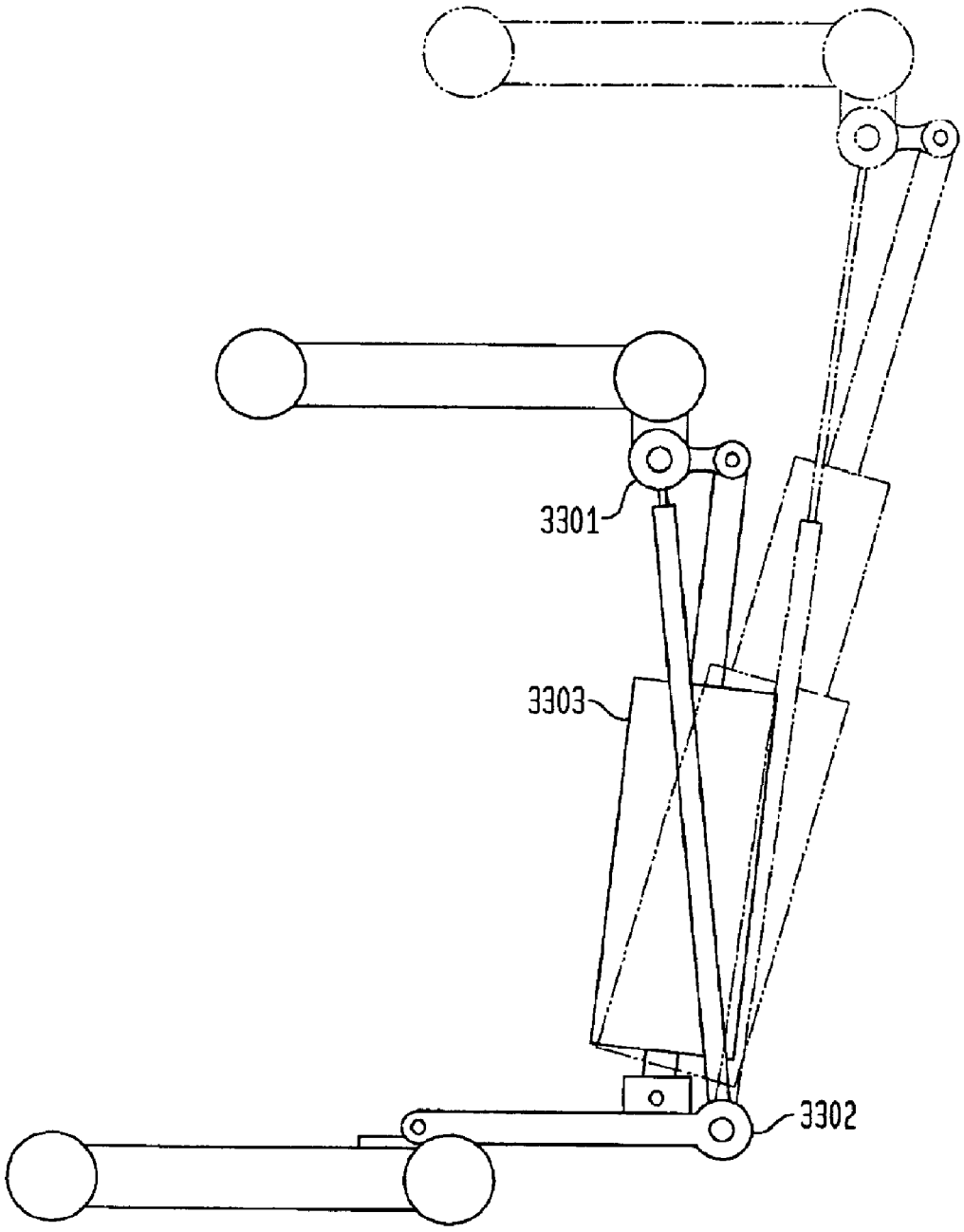
FIG. 32 depicts a z-bend extender for use in the "spider robot" climber of FIG. 31 as an active means of pushing each new grip into a corner with the edition of limited angle hinges attached to the vertical strut actuator.

An active means of pushing each new grip into the corner before clamping can further enhance the climbing ability and security. For example, FIG. 32 illustrates an active means of pushing each new grip into the corner by adding limited angle hinges 3301 and 3302 and attaching vertical strut actuator 3303 on opposite sides of the hinge 3301 and 3302. This design produces an in/out of corner motion in addition to the change in length required for climbing. The position of the system is depicted with solid lines in its minimum length condition and with dashed lines in its extended position. This mechanism forces the gripper to reach into the corner at the end of each stroke while moving forward. The position of the pivots can also be shifted to reverse direction. A similar concept based on cams (not shown) would add a cam and follower to the extension of the strut so that the strut moves first away from and then towards the corner. The cam surface and follower would allow reversing direction and various motions to be made during the stroke to provide extra pad clearance and/or to move a payload/counterweight system and/or to change the view of a camera, etc. Other variations that achieve the desired objectives are provided in the descriptions of the numerous inside and outside corner embodiments that follow.

Figure 33:
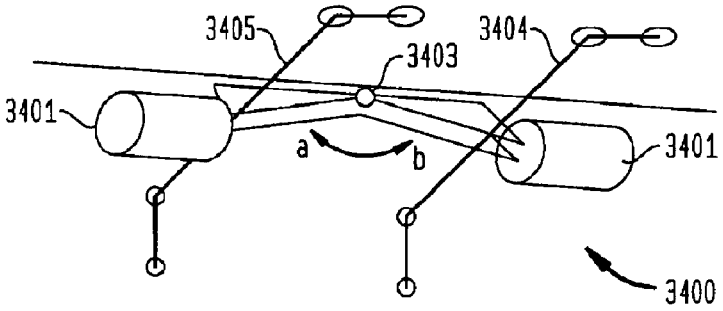
FIG. 33 depicts a system according to the present invention for shifting the center of gravity while climbing.

Turning next to FIG. 33, illustrated is a center of gravity shifting system 3400 for assisting gripping while climbing. The payload, power source/batteries, control system and similar components would be mounted in one or more movable pods 3401. FIG. 33 depicts two configurations. That is, there is only one pod which can be in either position (a) or position (b) or in between. When pod 3401 is halfway between each position shown, the center of gravity is located near the center of the robot. If pod 3401 is rotated about its mounting point 3403 toward one end, then the center of gravity is shifted. When the center of gravity is entirely in front of the robot (position (a)), then rear clamp 3404 can be released and repositioned to take a step and/or re-grip. Shifting pod 3401 behind the clamp 3404 (position (b)) allows the front clamp 3405 to move and/or re-grip. An alternative design includes more than one pod 3401 that are individual pods. Then, when each pod is positioned as shown with one over each end of the robot, the center of gravity is located near the center of the robot. If one of the pods is then rotated about mounting point 3403 toward the other pod, then the center of gravity is shifted to allow movement and repositioning of the clamps. Thus, the shifting of the center of gravity can facilitate operation as described previously. Similar mass shifting configurations can be based on linear sliders an/or the motion can be coupled to one of the actuators, such as the extension actuator, to tie the center of gravity shifting to the motion of the robot automatically. The center of gravity shifting concept can be applied to climbing corners at any orientation and provides great flexibility in the use of the robot. A human climber, by controlling his position relative to the clamps, can also climb a variety of corner orientations using this shifting of the center of gravity.

Transitioning from a vertical corner between two walls to a wall-to-ceiling corner can be done easily by a human using simple clamps. The user can hang from one (or more) clamps while placing one (or more) other clamps into the other corner. The spider robot can be provided additional degrees of freedom to bend and rotate the lead gripper to change from a wall-to-wall corner to a ceiling-to wall corner. As an alternative, two or more spider robots can be linked together by articulated joints that allow one or more spiders to hold in one corner while the lead spider is reoriented to the new corner geometry. Once in place, the lead spider can then support a trailing spider while it is positioned in the corner. These options require additional degrees of freedom in the linkage between the robots.

Figure 34A:
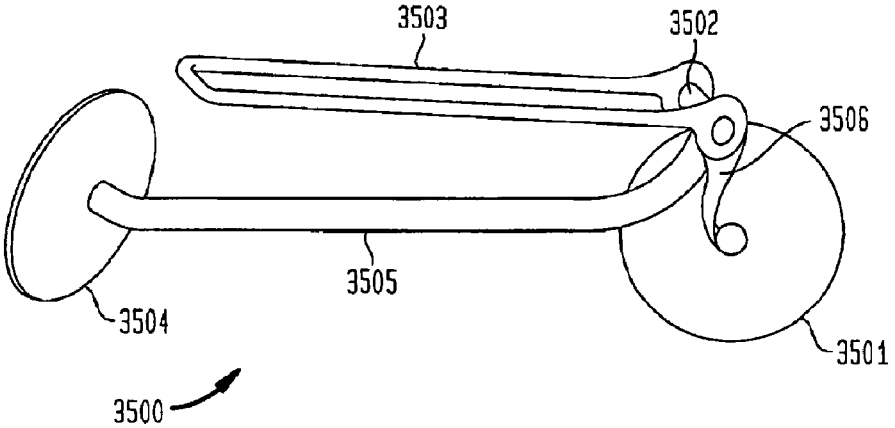
FIG. 34A depicts a simple lever clamp in accordance with another alternative embodiment of the present invention.
Figure 34B:
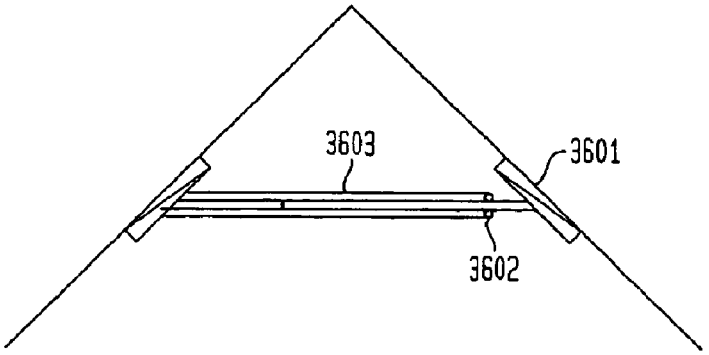
FIG. 34B depicts a top view of the simple lever clamp shown in FIG. 34A.

Referring now to FIG. 34A, shown is an alternative embodiment for a simple clamp 3500 for climbing inside corners. Specifically, shown is clamp 3500 comprising pads 3501 and 3504, connecting rod 3505, lever 3503, and pivot 3502. The length link 3506 from pad 3501 to pivot 3502 relative to the length of the grip point on lever 3503 to pivot 3502 provides a clamp force to lever force ratio. Experiments demonstrate that a 3:1 ratio is adequate for Dycem® pads on many surfaces. FIG. 34B shows a top view of simple clamp 3500 of FIG. 34A in a clamped position within an inside corner.

Figure 35A:
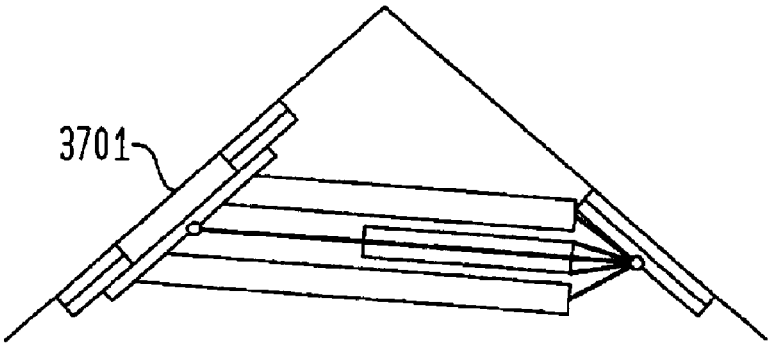
FIG. 35A depicts a top view of a clamp with increased creep stability in accordance with another embodiment of the present invention.
Figure 35B:
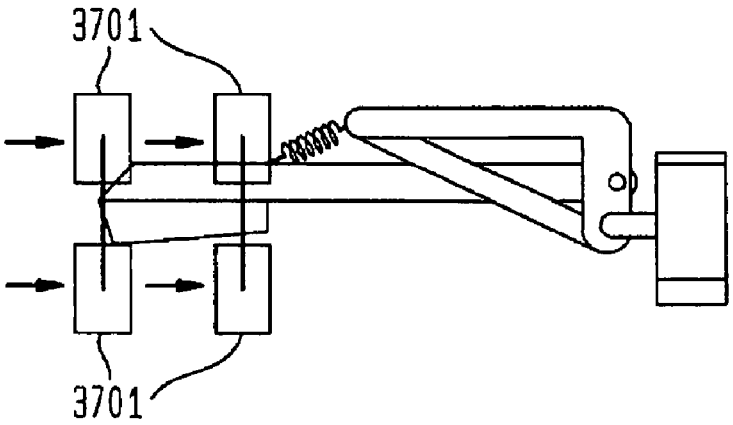
FIG. 35B depicts a bottom view of the clamp of FIG. 35A.

A similar clamp is shown in FIG. 35A having enhanced creep stability, as discussed previously. As shown in the top of FIG. 35A, left side grip system 3701 includes multiple pads in accordance with the embodiment disclosed in FIGS. 25-26. FIG. 35B shows a perspective side view of the device of FIG. 35A which provides enhanced creep stability with left side grip system 3701.

Figure 36:
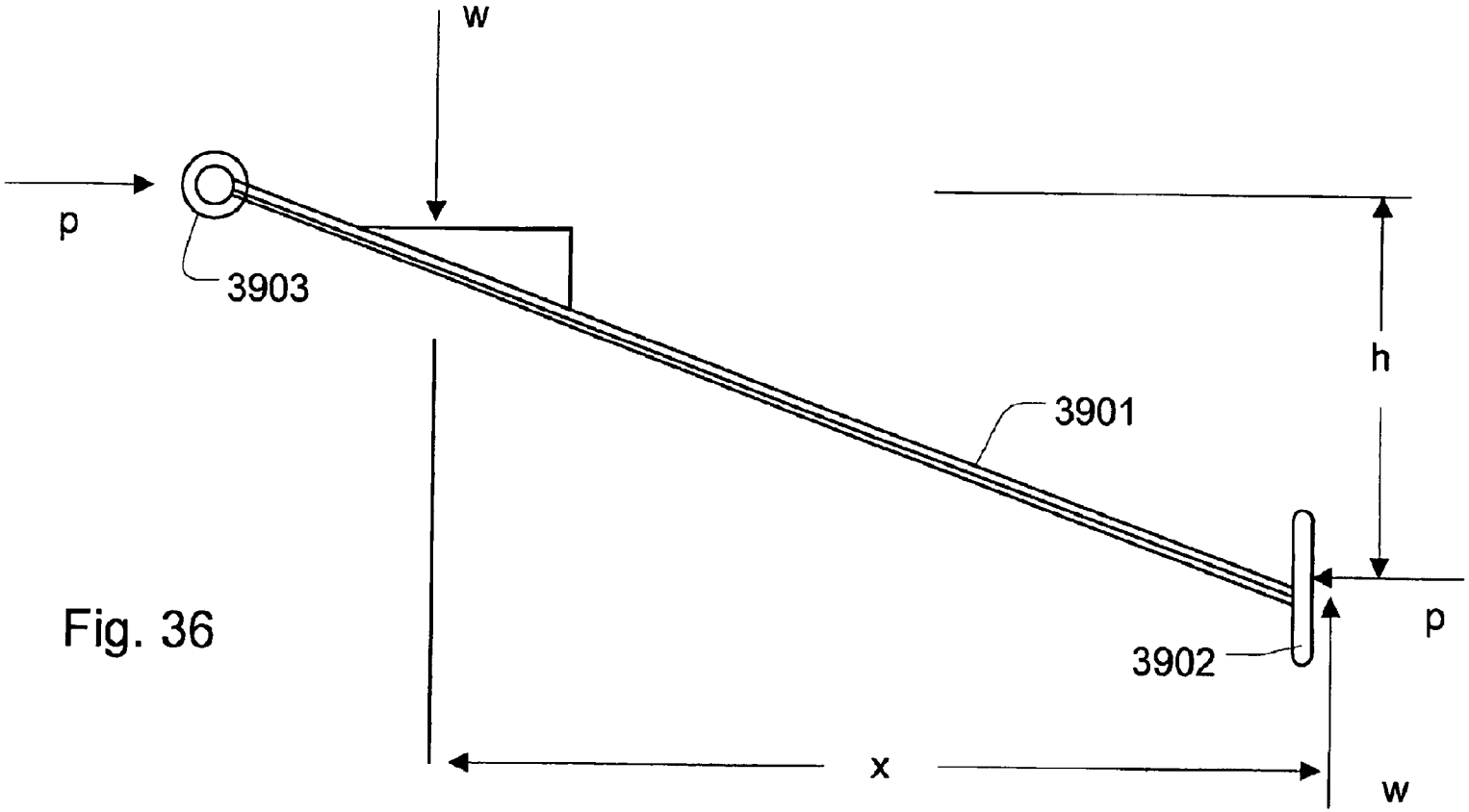
FIG. 36 depicts yet another alternate embodiment of a corner climber in accordance with the present invention, having an arm with a stationary pad and a rolling element pad.
Figure 37:
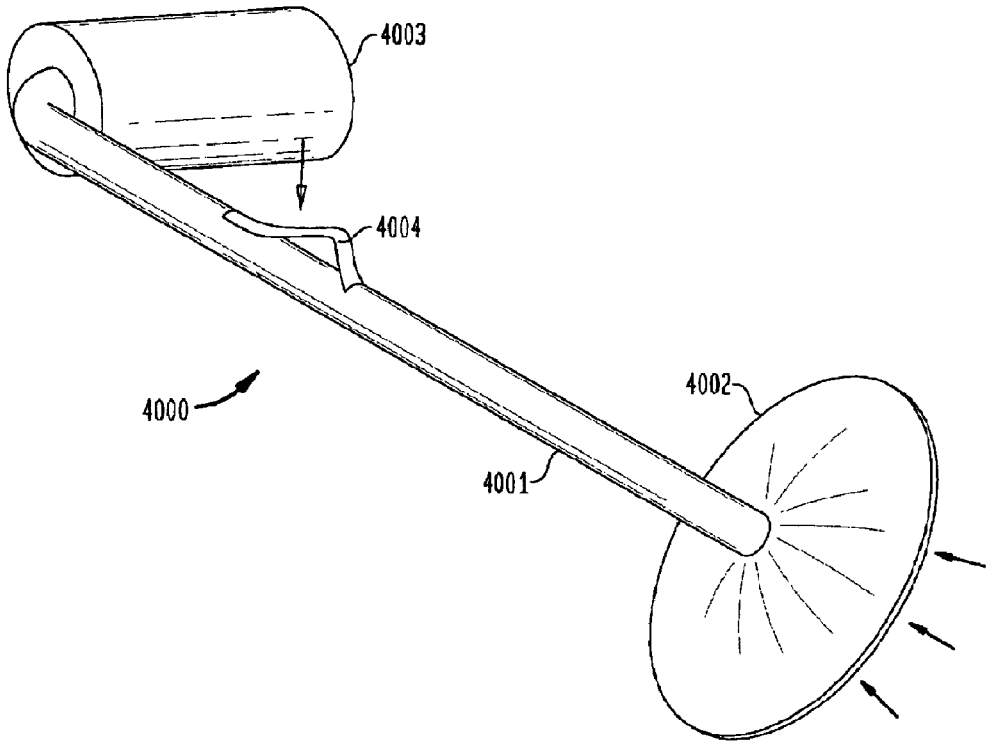
FIG. 37 depicts a perspective view of another alternative embodiment of a corner climber in accordance with the present invention having an arm with a stationary pad and a rolling element pad.
Figure 38:
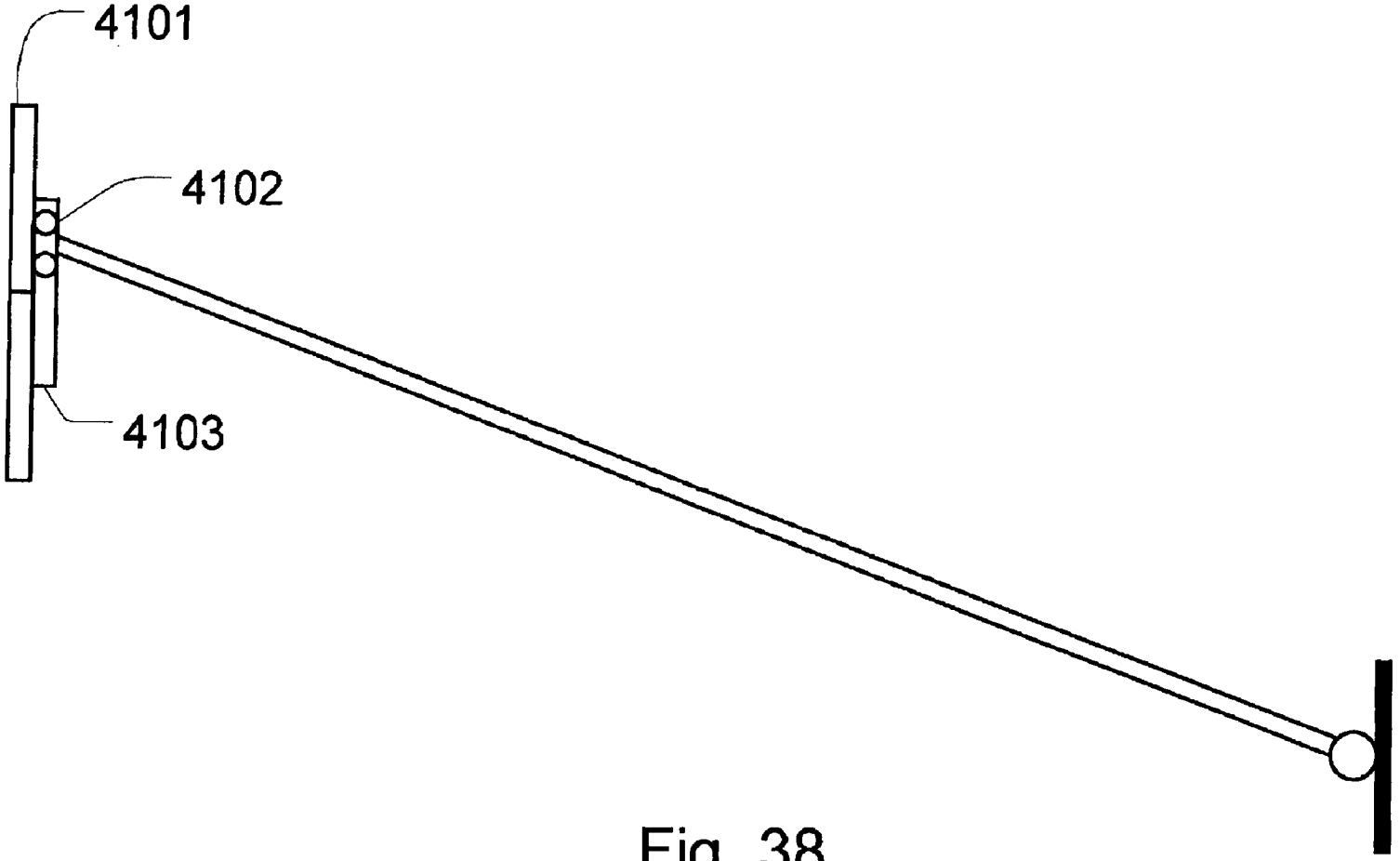
FIG. 38 depicts a perspective view of another alternate embodiment of a corner climber in accordance with the present invention having an arm with a stationary pad, a rolling element and a cam roller.

Another simple embodiment of a corner climber according the present invention, shown in FIG. 36, utilizes the "jamming" force produced by arm 3901 with a stationary pad 3902 on one the lower end and rolling element pad 3903 on the higher end. By forcing the higher end downward, a strong clamping force is achieved as pad 3902 grips the wall surface. A perspective view of another simple embodiment of corner climber according to the invention is shown in FIG. 37. Specifically shown is clamp 4000 including arm 4001, stationary pad 4002, and roller pad 4003. Optionally, clamp 4000 may comprise handle 4004 for ease of use during climbing. A similar effect can be achieved with a clamp having all stationary pads by incorporating a roller 4102 in track 4103 on the stationary pad 4101 as shown in FIG. 38. Track 4103 is shown linear in shape on pad 4101, but may take other shapes to provide more constant force with motion or other cam action for ease of use or improved range of application, etc. Additional stability features can be added one or both sides if desired.

Figure 39A:
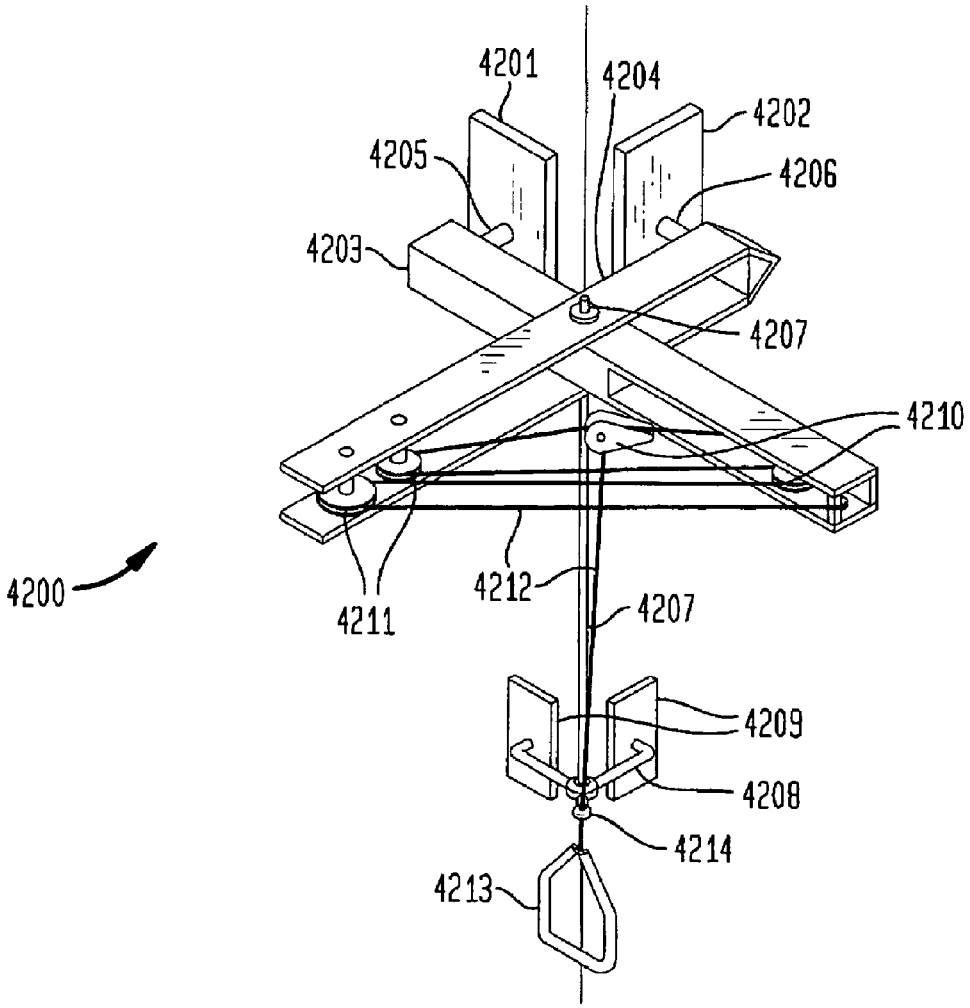
FIG. 39A depicts a perspective view of a human-operated outside corner climber in accordance with the present invention.
Figure 39B:
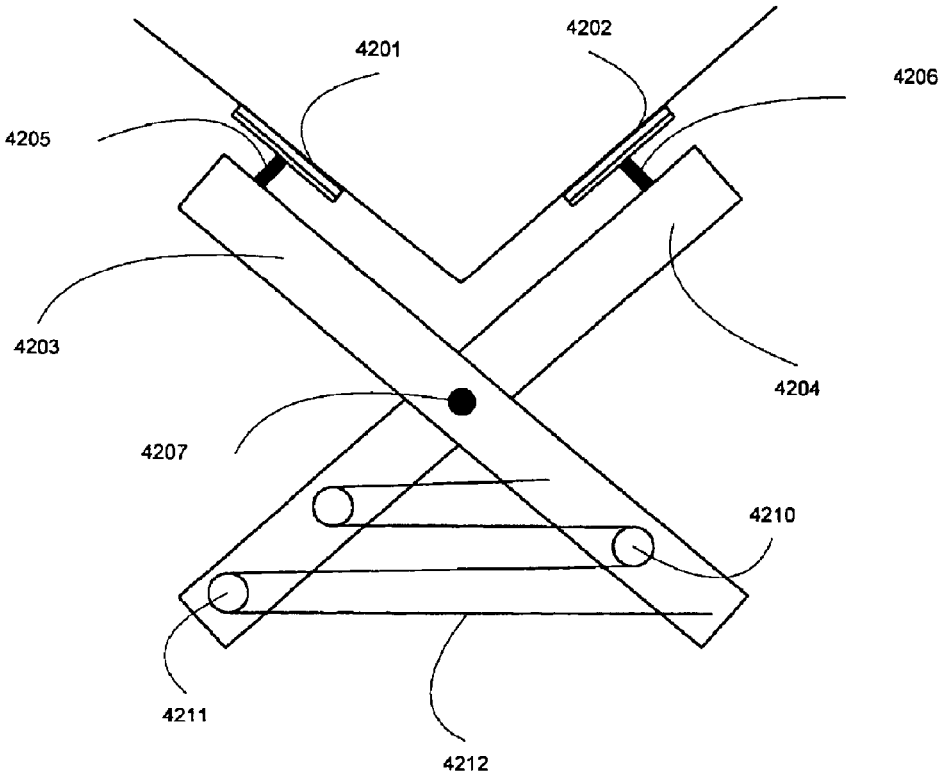
FIG. 39B depicts a top view of the outside corner climber shown in FIG. 39A.

Turning next to FIGS. 39A-B, shown is a preferred embodiment of a human operated outside corner climber in accordance with the invention. This embodiment will serve as an introduction to the method and mechanisms of the many possible outside corner climbers described below in greater detail. As shown, outside corner climber 4200 comprises upper and lower friction pads 4201-4202 and 4209 for gripping the corner surfaces. Preferably, pads 4201-4202 and 4209 comprise any of the high friction material as described previously. Also, the upper clamp assembly comprises clamp arms 4203 and 4204, while lower clamp assembly comprises guide 4214. These are provided with pad joints 4205-4206 (upper) and 4208 (lower) such that pads 4201-4202 and 4209 are positioned for proper gripping on an outside corner, as shown. Further, upper and lower clamp assemblies have pulley assembly 4210-4211 positioned therein such that actuator line 4212 may be run therethrough to control movement of upper and lower clamp arms 4203-4204 and 4214 when force is applied to stirrup 4213. Finally, connecting rod 4207 is provided to attach the upper and lower clamp assemblies together.

Left pad 4201 and right pad 4202 are positioned opposite one another for placement on outside corner surfaces. Pads 4201 and 4202 are mounted on pad clamp arms 4203 and 4204 preferably with joints 4205 and 4206. Clamp arms 4203 and 4204 are mounted on connecting rod member and pivot axle 4207. Optionally, bearings may be used at the ends of pivot axle 4207 depending on the material used for clamp arms 4203 and 4204. The details of the type of bearings used are not critical to an understanding of the operation of the outside corner clamp and would be known to a person of ordinary skill in the art. In this embodiment axial body member 4207 extends downward to guide member 4214 having pads 4209 attached thereto by pad joints 4208. Pads 4209 straddle the outside corner 4208 and grip the wall on each side of the corner. Left arm pulley assembly 4210 and right arm pulley assembly 4211 are mounted on clamp arms 4203 and 4204, respectively. Actuation line 4212 is fed through pulley assemblies 4210 and 4211 and to stirrup 4213. Actuation line 4212 may be fed though guide 4210 and 4211 (although this is not required), and forms a block and tackle arrangement on clamp arms 4210 and 4211 that closes gripper pads 4201 and 4202 against the wall surfaces on either side of the corner upon a downward force applied to the stirrup 4213. Pad joints 4205 and 4206 are preferably ball joint pivots, but other types of joints may be used. FIG. 39B shows a simplified top view of the outside corner climber 4200. In this view, the positions of pad joints 4205 and 4206 are shown more clearly. Specifically, joints 4205 and 4206 allow pads 4201 and 4202, respectively, to conform to the angle of the surface of the wall with little regard for the angle of arms 4203 and 4204 with respect to the walls.

Figure 40:
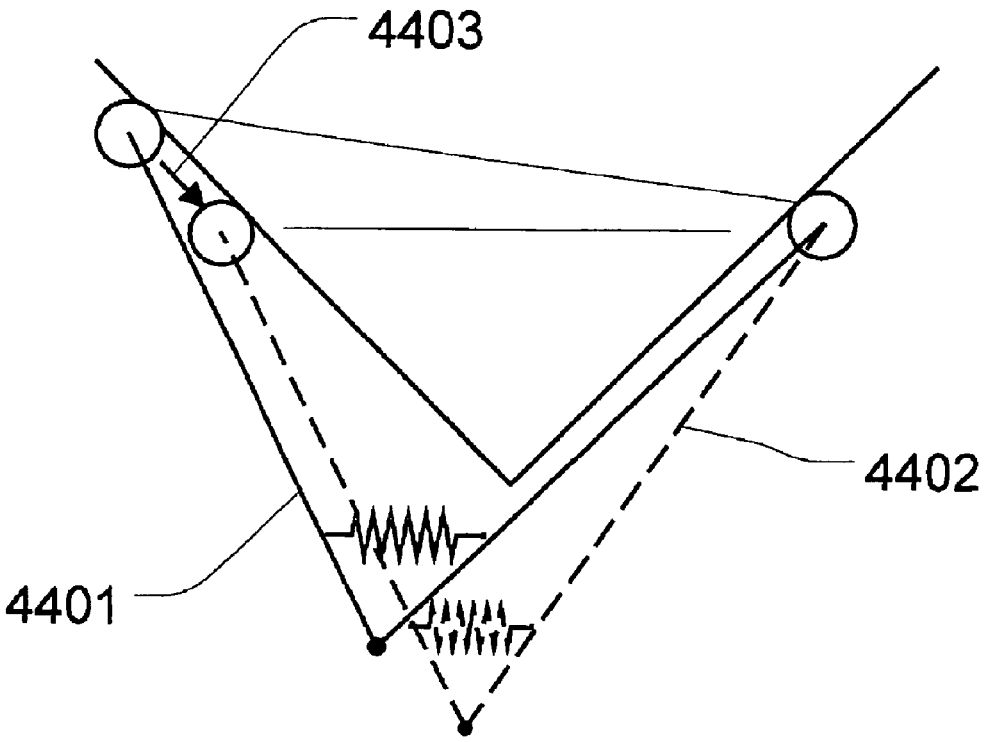
FIG. 40 illustrates the stability of the outside corner climber of FIGS. 39A and B.

In operation, outside corner clamp 4200 of FIG. 39A is positioned on an outside corner, as shown. Then, actuation line 4212 is tensioned, generally through application of a downward force on stirrup 4213. Application of tension to actuation line 4212 acts to apply clamp force on both pads 4201 and 4202 through clamp arms 4203 and 4204, respectively. This force, combined with the high friction properties of the surface material on pads 4201 and 4202, allows climber 4200 to hold the outside corner. Similar principles apply to the friction material used on pads 4201 and 4202 as described previously. However, for outside corner climber 4200, creep acting on the two pivoted pads 4201 and 4202 does not produce a self-amplifying instability. In particular, FIG. 40 demonstrates how outside corner climber 4200 is inherently stable in asymmetrical situations on surfaces with similar coefficients of friction. As shown, pad creep (as indicated by arrow 4403) at an initial position 4401 (represented with a solid line) will tend to move towards a more symmetrical position, shown as dashed lines 4402. This happens because when one pad slips, the angle of the force on that pad produces a stronger grip condition thereby reducing the tendency to further slip. Thus, less concern with stability issues related to creep is required for an outside corner condition. If creep does occur, eventually the pads will slide off the edge of the corner, so creep can still limit the duration of the clamp before a re-grip of the corner is required.

In order to climb a corner with an outside corner clamp of this embodiment, at least two clamps are required. A first clamp is placed high on the corner so that the user must raise their foot to place it in the stirrup. Then, the user places their foot in stirrup 4213, which tensions actuation line 4212 so he can stand on stirrup 4213 with his entire weight. The user then places another clamp higher on the same corner, again tensions that stirrup, and stands fully in that stirrup which then releases the first clamp. The user then moves the first clamp higher up the corner and repeats the process. The users maintain their balance by holding on to the clamp foot, clamp arms, or a handle mounted on the device included for this purpose. Of course it is possible with either inside or outside corner climbers to use something other than inserting a foot into a stirrup approach, for example, hands could be used. However, using the legs to climb is disclosed as the preferred method and is used throughout for exemplary purposes because the legs typically have much greater strength and endurance. Hands are then left free for tasks requiring dexterity such as positioning and balance.

Another way to climb using the outside corner clamp could be to place one clamp and climb several stirrup steps placed in that clamp's actuation line, or use a set of stirrups that are attached to the line by ascender devices such as those disclosed in Kammerer, U.S. Pat. No. 4,667,772, which is incorporated herein by reference. Thus, a user can tension the clamp and take several steps up on one clamp before setting another clamp. For instance, it may be possible to climb to the top of the clamp and then stand on it to place the next clamp. Alternatively, the system could be placed between the legs so that he user sits on one of the clamp systems. To do that, some means of maintaining clamp force even when not standing in the stirrup, such as a cleat, would be required.

Figure 41:
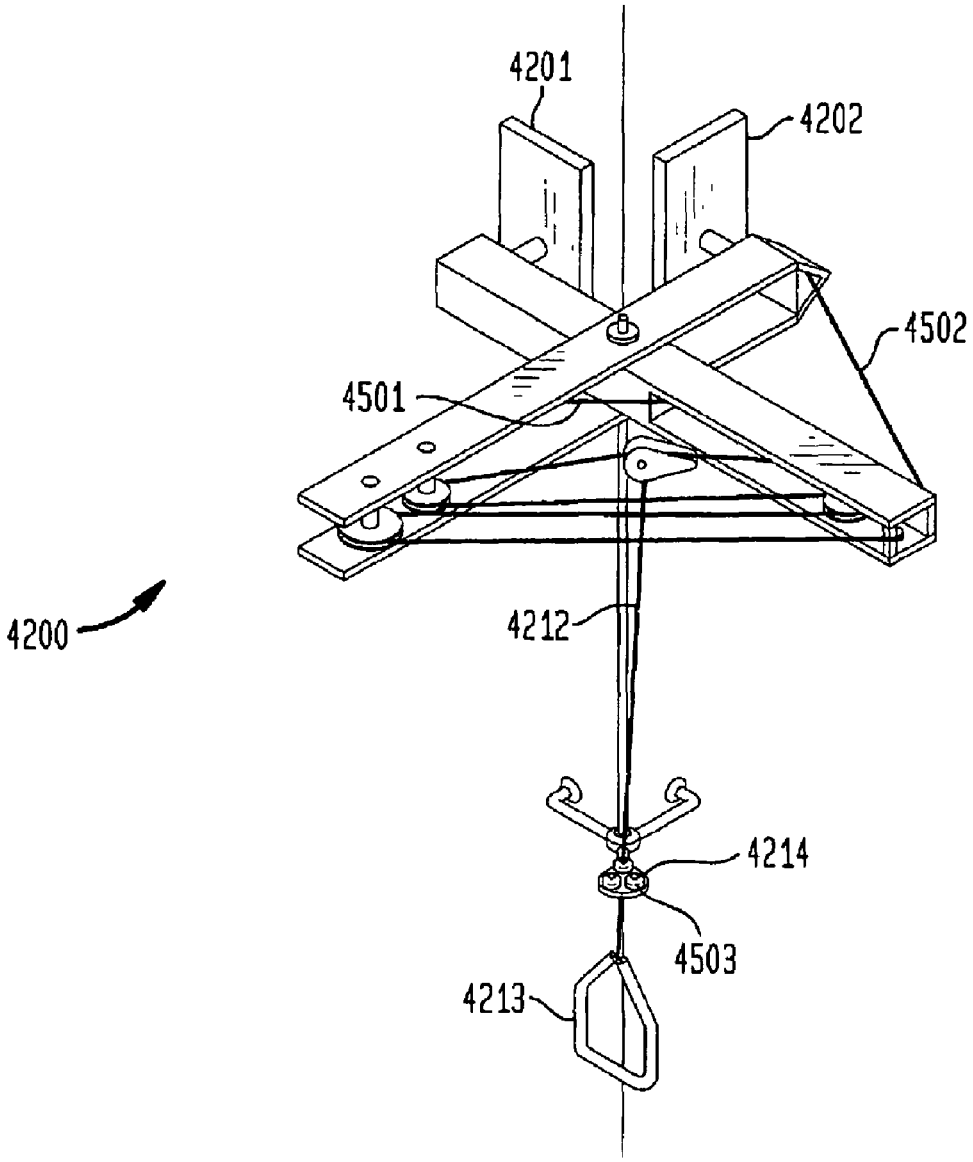
FIG. 41 depicts the outside corner climber of FIG. 39A having enhanced features, including an elastic or spring, a shortening line and a cleat.

Referring next to FIG. 41, shown is outside corner climber 4200 of FIG. 39A with added features similar to those previously described with respect to the inside corner climber of FIG. 31, such as an elastic or spring 4501 that brings clamp 4200 to a suitable neutral position, and/or allows clamp 4200 to hold itself without the use of stirrup 4213, are useful. An elastic or line 4502 may also be used to assist with opening pads 4201 and 4202. In addition, cleat

4503, in this case mounted to guide assembly 4214, would allow the user to lock in actuation line 4212 tension. If substantial creep occurs, then the pad force is reduced if there is not some means of maintaining actuation line 4212 tension (i.e., taking up the slack) while it is held by cleat 4503. One means of achieving a preloaded system that accommodates creep is to use spring arms to store energy in the clamping system (not shown). Then, if pads 4201 and/or 4202 creep, the clamp force is maintained at a relatively high value by the tension of the springs.

Figure 42:
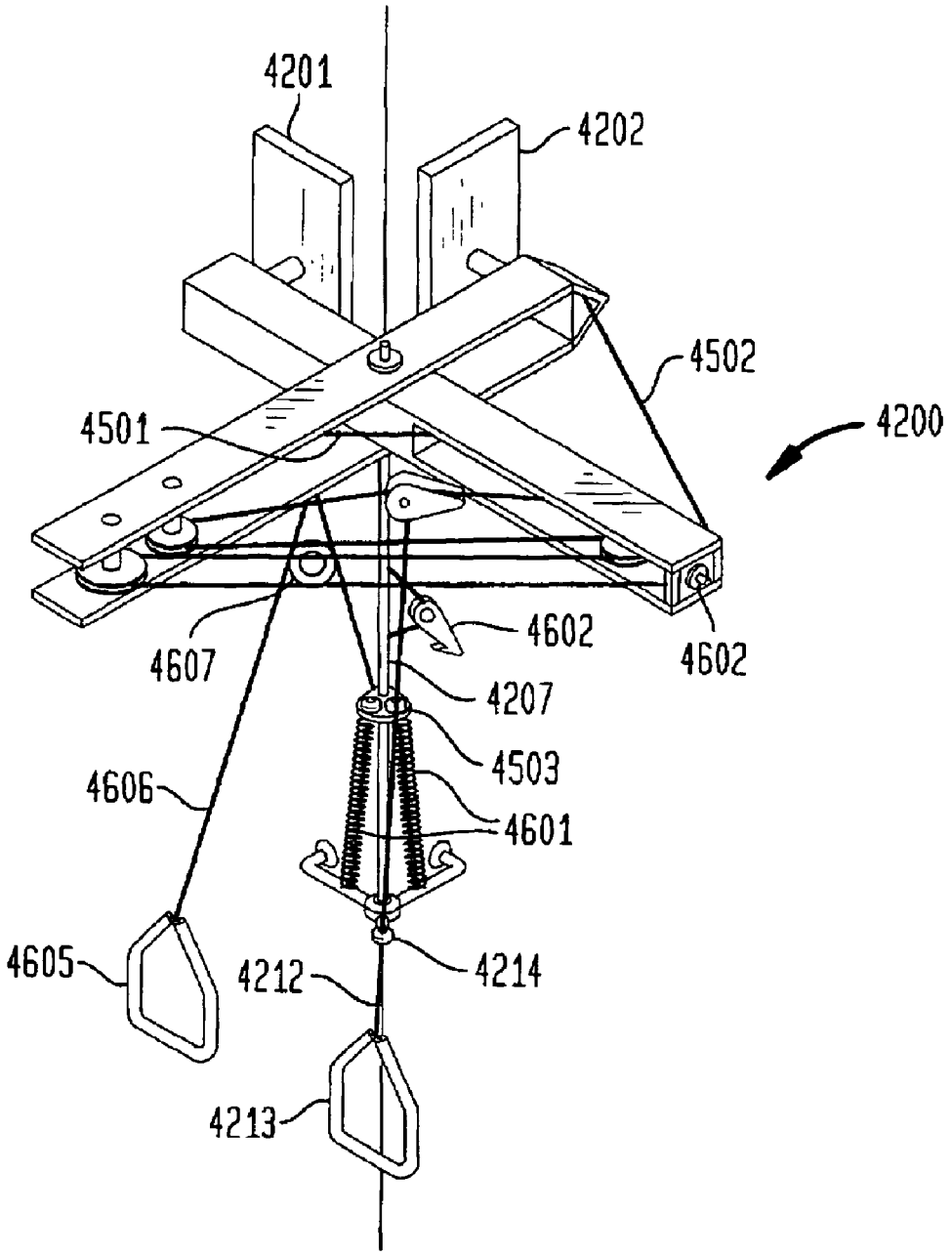
FIG. 42 depicts the outside corner clamp of FIG. 41 with a spring loaded cleat.

An alternative embodiment to the spring arms may be used and is shown in FIG. 42. That is, adding cleat spring(s) 4601 and cleat latch 4602 provides an arrangement that can be used to preload cleat 4503 on actuation line 4212 to provide a steady force even when pads 4201 and 4202 creep. As shown, cleat 4503 is mounted on the axial body member 4207. Cleat 4503 is pulled up to latch 4602 using cleat spring loading stirrup 4605, loading actuation line 4606, and cleat-spring preloading pulley assembly 4607. Once cleat 4503 is pulled up to and secured by latch 4602. Then when actuation line 4212 is placed in cleat 4503 and the latch 4602 is released, spring(s) 4601 acting on cleat 4503 maintain tension in actuation line 4212 even when pad creep cases clamp 4200. Thus, using the spring-loaded cleat as shown in FIG. 42, the grip of clamp 4200 can be held even without weight on actuation stirrup 4213. This will allow added flexibility in moving around since full weight can be applied to other clamps without fully releasing clamps that are well set.

Figure 43:
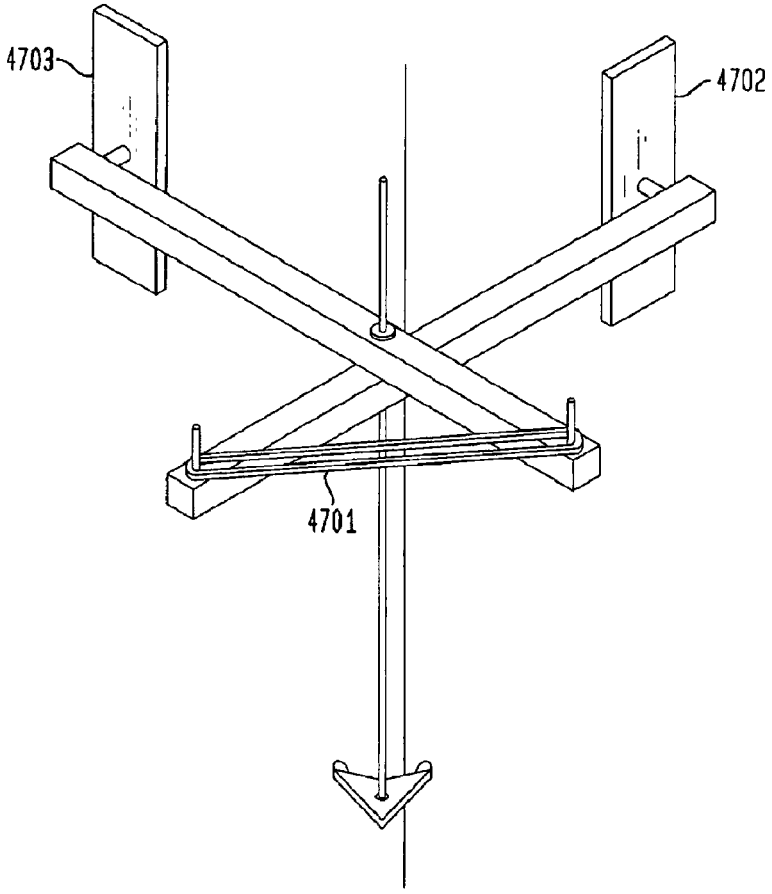
FIG. 43 depicts the outside corner climber of FIG. 41 with elastic (or spring-loaded) clamps.

Alternately, a portion of actuation line 4212 from outside corner clamp 4200 of FIG. 39A may be replaced by an elastic band or a tension spring to accommodate creep as depicted in FIG. 43. Any tension generating member may be used in place of the elastic to generate a clamp force in this manner. For example, the clamp actuation system can be replaced by high tension elastic 4701 shown in FIG. 43. Elastic 4701 may be preloaded so that adequate clamp force is applied to pads 4702 and 4703 over a wide range of motion.

Figure 44:
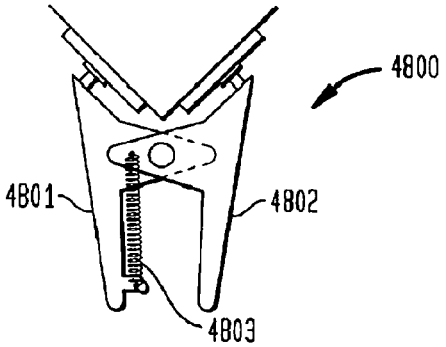
FIG. 44 depicts a top view of the outside corner climber of FIG. 41 with cloths-pin clamp configuration.

Yet another alternative embodiment of an outside corner climber is shown in FIG. 44. Specifically, FIG. 44 illustrates a top view of outside corner clamp 4800 having a clothespin clamp configuration. Such a design allows for convenient manual operation simply by squeezing handles 4801 and 4802 in a manner similar to a cloths-pin to release clamp 4800. As shown, tension spring 4803 is used to maintain a clamp force unless handles 4801 and 4802 are squeezed together. Additional springs may be used and can be placed on both sides of clamp 4800. The specific geometry of the spring mounting points is chosen to provide a relatively constant clamp force. For this configuration, a pulley system can replace spring 4803 to provide a system similar to that of FIG. 39A. The pulleys may be arranged to provide the ungripping force while the spring provides the gripping force. Alternatives such as use of a compression spring placed between the handles may also be used.

Figure 45:
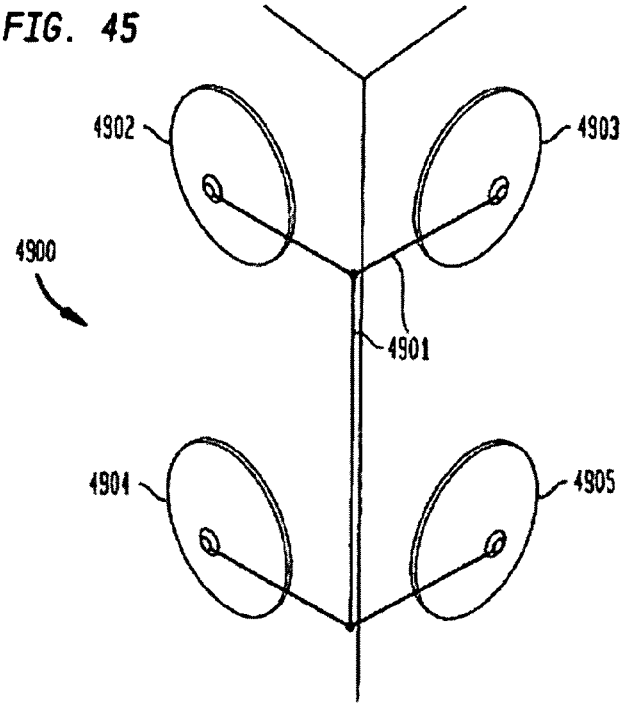
FIG. 45 depicts a simple wire dual pad outside corner gripper in accordance with an alternate embodiment of the present invention.

Looking now at FIG. 45 shown is a simple wire configuration for a dual-pad outside corner gripper 4900 comprising pads 4902-4905 and wire frame 4901. Flexure of frame 4901, which may be made from any number of metal or plastic materials, provides the clamping force of pads 4902-4905 onto the wall surface. Such an embodiment has use as a clamp, fixture, or even simple toy.

Figure 46:
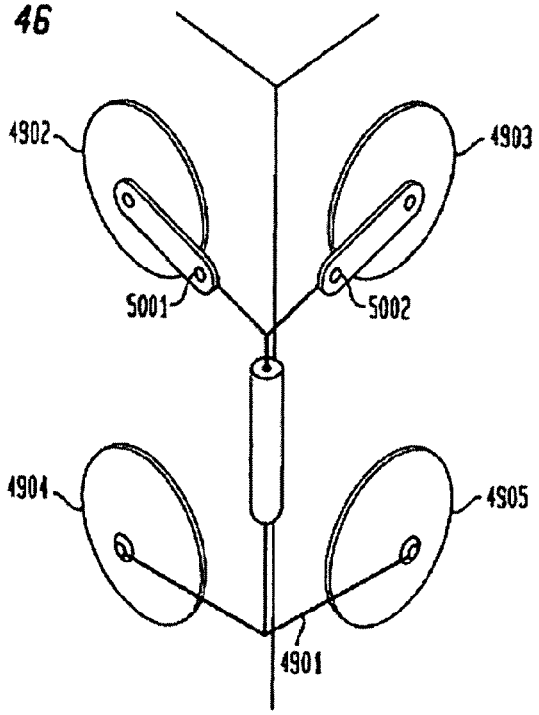
FIG. 46 depicts angled hinge clamping arms for use with the outside corner gripper of FIG. 45.

Next, FIG. 46 shows a clamping system that utilizes the angle of the hinge to generate the clamping force. The arms 5001 and 5002 are hinged at an angle so that downward pull on the body exerted by the body's weight results in the pad ends 4902-4905 squeezing harder on the wall as the body is pulled down. Lifting the body releases arms 5001-5002, and limit stops and linkages to maintain the arms at similar angles (to prevent scissoring action of the arms relative to each other) may be employed keep arms 5001 and 5002 in position. A simple robot can be made by configuring one or more of this type of clamp on the top and/or bottom of a linear actuator. Further regarding robotic embodiments are explained below.

Figure 47:
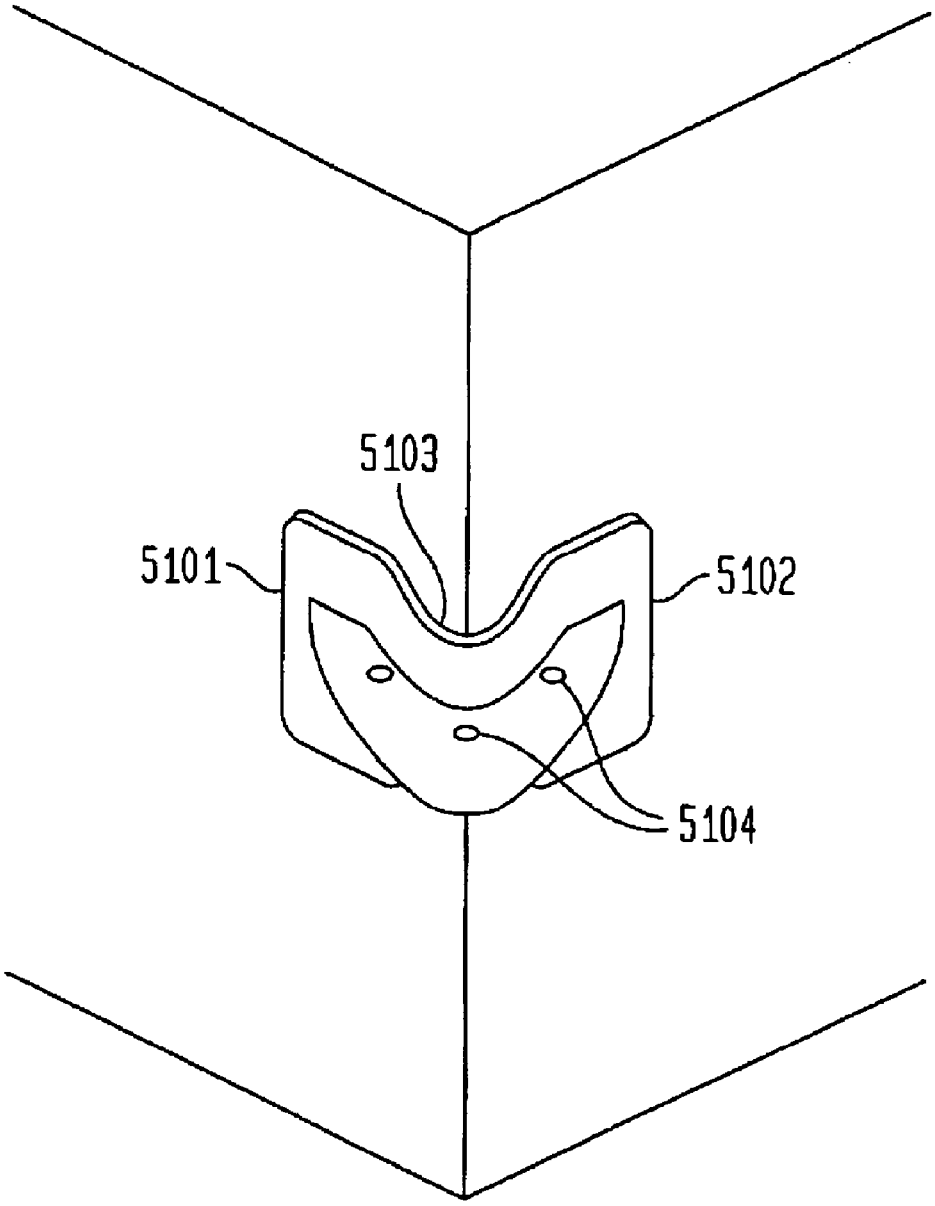
FIG. 47 depicts a one piece outside corner clamp in accordance with an alternate embodiment of the present invention.

A simple one-piece outside corner grip, as depicted in FIG. 47, is another embodiment of the invention for outside corner gripping and climbing. A single body of material is shaped to provide a left pad 5101 and a right pad 5102. The pad surfaces are placed across from each other on outside corner surfaces. The body can be made so that pinching at location 5103 releases the pads. Holes 5104 for attaching objects, lines, etc. are shown in the gripper. There are numerous variations in the details of such a clamp.

Figure 48:
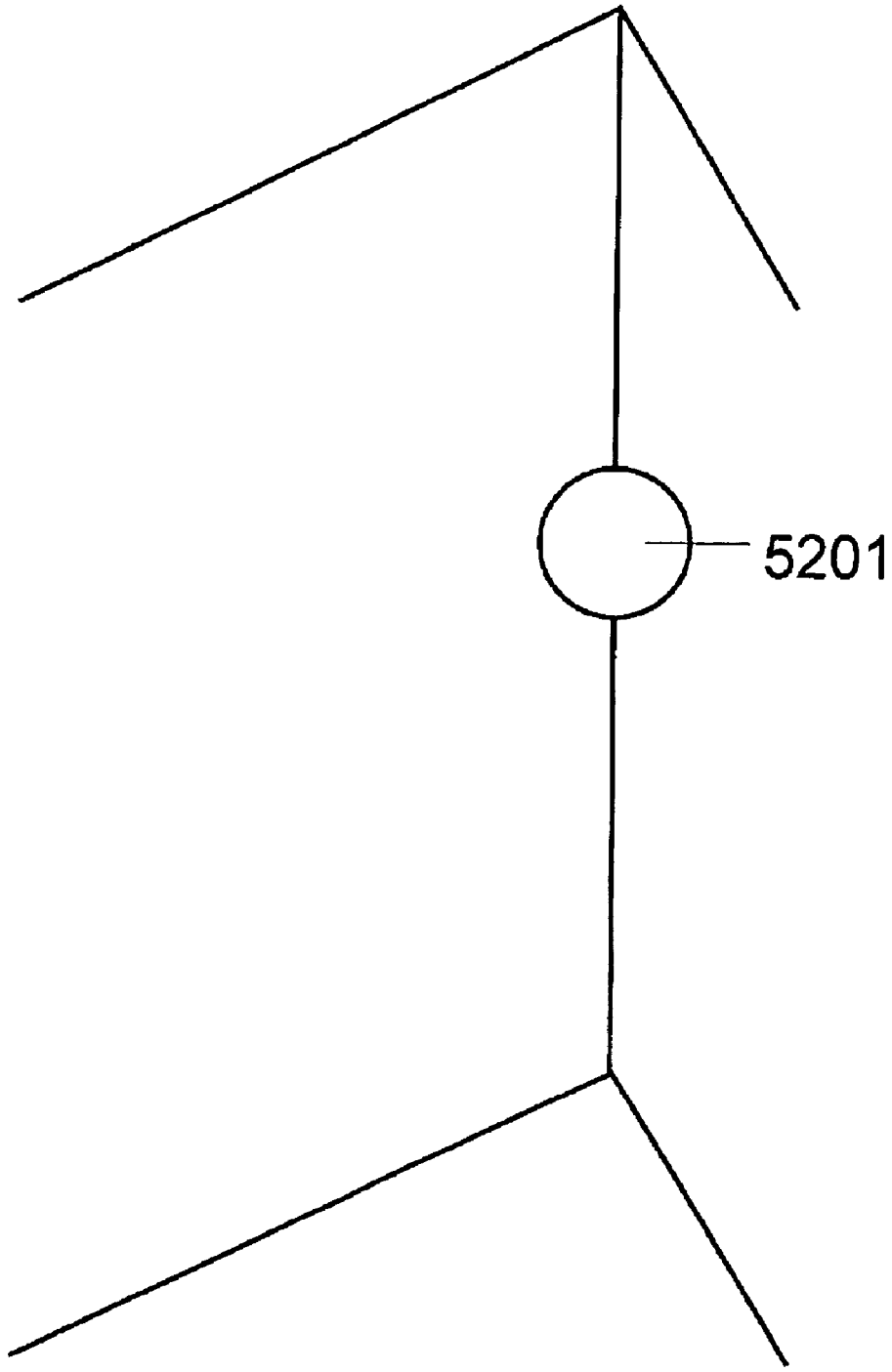
FIG. 48 depicts a ball-shaped inside corner elastic clamp in accordance with an alternate embodiment of the present invention.

Turning next to FIG. 48, shown is an inside corner elastic clamp in the form of a ball 5201. The ball 5201 can be solid or hollow and/or inflatable. The ball is easily placed and has other uses. As a toy, the ball inside-corner clamp could be used in games. The ball can have holes for mounting various items, or a hook can be placed on the ball for holding objects or providing resistant force. The surface of ball 5201 comprises a high friction material as described previously.

Figure 49A:
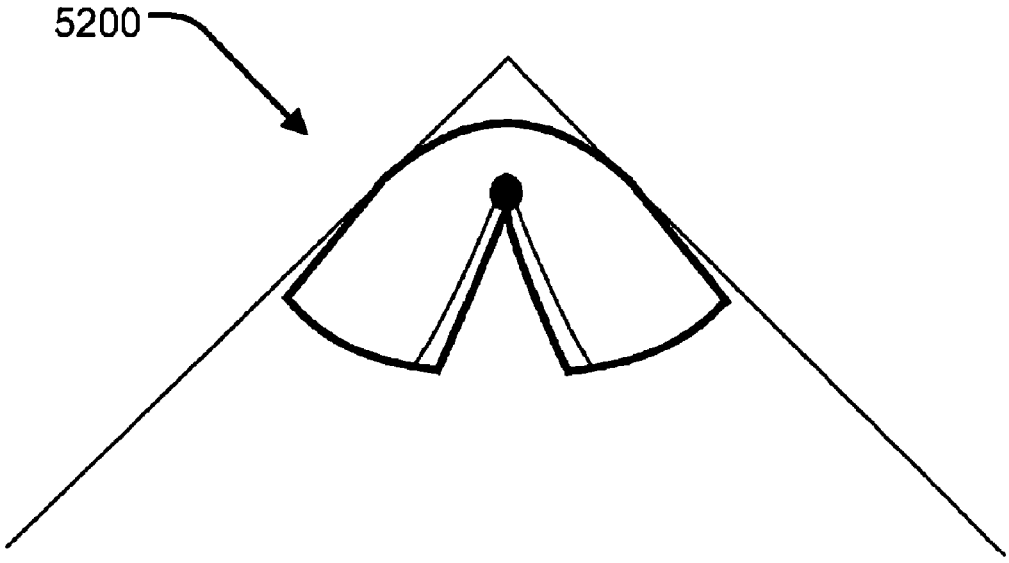
FIG. 49A depicts a top view of an inside/outside elastic clamp in accordance with another alternate embodiment of the present invention as used in an inside corner.
Figure 49B:
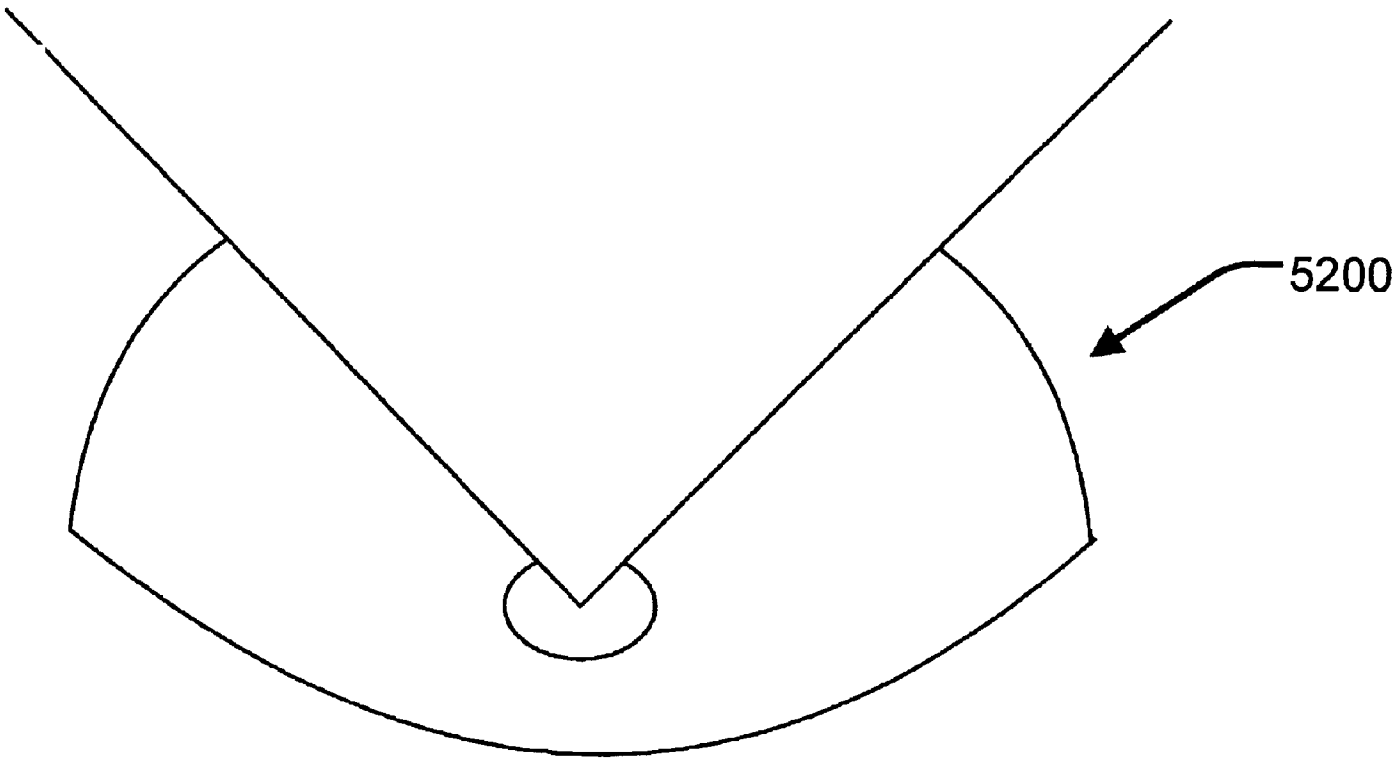
FIG. 49B depicts a top view of the inside/outside elastic clamp of FIG. 49A as used on an outside corner.

Combination elastic clamp 5200 that can be used on inside or outside corners is shown on an inside corner in FIG. 49A and flipped over to grip an outside corner as shown in FIG. 49B. Thus, combination elastic clamp 5200 allows one device to be used for either inside or outside corners and a wide range of corner angles.

For any of these embodiments, holes, mounting points and/or similar features on the pads can be used to support forces, objects, other components, etc. The one-piece grip can be manufactured by molding or cutting from an extrusion, for example.

Alternative embodiments can also be made of different materials with the parts co-molded or attached by self adhesive forces or glue. It is also possible to use a snap, press and/or friction fit for the joining of the components. For instance, it is likely that the body and pads could be of a different material to improve performance and/or reduce cost.

Any of these elastic designs can be made with hollow compartments that can contain a material (such as a phase change material and/or a solid, liquid, and/or gas) to change the stress distribution in the material. An example is a hollow device of any of the types shown in FIGS. 47-49 that is connected to a source of pneumatic (or hydraulic) pressure. Application of pneumatic (or hydraulic) pressure could be used to increase or reduce clamp force to allow control of clamping and/or unclamping.

Figure 50A:
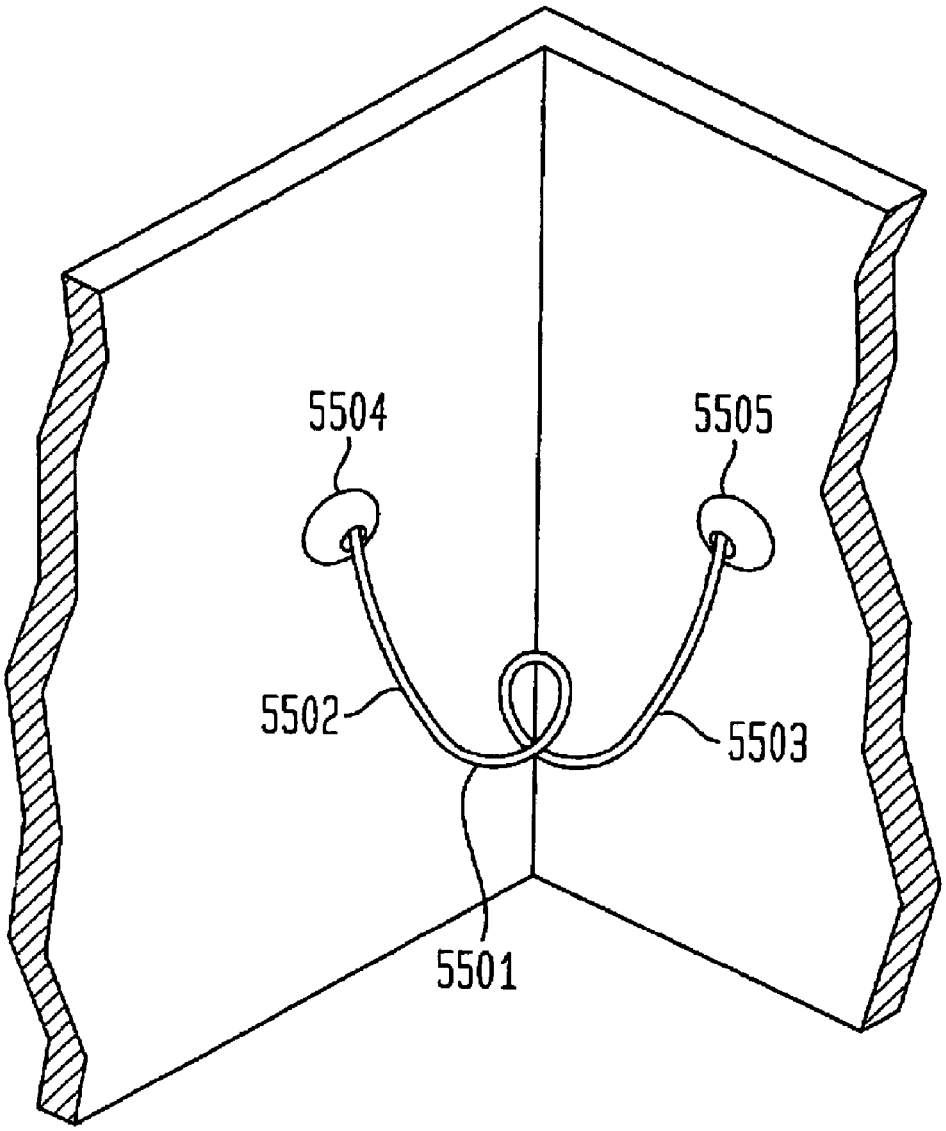
FIG. 50A depicts a simple three-piece spring clamp in accordance with an alternate embodiment of the present invention for use in an inside corner.
Figure 50B:
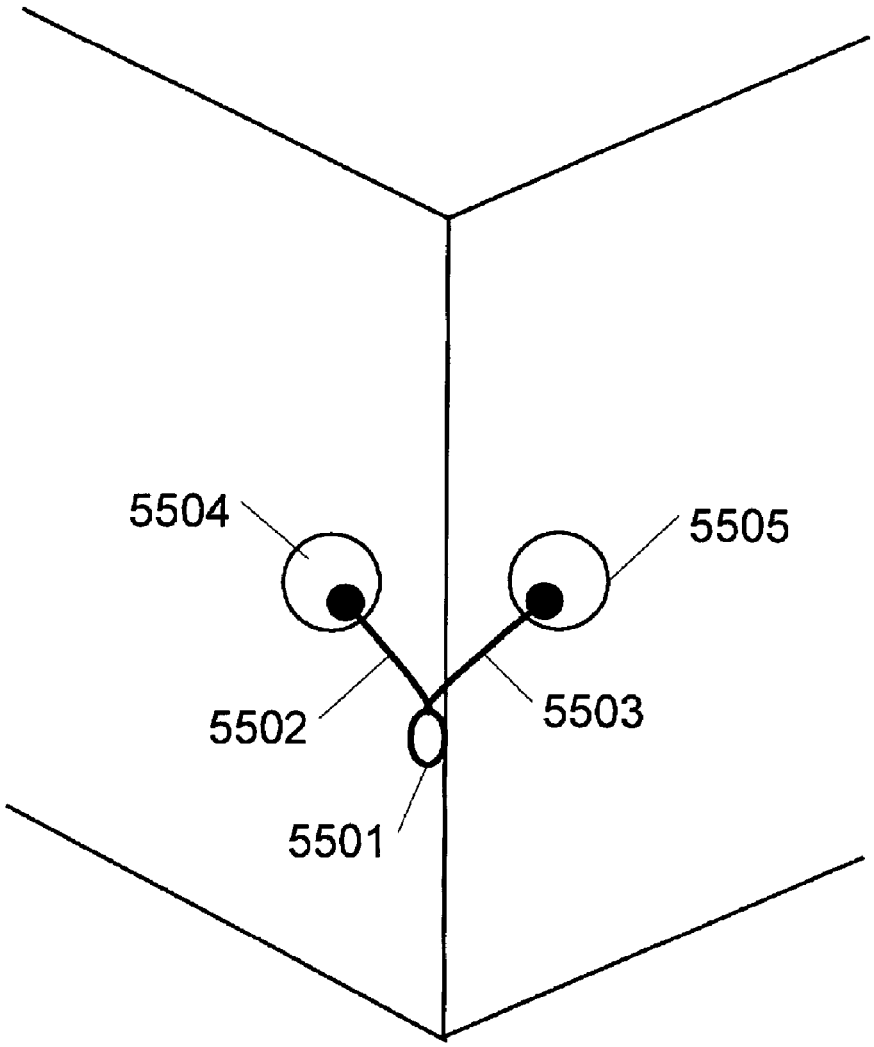
FIG. 50B depicts the simple three-piece spring clamp of FIG. 50A for use on an outside corner.

Illustrated in FIG. 50A is a simple three-piece corner grip consisting of a spring 5501, arms 5502 and 5503, and grip pads 5504 and 5505. The adaptation of this device for use in an outside corner is illustrated in FIG. 50B. The pads 5504 and 5505, in either embodiment, can be spherical (as shown), faceted, or pivoted flat pads to provide greater surface area and/or stability.

In accordance with the invention, an embodiment of a robotic climber/descender may utilize at least one actuator to achieve all motions required to climb and/or descend and may be capable of operating on outside or inside corners. Such embodiment is described first with a simplified gripper cam drive system in the outside corner configuration and subsequently in the inside corner configuration. Alternatives for controlling center of mass and/or the action of a tail to provide secure stepping and gripping are also described. Further, alternative means of converting from inside to outside corners are discussed including a cam design that automatically operates over the full range of outside to inside corners. Although described separately, the preferred embodiment incorporates both inside and outside corner capabilities in one device using the long stroke cam actuator.

Figure 51:
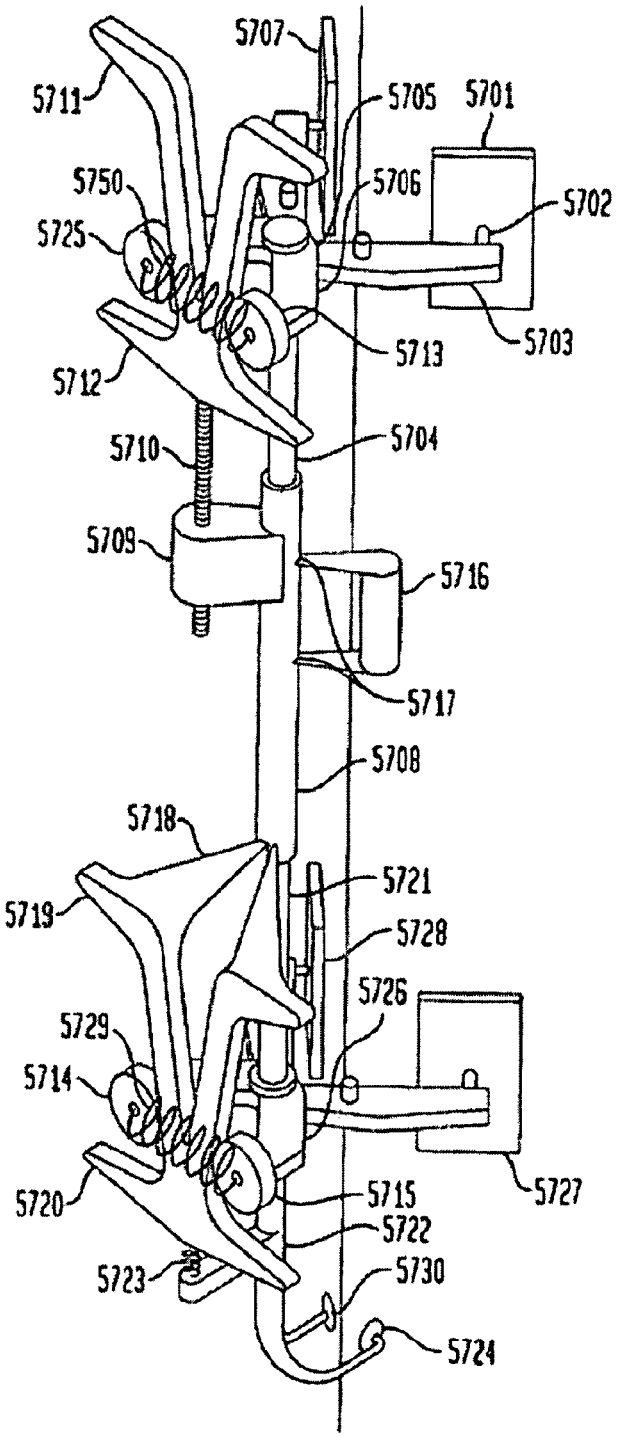
FIG. 51 depicts an alternate embodiment of an outside corner climber robot in accordance with the present invention.

An outside corner climber robot is disclosed in FIG. 51. This embodiment is actuated by a single drive system. Preferably, the upper right side gripper components include an upper right pad 5701, which is connected through a ball joint 5702 to a right pad arm 5703. The right pad arm 5703 is mounted on a bearing to an upper tube 5704 so that it is free to pivot around the vertical axis. A right arm clamp link 5705 is also mounted on a bearing to the upper tube 5704 so that it is free to rotate about the vertical axis. A right link joint 5706 connects the right pad arm 5703 to the right arm clamp link 5705. The right arm clamp link 5705 and right pad arm 5703 can be made as one part which eliminates the link joint. corners and is described below. An upper left pad 5707 and a similar arm and link are also mounted in a same manner as the right side, but flipped over, on the top left of the upper tube 5704 to create an aligned corner grip system for the pads 5701 and 5707.

An outer body tube 5708 slides over the upper tube 5704. An actuator 5709 mounted on the outer body tube 5708 drives a linear actuator mechanism that moves an actuator rod 5710 vertically relative to the outer body tube 5708. An upper cam feature 5711 and an upper grip limit stop feature 5712 on the actuator rod 5710 are in rolling contact with an upper right clamp cam-roller 5713 and an upper left clamp cam-roller 5725. The shafts of the upper right and upper left cam-rollers are attached to the ends of the right clamp link 5705 and left clamp link (not visible in this figure), respectively. A cam-roller return spring 5750 is mounted between the ends of the right and left cam roller shafts 5713 and 5725.

A payload module 5716 is attached to the outer body tube 5708 by a pair of lockable pivots 5717. A similar payload module may also be mounted on the left side.

A lower cam strut 5718 is mounted to the lower end of the outer body tube 5708. A lower cam 5719 is mounted on the lower cam strut 5718. A lower grip limit stop feature 5720 is part of the lower cam 5719. A lower left and a lower right clamp cam-roller 5714 and 5715 are in rolling contact with the lower cam 5719. The lower right and left cam-roller shafts are attached to the ends of a right clamp link 5726 and left clamp link (not visible in this figure), respectively. A lower clamp system including clamp pads 5727 and 5728, similar to the upper clamp system previously described, is mounted on pivot bearings on a lower inner shaft 5721. A lower cam-roller return-spring 5729 is mounted between the ends of the right and left cam-roller shafts.

The lower inner shaft 5721 slides along the axis of the outer body shaft 5708 and slides inside the upper tube 5704. The lower inner shaft 5721 nests inside upper tube 5704.

An optional tail 5722 is mounted on a hinge to the lower inner shaft 5721 so that the hinge is free to rotate about the horizontal axis across the body of the robot so that it hinges either towards or away from the corner only. A tail spring 5723 is mounted between the lower cam 5719 and the tail 5722. A right tail grip pad 5724 and similar left tail grip pad 5730 are mounted on the tail.

Operation of the outside corner robot begins with adjusting the position of the payload module 5716 in FIG. 51 so that the center of gravity is centered between the upper and lower pads. Note that the upper clamp arms are longer than the lower clamp arms such that the center of gravity causes the unclamped end to always fall towards the corner as has been described for the inside corner climber. The positions of the payload modules are adjusted so that center of mass is also laterally centered on the robot. If the center of mass for the system can be properly aligned, then the optional tail assembly 5722 is not needed.

If the mass cannot be properly centered, then the tail is needed. The tail prevents the upper grip from falling away from the corner. Tail operation is based on the motion of the outer body tube 5708 relative to the lower rod 5721 acting through the tail spring 5723, which presses on the lower cam 5719. When the lower pads 5727 and 5728 grip and the cam engages further to tighten the grip, the spring 5723 presses the tail against the corner, which holds the upper grips 5701 and 5707 against the corner when they release. An alternative configuration would be to link the upper gripper to the tail so that when the upper gripper is released, the tail pressure is applied, and when the lower gripper is released the tail is released. The following description of climbing will not include the use of the tail assembly (rather, the tail motion is configured to occur automatically) but preferably the device maintains a properly positioned center of gravity.

The outside corner climber robot is prepared for placement on the wall by pressing the upper inner rod 5704, which has the upper gripper assembly at its top end, into the outer body tube 5708. The actuator rod 5710 must be extended high enough so that the upper clamp cam-rollers 5713 and 5725 are resting on the upper grip limit stop feature 5712. All pads are placed so that they are evenly positioned on the adjacent wall surfaces of the outside corner. Then, applying pressure towards the corner on the top pads, the outer body tube 5708 is pulled down. The actuator rod 5710 is also pulled down, since it is actuated relative to the outer body tube 5708, so that the cam-rollers engage and a clamp force adequate to hold the robot is achieved with the upper grip assembly.

To initiate an upward climb, the linear actuator 5709 is activated to draw the actuator rod 5710 down towards the outer body tube 5708. Because the upper grip maintains position on the wall, drawing the actuator rod 5710 downward actually raises the outer tube body 5708. The lower grip assembly hangs on the lower grip limit stop feature 5720, which also raises the lower clamp assembly. If the tail were in place, in this position, with the lower inner rod 5721 fully extended, the tail would be lifted away from the wall. In this position the lower grippers are open and are pressed lightly towards the corner due to the center of gravity location outside the axis of the upper grip ball joints.

Figure 52:
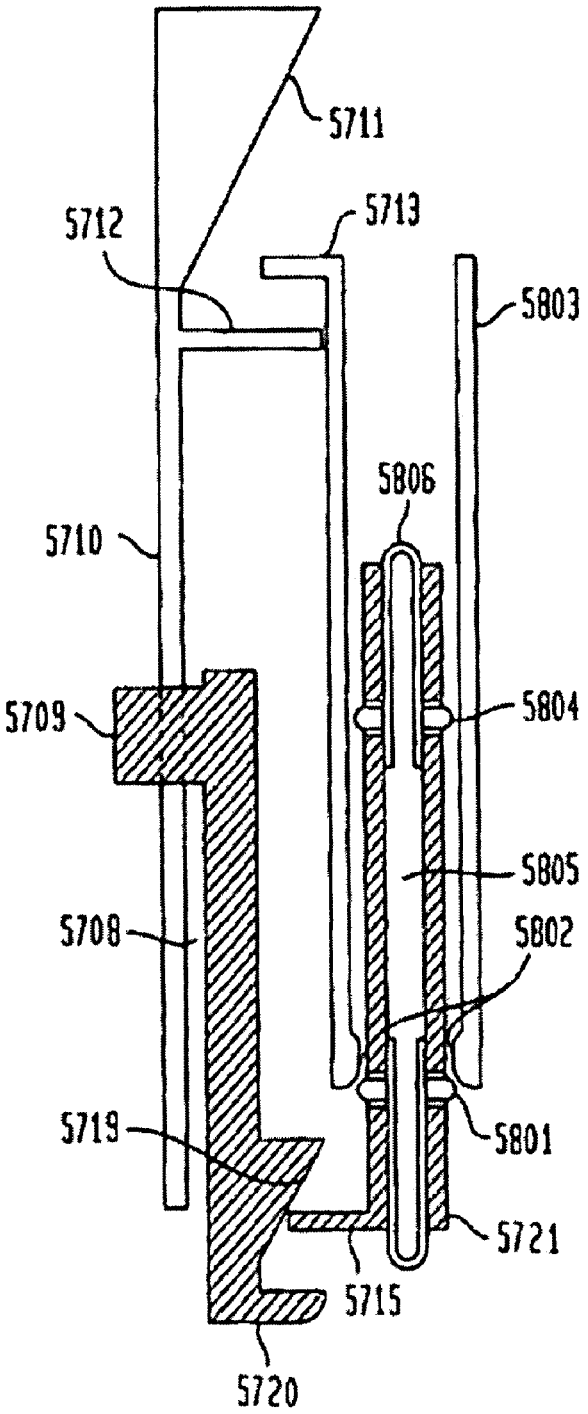
FIG. 52 depicts an internal view of the actuator of the outside corner climber robot of FIG. 51.

A schematic equivalent of some of the major components of the outside corner climber embodiment of FIG. 51 is shown in FIG. 52. The figure includes upper cam feature 5711, upper grip limit stop feature 5712, upper clamp cam-roller 5713, actuator rod 5710, actuator 5709, outer body tube 5708, lower cam 5719, lower grip limit stop feature 5720, and lower clamp cam-roller 5715. Lower cam 5719 actuates the cam-roller 5715 to clamp the grips 5727 against the wall surfaces when in the position shown (cam-roller 5715 against angled lower cam 5719 surface). Upper cam-roller 5713 is not engaged on the sloped surface of upper cam 5711. Thus, the upper clamp is not gripping the wall. Normally, outer body tube 5708 would fall to the position where upper cam-roller 5713 is in contact with upper grip limit stop feature 5712. However, in this position, bottom detent 5801 is in contact with the clamp actuation initiation feature 5802. Thus, the bottom detent 5801 is supporting the upper clamp at this point. Retracting actuator rod 5710 (i.e., moving actuator rod 5710 downward relative to outer body tube 5708) drives upper cam 5711 against upper cam-roller 5713 which engages the upper clamp. When the upper clamp grips the wall, upper tube 5704 does not move down and further retraction of actuator rod 5710 lifts outer body tube 5708. When outer body tube 5708 is lifted, lower cam 5719 rises relative to the lower grip. The lower grip is released and then lifted by lower grip limit stop 5720. Further retraction of actuator rod 5710 would raise outer body tube 5708 and lower rod 5721 relative to upper tube 5704, thereby overriding lower detent 5801 past clamp initiation feature 5802.

Starting again from the position shown in FIG. 52, extending actuator rod 5710 (i.e., raising actuator rod 5710 relative to outer body tube 5708) would lift upper tube 5704 when the upper grip limit stop feature 5712 makes contact with upper cam-roller 5713. The clamping, unclamping, and moving positions just described are combined to provide climbing motion. The simplified schematic of FIGS. 53A-F illustrates each step of the climbing process.

Figures 53A, 53B, 53C, 53D, 53E, 53F:
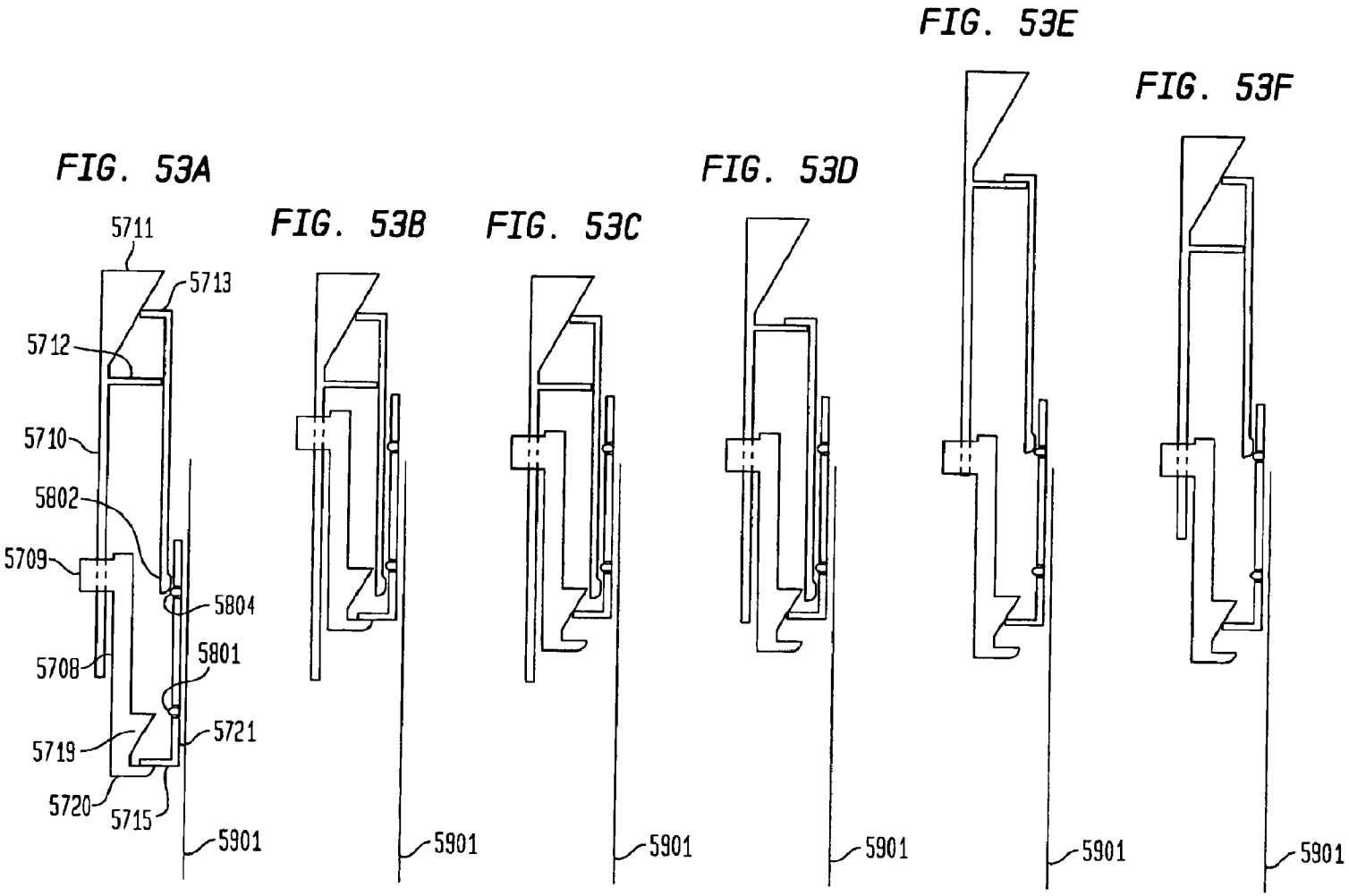
FIGS. 53A-F are schematic representations of the climbing action of the single actuator outside corner climber robot of FIG. 51 at major transitions in the climbing process.

FIGS. 53A-F shows schematically the motion of the components of the single actuator robot climber at the major transitions in the climbing process. The schematic of FIG. 52 is further simplified in FIG. 53 to just the key features. Vertical line 5901 just to the right of each schematic is for position reference only. The initial starting position in FIG. 53A is with the upper clamp gripping the wall, the lower clamp released, and actuator rod 5710 extended. Then actuator rod 5710 is retracted, and since the upper arm is gripping the wall, this causes body tube 5708 and lower grip to be raised. This motion continues until both upper detent 5804 and lower detent 5801 are above clamp initiation feature 5702 as shown in FIG. 53B. Then actuator rod 5710 is extended, engaging lower cam 5719 and the lower clamp to grip the wall as shown in FIG. 53C. Continued extension of actuator rod 5710 releases the upper clamp as shown in FIG. 53D. Further extension raises the upper grip and overrides both lower detent 5801 and upper detent 5804 as shown in FIG. 53E. Next, actuator rod 5710 is retracted, which engages the upper clamp as shown in FIG. 53F. Further retraction of actuator rod 5710 disengages the lower grip and places the robot in the same state as the starting point, FIG. 53A, except at a higher position on the wall. To continue to climb, the process of extending and retracting actuator rod 5710 as just described is repeated.

Note that the operation of the single actuator robot device requires that the gripper achieve adequate grip before it ungrips the previous clamp. For example in FIG. 53C, if the lower gripper does not achieve enough grip to lift the body, then it will override the detent as it slips down the corner and the top grip will not be released. Similarly in FIG. 53F, if the top grip does not achieve adequate grip to lift the body, then it will override the detents as it slides down the wall and the rear grip will not be released.

Figure 54A:
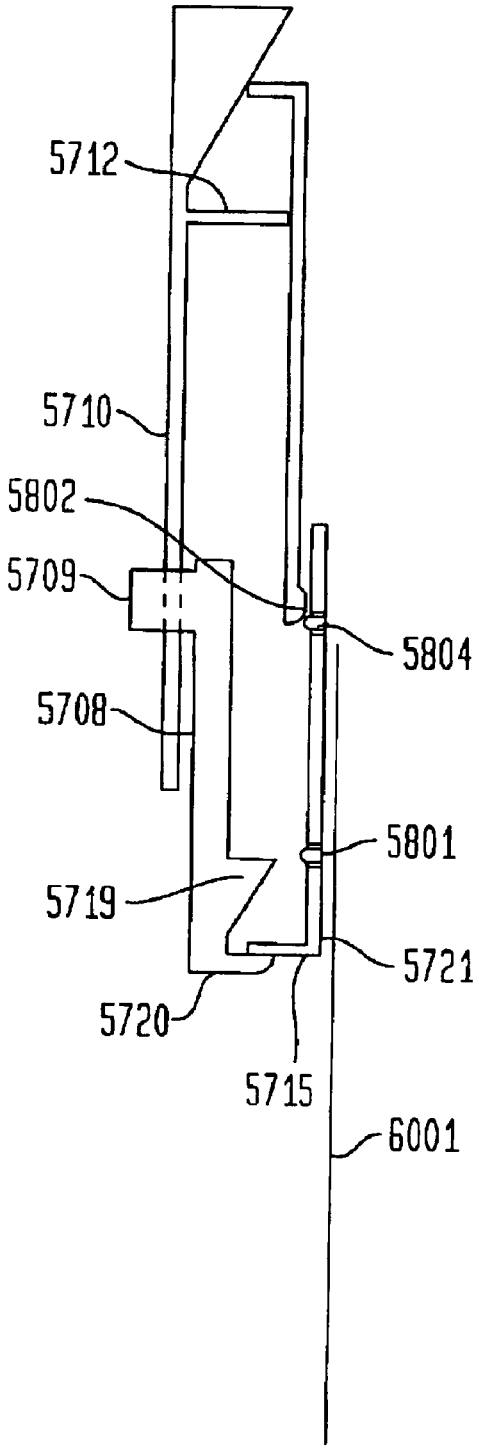
FIG. 54A-B are schematic representations of the transition from climbing to descending of the single actuator outside corner climber robot of FIG. 51.
Figure 54B:
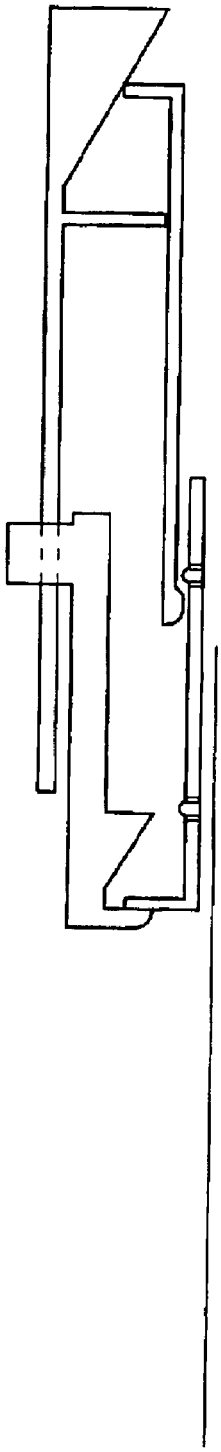

Operation of the outside corner robot to descend a corner begins with robot already in the position of FIG. 53A, having climbed up a corner. The following discussion describes operation to transition from ascending to descending from the state shown in FIG. 53A. In this condition, the upper grip supports the robot and the lower grip has just been released and lower grip cam limit stop feature 5720 supports the lower gripper assembly and lower inner rod 5721. To transition to descent mode from this point, actuation rod 5710 is retracted which raises lower inner rod 5710. Upper detent 5804 on lower inner rod 5721 is pulled past clamp actuation initiation feature 5802. This transition is shown in FIGS. 54A-B.

Figures 55A, 55B, 55C, 55D, 55E, 55F:
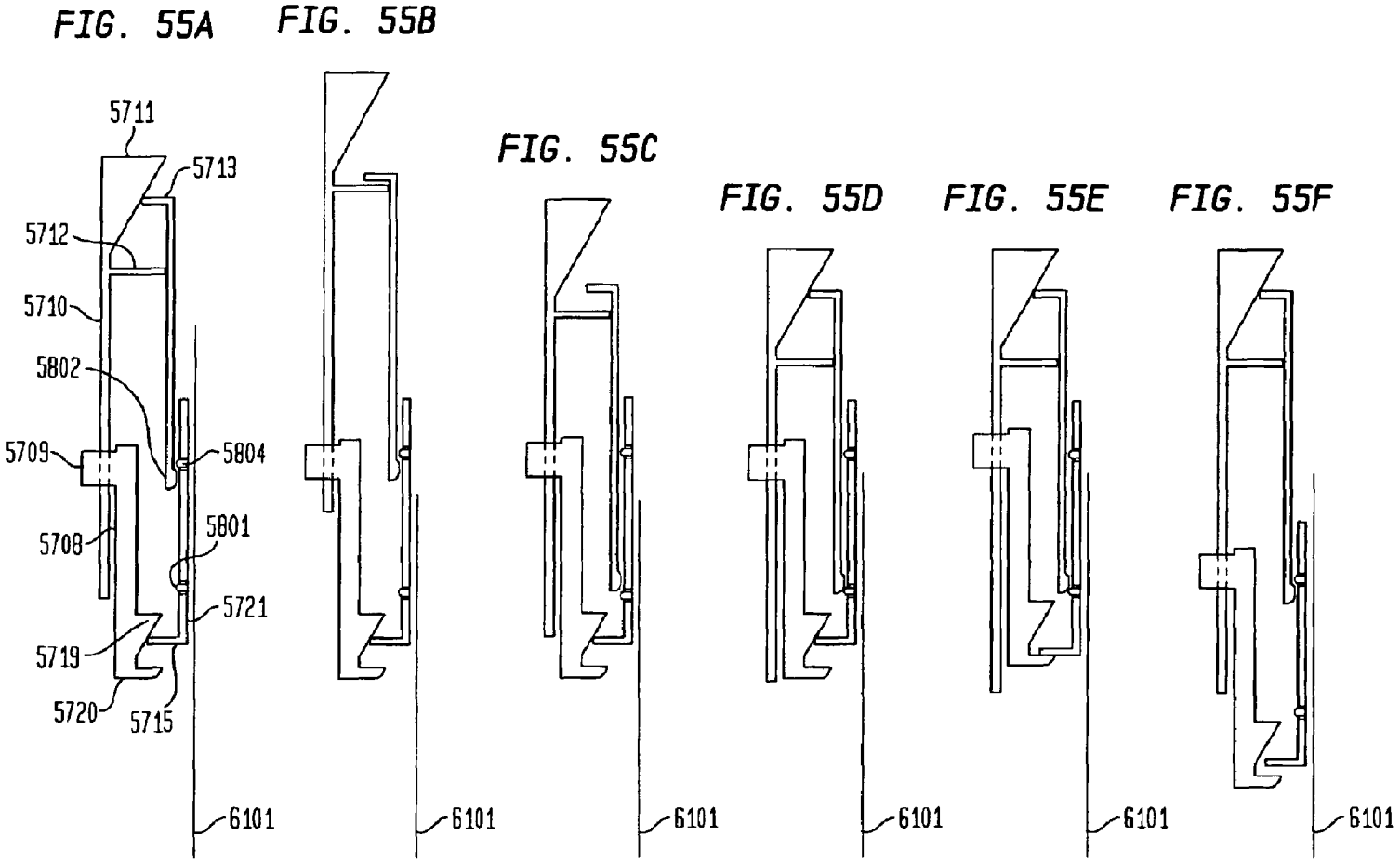
FIGS. 55A-F are schematic representations of the descent of the single actuator outside corner climber robot of FIG. 51.

To descend from this position, actuator rod 5710 is extended. Lower inner rod 5721 is supported by upper detent 5804 on clamp initiation feature 5802. This engages the lower clamp as shown in FIG. 55A. Actuator rod 5710 is then extended far enough to release the upper clamp, but not so far as to lift clamp initiation feature 5802 above upper detent 5804 as shown in FIG. 55B. Actuator rod 5710 is then retracted, which lowers the upper clamp assembly. The upper clamp assembly stops descending when clamp initiation feature 5802, located on the upper tube, contacts lower detent 5801 as shown in FIG. 55C. Continuing to retract actuator rod 5710 actuates the upper clamp to grip the wall as shown in FIG. 55D. Continuing the retraction further then releases the lower clamp assembly's grip on the wall surfaces. As soon as the lower grip releases, actuator 5709 is stopped so that lower detent 5801 remains below the clamp initiation feature 5802 as shown in FIG. 55E. Actuator rod 5710 is then extended, which lowers outer body tube 5708 and lower clamp assembly as shown in FIG. 55F. From this point, further extension of actuator rod 5710 actuates the lower clamp assembly as shown in FIG. 55A. The process is repeated to continue descent. Note that the major difference in descent and ascent is the position at which the direction of actuator 5709 is reversed.

As is the case for the climbing situation, the active holding grip will not release if the new grip does not achieve adequate grip. Thus, the same security enhancing automatic grip force checking feature of the embodiment is active in both descent and ascent.

Thus, the single actuator robot for the outside corner can climb and/or descend an outside corner. Control of whether the single actuator robot climbs or descends is achieved simply by controlling the reversing points in the stroke of the actuator rod. The position of the rod can be measured by any number of means, while the positions or forces on the clamps can be used to determine the reversal points, and the timing and/or force of the actuator could be used to determine the reversal time. Note that the design as described uses gravity in its operation. If desired, springs can be used instead of relying upon gravity for operation. For example, this would be advantageous for wall to ceiling corner climbing/traversing in a horizontal plane. Also note that the features of the single actuator system just described were arranged as a linear rod drive with cam followers. The same basic features can be implemented using a curved, rotary, or more complex shaped system. The linear system described is preferred for its ease of visualization and description as well as ease of implementation.

With the robot in the position shown in FIGS. 53C or 53F, both clamps can be engaged at once and either grip can be disengaged at will by changing the direction position of the actuator rod. Oscillating actuator rod 5710 allows either the upper or the lower grip to be released and then regripped. The weight distribution and/or the tail will cause the released grip to reach into the corner to achieve a new grip at a better position. Thus, regripping using this procedure can accommodate creep of the pads.

Figure 56:
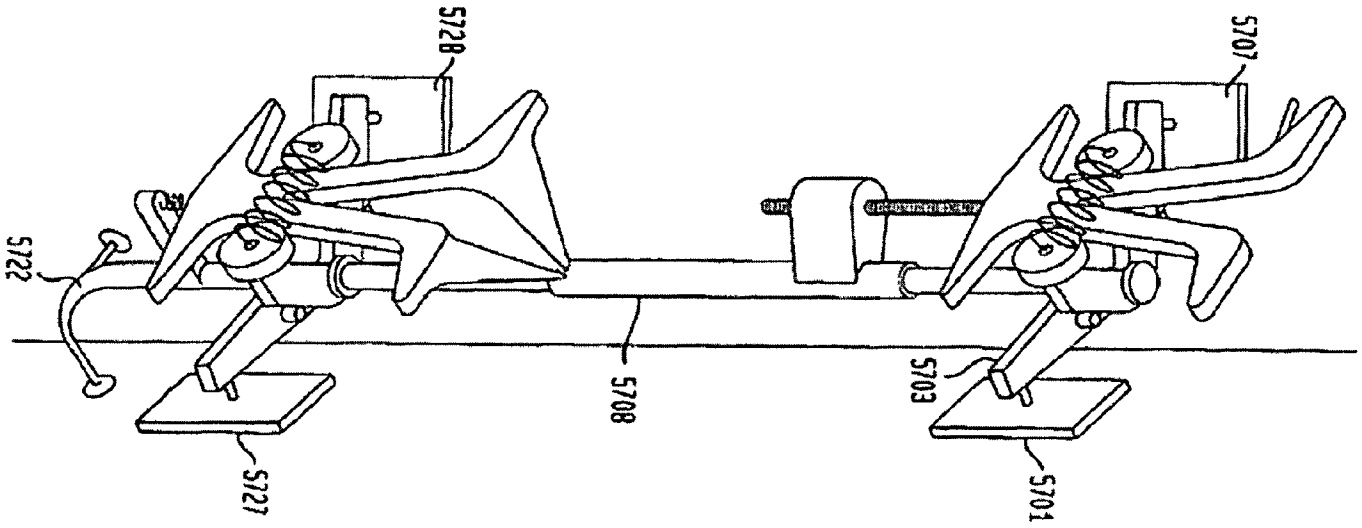
FIG. 56 depicts the outside corner climber of FIG. 51 as it may be converted for use on an inside corner.

The outside corner robot of FIG. 51 can be reconfigured to also work in an inside corner, as is shown in FIG. 56. Removing the right link joint, which connects right pad arm 5703 to the right arm clamp link allows the right arm to fold back against the right pad arm 5703. The same procedure is performed on the left side and on the lower grippers as well. Now gripping pads 5701, 5707, 5727, and 5728 face outwards so that an inside corner can be gripped. Finally, tail 5722 and pads 5701, 5707, 5727, and 5728 are adjusted or modified as needed to fit the inside corner. The single-actuator climbing robot, with the payload pod(s) removed for clarity of the reconfiguration. The payload pods would be remounted close to the outer body tube 5708. This configuration is able to climb inside corners. The climbing and descending procedures are identical for this configuration, and whether the grip is on an inside or outside corner does not impact the climbing process.

The spring loaded pad stabilization system can be used to maintain orientation and null inside corner creep instability. Tail 5722 can be used to maintain tilt stability.

The length of the arms holding the pads shown in FIG. 56 is not ideal for inside corner climbing. It is generally advantageous to have the upper grip points further into the corner and lower pads 5727 and 5728 further out from the corner so that the center of gravity can be located between the contact points on the wall to obviate the need for the tail 5722. This configuration can be obtained by moving the ball joints for the pads in on the upper arms and out on the lower arms, or by switching the upper and lower arms. The position of the center of gravity can be controlled by adjusting the position of the payload. The resulting configuration is shown in FIG. 57.

Figure 57:
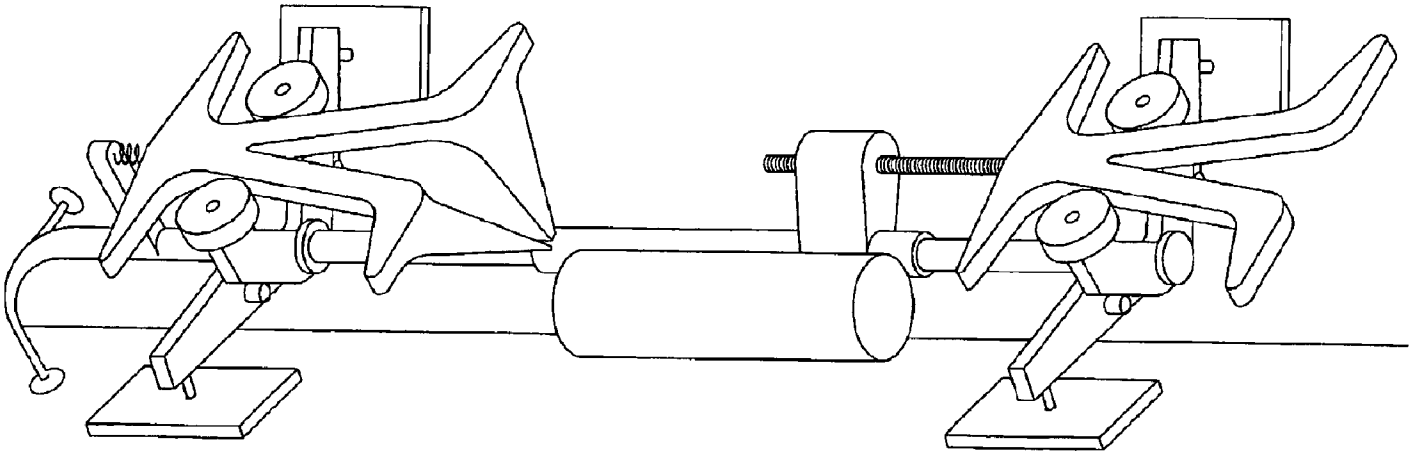
FIG. 57 depicts the outside corner climber of FIG. 51 reconfigured for use on an inside corner with wide lower pads and payload.

The inside and outside corner climber embodiments of FIG. 51, FIG. 56, and FIG. 57 and/or the inside to outside (and/or to flat) conversion features, such as that of FIG. 57, can be applied to most of the embodiments and/or to human operation. Other conversion features can be created for most embodiments presented herein by extension of similar concepts for reorienting the direction of force to the same or different pads that can grip corners of the opposite type for which the embodiment is shown gripping. For example, the pushing out action of some of the inside corner designs can be converted into a squeezing action for outside corners in many ways, including a simple bracket that reaches across the body to pads designed for outside corners so that either inside or outside corners can be climbed.

Figure 58:
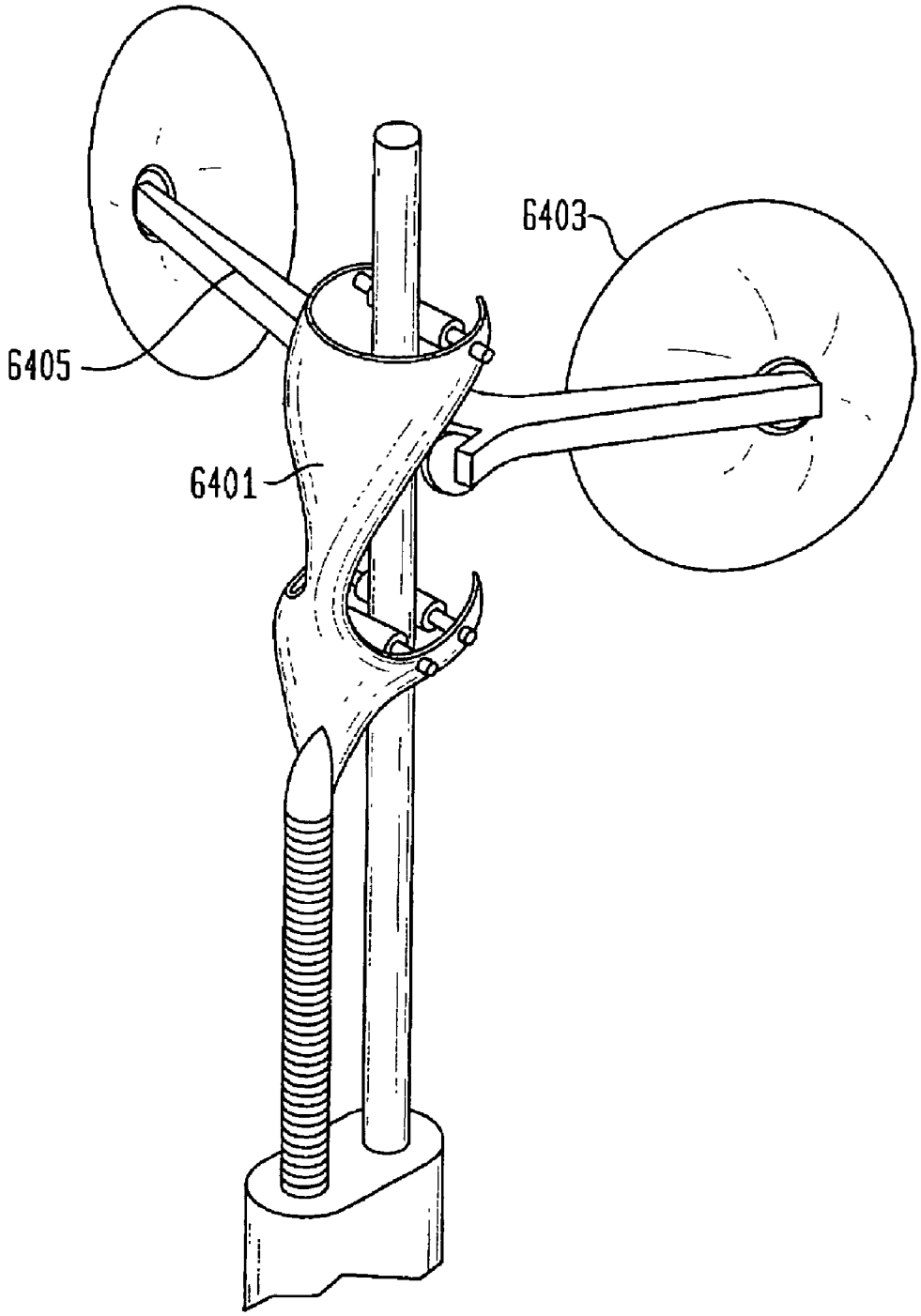
FIG. 58 depicts a long throw inside/outside corner climber in accordance with an alternate embodiment of the present invention.

The conversion to and from outside and inside corner configurations can be achieved automatically. FIG. 58 shows a grip actuator cam configuration that produces a long throw grip that moves through a range that accommodates both inside and outside corners. A similar cam is used on the lower gripper. Cam 6401 of FIG. 58 is curved such that the range of motion is sufficient to handle a wide range of corner angles from inside to outside corners. The basic operation is as previously described. The range of motion of clamp arms 6403 and 6405 is greatly increased. Cam 6401 can be shaped for rapid transition from the range of clamping suited to inside corners to the range of clamping suited to outside corners, or any other desired range, by flattening the cam in the transition region.

There are many other ways of doing this including replacing the clamp links with actuators, using simple triggers that arm or disarm locks for the inside and outside positions (and flat wall positions for climbers that can stick to flat surfaces without the corner.) Self-triggerable ratchets and latches with single actuators can use extremes of motions to drive a ballpoint pin type mechanism for two or three positions inside flat outside and back.

The preferred embodiment is created by installing the long throw grippers and cam system of FIG. 58 with the single actuator robot design previously described and shown in FIGS. 51 through 57. This embodiment allows inside and outside corners to be climbed, and if linked to other robots to form a snake or train, which allows for changing from inside to outside corners and various other climbing maneuvers.

The single actuator outside corner robot of FIG. 51 and converted configuration to make the inside corner robot of FIG. 56 and FIG. 57 provides a single actuator design capable of climbing and/or descending outside or inside corners. Utilizing a single actuator allows a light, small, and simple system. All or some of the concepts described above to climb and descend with a single actuator can be applied to many configurations using many actuation mechanisms. For example, the cams can be rotary cams or conical cams, or the cams can be replaced with linkages or pulley arrangements. The grips can also be made self-actuating by using tilted pivot joints. A similar use of detents and limit stops can be used to make most configurations, such as that of FIG. 31 for example, single actuator drive systems.

In addition to the single actuator system described, an embodiment that utilizes a single (or a few) main actuator(s) and some other actuators to direct the power of the main actuator(s) as desired can be used. Some actuators can be dedicated to specific tasks and others might be shared. For example, inside to outside corner conversion might be controlled with simple actuators on clutches to allow the system of FIG. 57 to convert at will to the required configuration. Of course, one or more actuators can be added or individual actuators can be used to control individual aspects of the motion if desired. In addition to this single actuator design, many of the designs can utilize a single actuator and clutches and/or ratchets to achieve a single actuator design in a different form.

Figure 59:
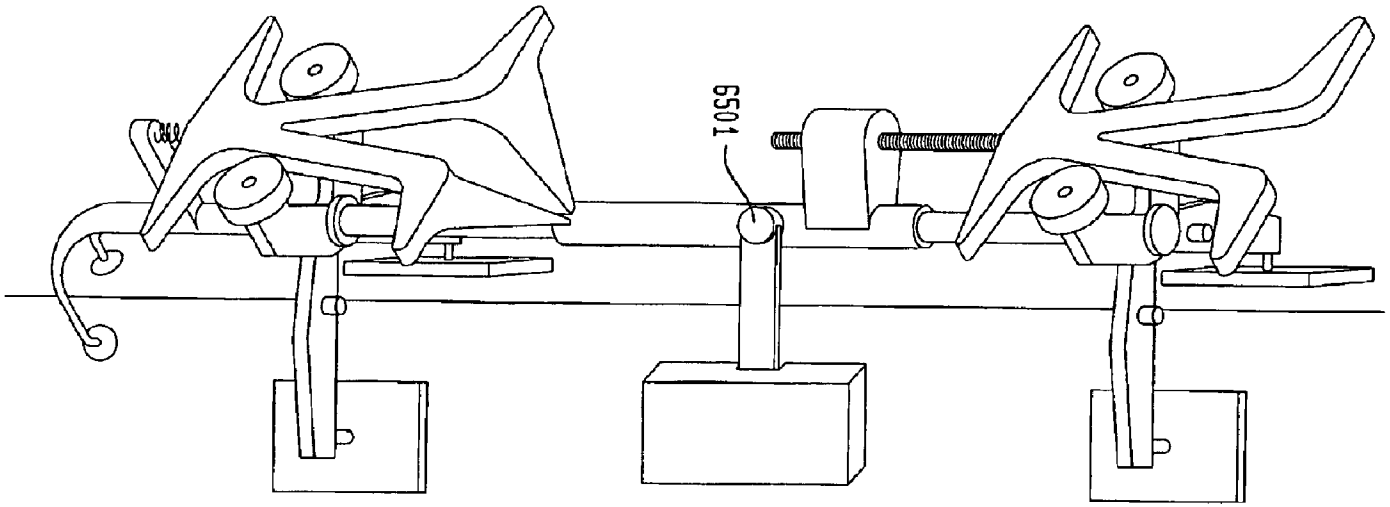
FIG. 59 depicts an alternate embodiment of the corner climber of FIG. 58 wherein the corner climber comprises a swingable payload mounted on a pivot.

The payload and/or actuators can be suspended from points other than the central outer tube. The payload can be made to move instead of and/or in addition to the tail to provide the into-the-corner grip initiation. The payload can be mounted on pivot 6501 as shown in FIG. 59 (or with even more additional degrees of freedom of motion) so that the center of gravity can be shifted as necessary to retain grip.

The detent mechanisms can be replaced by flairs, roughened areas, magnets and/or other features and/or the control of the system can be performed by brake/clutch mechanisms.

Figure 60:
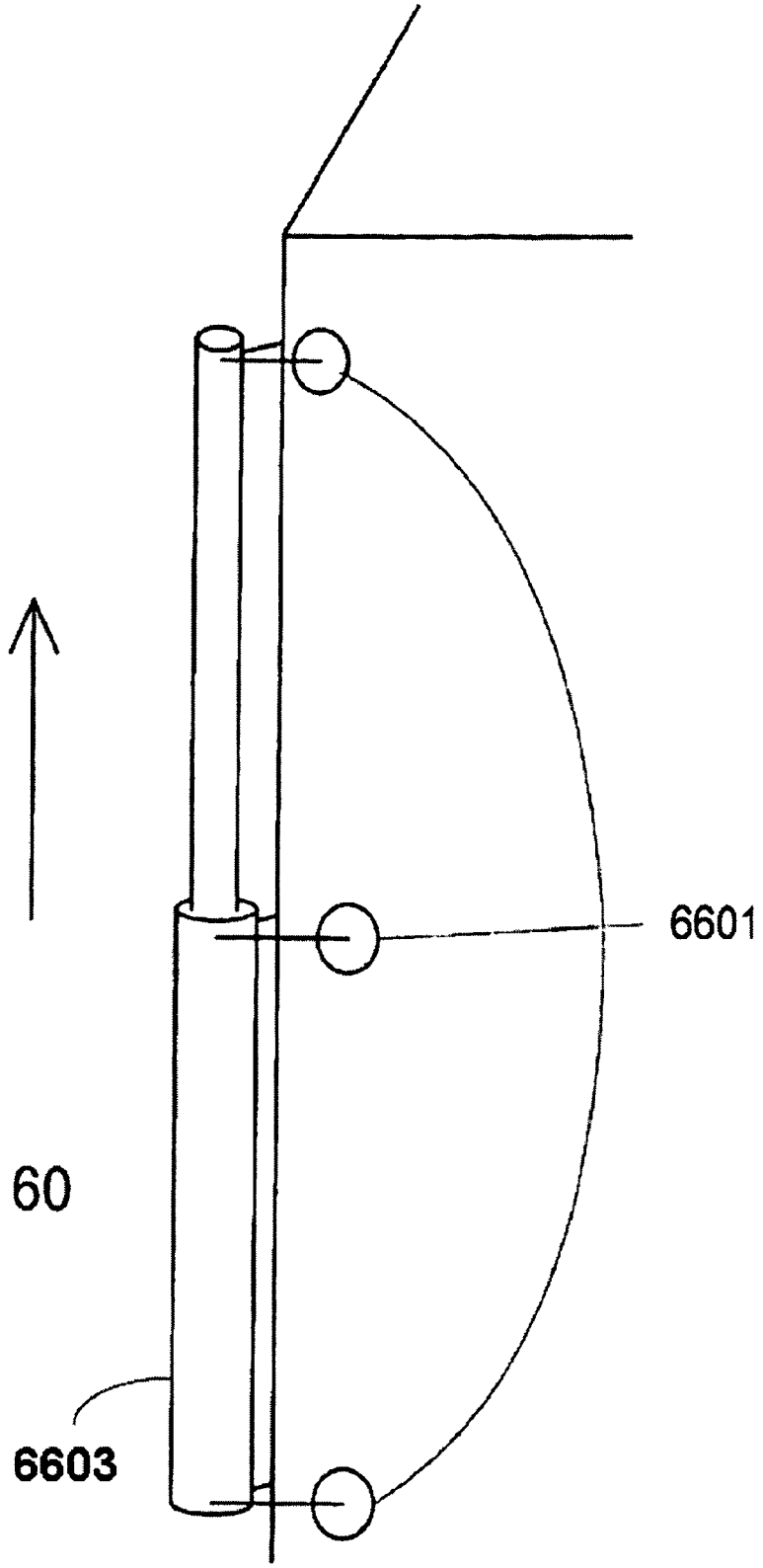
FIG. 60 depicts a three-grip inchworm robot corner climber in accordance with yet another alternative embodiment of the present invention.

Turning next to FIG. 60, shown is an inchworm robot corner climber in accordance with an alternate embodiment of the invention that utilizes three grippers 6601 connected by telescoping pole 6603. (Of course such a system might use features of the previously described system.) With each gripper 6601 movable relative to the other, there are always two grippers 6601 engaged for enhanced ability to grip and maneuver on corners of various angles. Any number of grippers can be combined in this manner. The motion of the grippers can be made to curve as the stroke between grips occurs so that each new grip is made closer to the corner to accommodate creep. It is possible to use more than three grippers and make the system longer or linked together to form a snake-type device.

Figure 61:
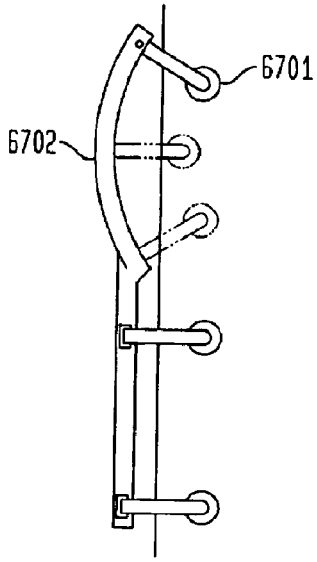
FIG. 61 depicts a curved motion three-pad gripper in accordance with another alternate of the present invention.

Also as shown in FIG. 61, a curved motion three-pad gripper may be used in which upper gripper 6701 is mounted on curved track 6702. While climbing, upper gripper 6701 moves from the midpoint to the upper part of curve 6702 and back. This motion while climbing provides each new grip at a position closer to the corner so that creep can be accommodated. For descent, the lower half of upper gripper 6701 stroke range is used to provide each new grip point closer to the inside of the corner. This configuration can be used in inside or outside corners. Many variations are possible utilizing this configuration such as the use of more than three pads.

Figure 62:
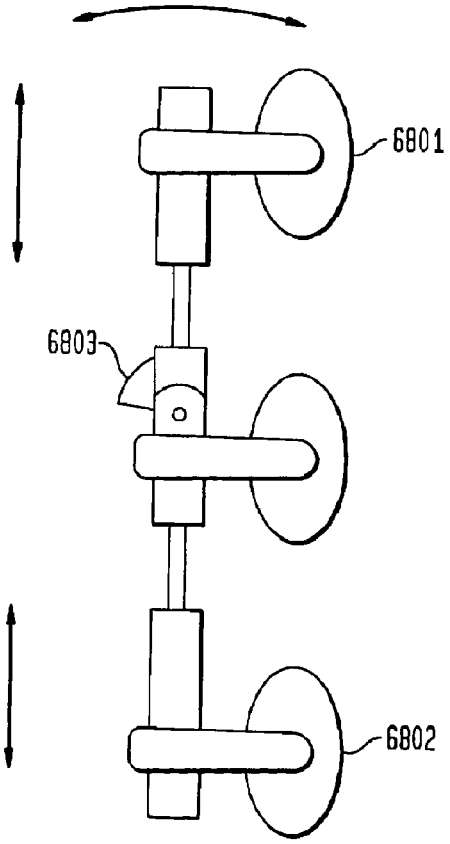
FIG. 62 depicts a three pad hinged inchworm in accordance with another alternate embodiment of the present invention.

Another alternative is illustrated in FIG. 62. Here shown is a version of a three-pad inchworm robot that uses hinge 6803 near the middle to achieve a grip closer to the corner for each new grip. End grippers 6801 and 6802 can move axially on the body. By controlling the axial motion, the gripping motion and hinge 6803, a large range of motion can be achieved. A suitable clamp drive for this embodiment is a spring biased planetary drive in which the output drives one gripper arm and the housing drives the other. There are many variations to this embodiment, including any number of grippers. Adding a rotary joint that allows rotation around the body axis of one grip assembly relative to the other allows transition from wall-wall corners to wall-ceiling corners. A long chain of such inchworms results in a snake. A stiff and/or flexible drive shaft, prismatic gear drive coupling, and ratchet and/or clutch arrangement could then be used to allow one motor to drive several clamp drive mechanisms.

Figure 63:
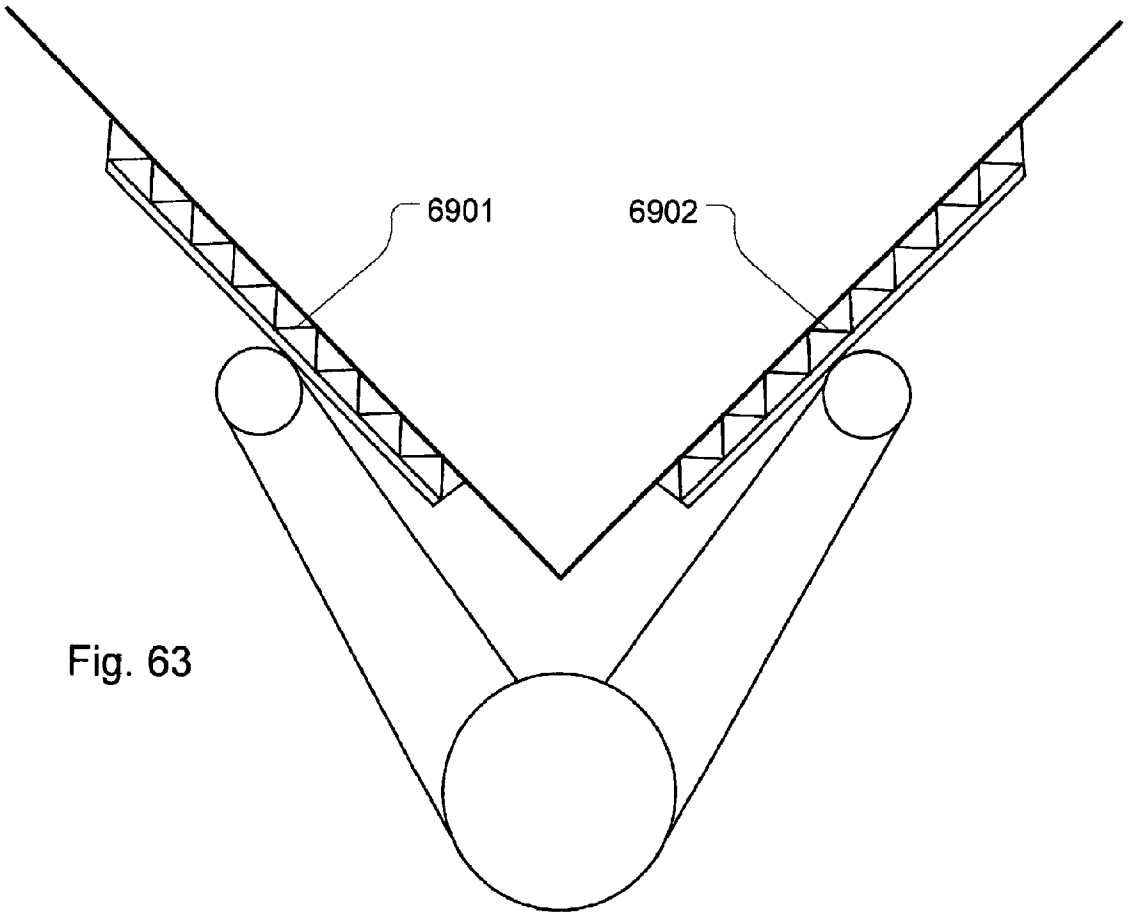
FIG. 63 depicts a top view of a planetary drive outside corner climber according to yet another alternate embodiment of the present invention.
Figure 64:
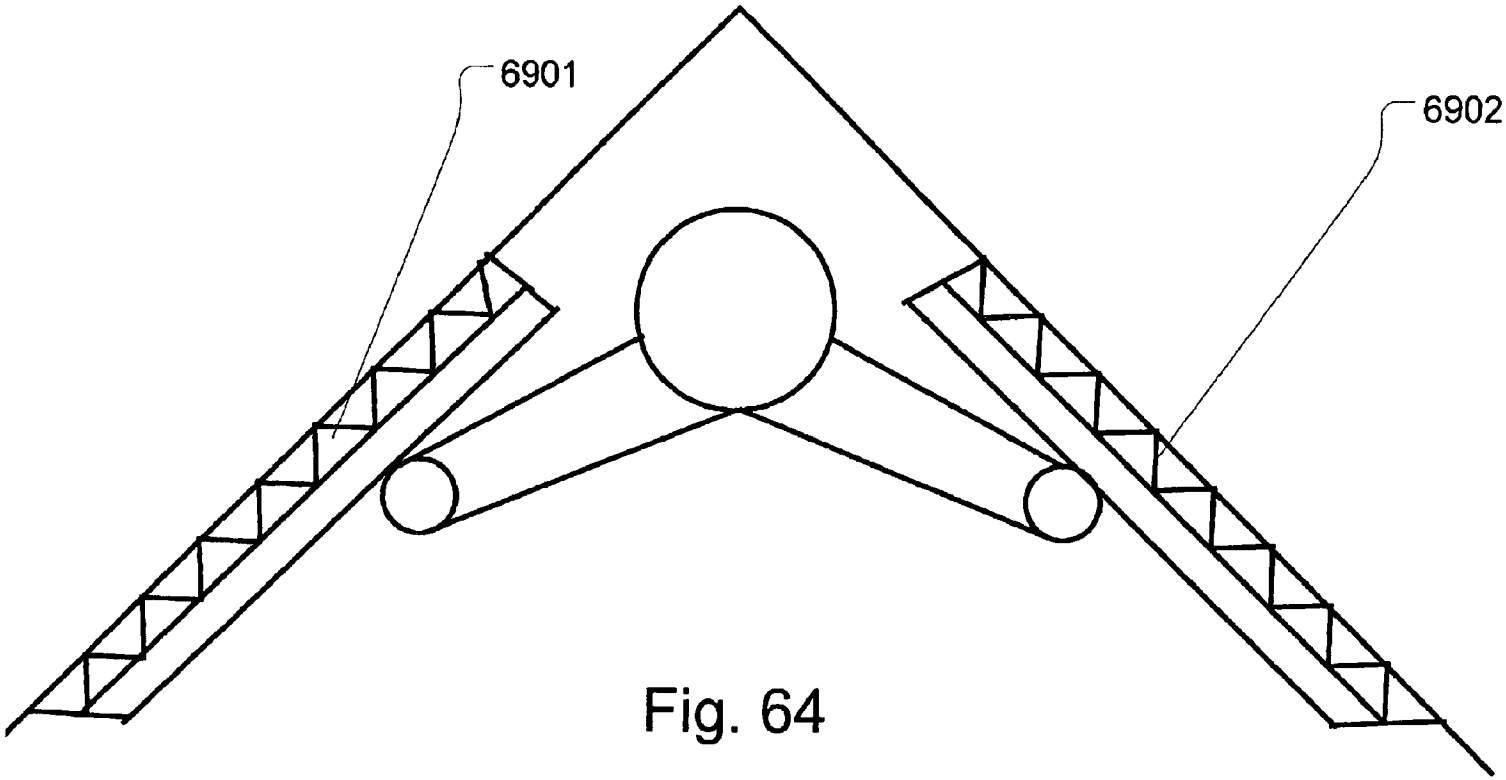
FIG. 64 depicts a top view of the planetary drive corner climber of FIG. 63 as it is reconfigured for use on inside corner.

FIG. 63 shows a gripper easily configurable for an outside corner or an inside corner (the inside corner configuration is shown in FIG. 64). The basic concept is based on always clamping in the same direction. Note that flipping pads 6901 and 6902 to the other side and reversing the clamping torque could provide an alternative way to adjust from outside to inside corners.

Figure 65:
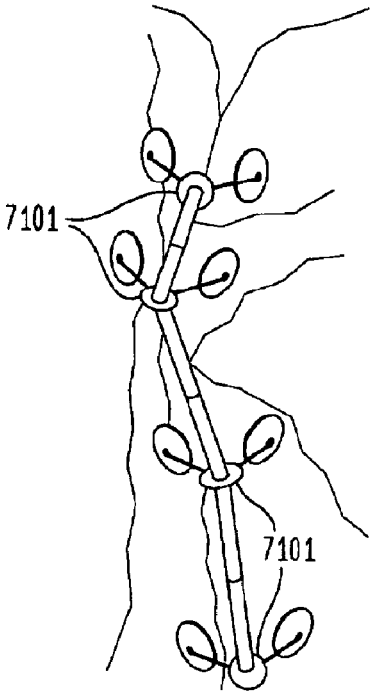
FIG. 65 depicts a snake-like corner climber in accordance with another alternate embodiment of the present invention for use on variable surfaces such as a cliff face.

Adding pivot and/or swivel/rotary joints to a snake configuration, as shown in FIG. 65, produces an embodiment that is capable of accommodating wide and stark variations in the characteristics of the surface to be climbed as well as making transitions from wall to wall to wall to ceiling type corners. A cliff face, as shown in the figure, can require both inside and outside gripping configurations that share no coplanar surfaces and so require many degrees of freedom from to accommodate the surface features. In such terrain, the ability to test each grip for security and to have several engaged grips 7101 for redundancy are features that enhance security of grip.

Figure 66:
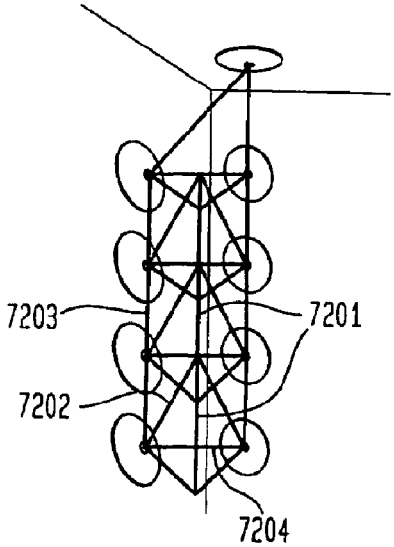
FIG. 66 depicts a truss-based corner climber in accordance with another alternate embodiment of the present invention which is capable of transitioning from wall-to-wall to wall-to-ceiling.

A truss-based climber in transition from wall-to-wall to wall-to-ceiling corners is shown in FIG. 66. The truss-based climber utilizes one or more truss links 7201 that can be extended and/or contracted to provide motion. Diagonal struts 7202 that control rotation and longitudinal struts 7303 that control curvature are provided. Lateral struts 7204 expand and contract to provide clamp force. There are many variations on the truss robot scheme.

For all embodiments, there may be more or fewer grippers, joints, actuators, etc. than described in the embodiments. These embodiments are shown merely for. exemplary purpose and are not intended to limit the scope of the present invention.

Figure 67:
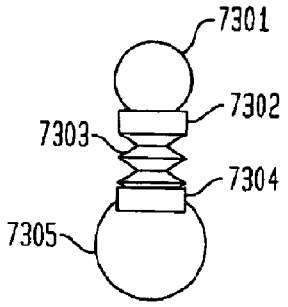
FIG. 67 depicts a pneumatic inside corner climber according to an alternate embodiment of the present invention.
Figure 68:
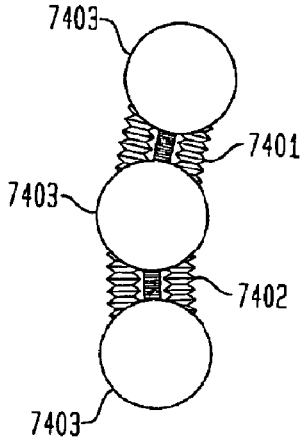
FIG. 68 depicts a pneumatic inside corner climber comprising multiple corner climbers of FIG. 67 to form a snake-like configuration in accordance with an alternate embodiment of the present invention.

A pneumatic inside corner climber robot is, shown in FIG. 67. Upper ball clamp 7301 is attached to a valve and intake module 7302. The valve and intake module 7302 is attached to an extendable bellows 7303, which has a lower valve assembly 7304 at its base. The lower valve assembly 7304 is mounted to a lower pneumatic ball clamp 7305. A power supply and pump are located inside the balls. Flexible control wires inside the system provide power and electrical interconnects for the internal pump, control valves, etc. Upper and lower ball clamps 7301 and 7305 can be inflated independently, as can bellows 7303, with the fluid being taken in and released by the pump through valve assembly 7302 or 7304. By controlling the inflation of balls 7301 and 7305 and extension bellows 7303, the embodiment can be made to climb or descend an inside corner. Upper ball 7301 is smaller than lower ball 7305 so that the top tends to fall into the corner when it is deflated. When lower ball 7305 is deflated, it also tends to fall into the corner because the center of mass is located between the two balls. The pressure vented from a ball to be released can be vented outside or vented to the bellows to retain some of the pressure energy. Optionally, multiple bellows 7401 and 7402 can be used to provide snake like control of position by flexing as shown in FIG. 68. Further, clamping components 7403 need not to be round. Numerous variations, not discussed herein, are also possible using the pneumatic system.

Figure 69:
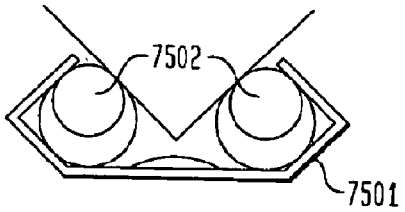
FIG. 69 depicts a top view of a pneumatic outside corner climber in accordance with an alternate embodiment of the present invention.

An outside corner climber can be created using two (or more) of the pneumatic devices of FIG. 67 or 68 in combination with one or more brackets 7501. This is demonstrated in FIG. 69. Tapered bracket 7501 can be combined with friction balls 7502 to provide a self-actuation ramp clamp. In a similar manner, tapered brackets 7501 and flat pad guide bearings (or visa versa) on a structure such as shown in FIG. 69 is another variation of a cam-type clamp system, which can produce a linear actuated clamp. Such a clamp can be configured for inside or outside corners and can be activated by the weight of the body or by a linear actuator. Some means of coordinating the actions of the two pneumatic devices may be required. Such coordination could be by wire, radio, or by sensing of the pressure fluctuations by the forces exerted across the bracket. The bracket has the cross-section shown and can be configured with top and bottom surfaces that have cutouts for the bellows and other features as needed. Using a lower and upper bracket allows the upper and lower actuators to carry the bracket with them as they move. Alternatively, one bracket can be used on both the upper and lower balls. Since one bracket will tend to move down as the device climbs, it may need special shaping (taper) and a low friction surface to allow it to slide up each time the robot moves up.

Figure 70:
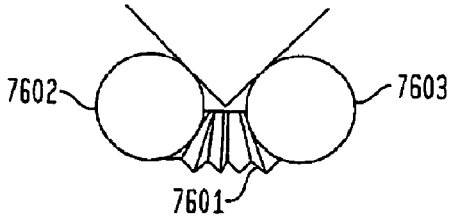
FIG. 70 depicts an inflatable outside corner climber according to an alternate embodiment of the present invention.

FIG. 70 illustrates an alternative inflatable outside corner grip. This embodiment utilizes angular bellows 7601 between grippers 7602 and 7603 that, when inflated, applies a clamping force. Several such grippers can be attached with bellows devices, previously described, to make climbers and truss structures.

Figure 71:
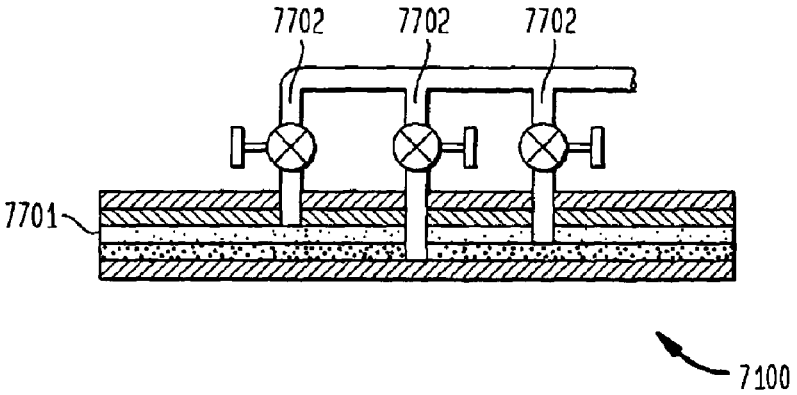
FIG. 71 depicts a pneumatic peel ply gripping pad for use with the present invention.

Grips may need a means of being replaced or cleaned while climbing. This might be done using peelable layers 7701 as depicted in the embodiment shown in FIG. 71. Specifically, grip pad 7100 contains several layers 7701 of grip material. Layers 7701 can be blown off one at a time by pressurizing the appropriate channel of channels 7702. Different layers 7701 may be made of different materials to best match to the available contact surface could be achieved. Grip enhancing and/or surface cleaning or treatment material could be put on the wall or grip through outlet ports or spray nozzles. Adhesives could be injected for station holding and the pad surface could be blown off, or an adhesive release agent injected to free the pad for climbing. Alternative embodiments might include peel plies that are mechanically peeled off a layer at a time or a roller system that rotates new material over the pad when needed. Such a system can also incorporate different materials so that the best match to the surface could be achieved or so that the material could be cleaned by some integrated cleaning system.

Figure 72:
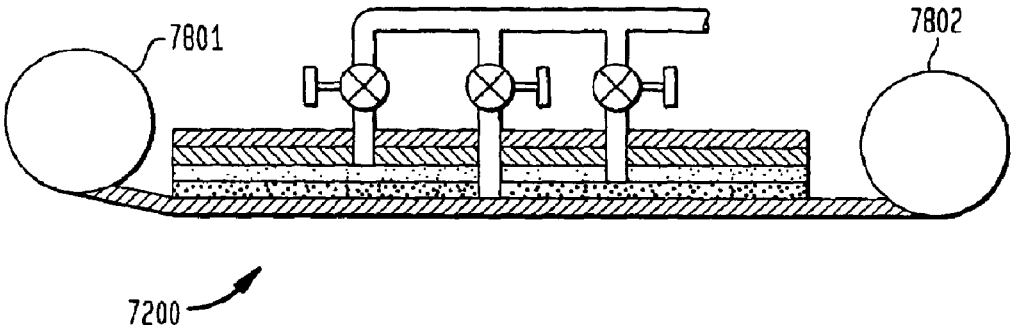
FIG. 72 depicts a film roller surface replenisher for use with the pneumatic peel ply gripping pad of FIG. 71.

Rolling system 7200 with rollers 7801 and 7802, as shown in FIG. 72, can also be used in combination with an adhesive to move around on surfaces where there is not a corner available. For instance, a peelable adhesive like that used on Post-It® notes could be applied to grip pads. The rolling action could be used to provide fresh high friction material or to allow the device to travel. Many of the grip materials described adhere very well to themselves, so it is likely that no adhesive is required for some layering systems. A rolling film type grip surface system might utilize a liquid injection to allow the high friction or adhesive part of the grip to be released for cleaning and/or repositioning. A grip pad base that has high friction with the grip material and several layers of grip material can likely be applied without loss of performance since the wall-to-grip interface generally has the lowest friction. There are numerous variations on pads, pad modifying and/or wall cleaning, adhesive, and/or surface modifying systems which can be used in accordance with the invention.

Figure 73:
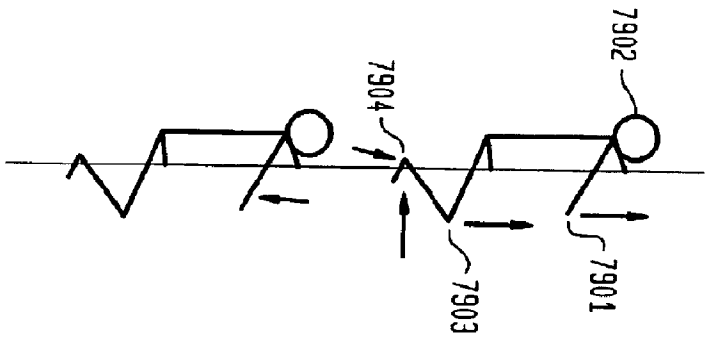
FIG. 73 is a schematic representation of an anthropomorphic corner climber according to another alternate embodiment of the present invention.

A schematic representation of an outside corner climber is shown in FIG. 73, and is configured to resemble a person. There are many ways to implement such a climber. Joint locations and motions similar to a human's can be used in combination with a gripping technique to provide a climber. An example is to use hands 7901 gripping and shoulder joints 7902 for climbing motions. Knees 7903 are used as lower grippers and feet 7904 for leverage to maintain position when the hands are released. The arc motion of the arms provides the ability to pull into the corner at the end of each stroke and, by reaching straight out, grip into the corner on each stroke. Similar motions will work on inside corners as well.

There are numerous variations on this theme. For example, the legs can be moved for climbing instead of, or in addition to, the arms. Inside corners could be climbed using a device similar to that shown in FIG. 73 with the elbows bent across the body so that the same pinching motion of the shoulders clamps out against the inside corner walls. Similarly the knees might be bent to let the feet press on the wall. A three-grip position in which the leg and/or arm opposite the leg and arm contacting the other wall of a corner is placed at a height between the other grip points is also stable. Alternating arm and leg motions, similar to crawling, based on this stable position are a very stable and natural looking means of gripping and climbing. It is also worth noting at this point that the primary limitation to a human putting on a suit or pads of high friction material and climbing using the techniques outlined in this patent is limited primarily by the inability of the average human to generate high enough clamp forces for the existing friction materials. Some one specially trained and/or high enough friction materials can allow such direct climbing by humans. Similarly, exoskeleton assist systems may one day have adequate force and control capability to enable adequate forces to allow direct climbing based on the present invention. These capabilities, are included in the present invention. There are many configurations of anthropomorphic climbers that may or may not use motions similar to a human's capability. A suitable mechanism might utilize a battery and motor or a hand-wound spring motor and actuator as a power supply to create a toy.

Figure 74:
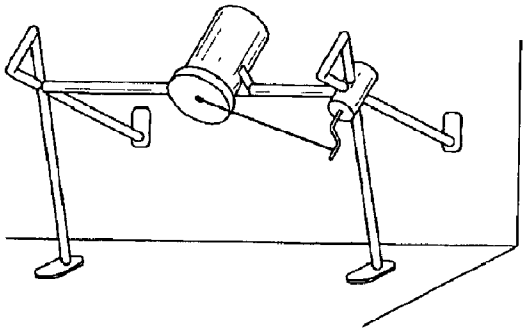
FIG. 74 depicts the basic mechanism for the anthropomorphic climber of FIG. 73.

FIG. 74 illustrates a basic mechanism for the anthromorphic climber of FIG. 73. Combining this configuration with the unclamp and clamp control of the single actuator robot previously described, or a similar system, could provide a suitable toy. A toy may also have no need for the ability to descend which could further simplify the system. Optionally, the power source could be a wind up spring for such a toy.

Figure 75:
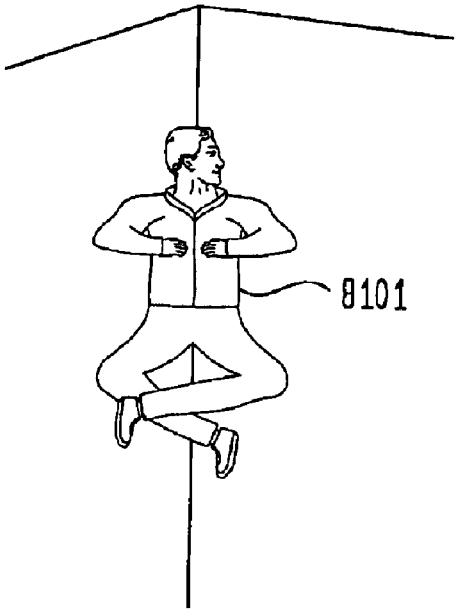
FIG. 75 depicts a perspective view of one configuration of a human anthropomorphic climber in an inside corner.
Figure 76:
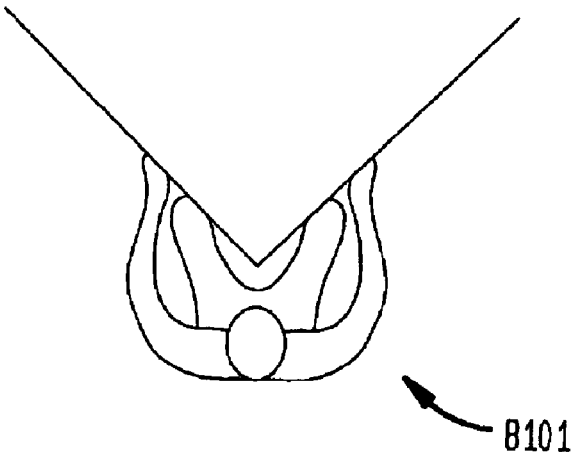
FIG. 76 depicts a top view of one configuration of a human anthropomorphic climber on an outside corner.

Looking next at FIG. 75, shown is one of many positions for clamping and climbing an inside corner for human shape 8101 while FIG. 76 shows one of many positions for clamping and climbing an outside corner for human shape 8101. In addition to making climbers based on these and/or other anthropomorphic positions, there are other creatures, monsters, machines, etc. that can be configured for corner climbing. The configurations shown in the figures could be made static or reconfigurable. For example, molded plastic action figures that can cling to, bounce up, down, off of and/or stick to and drop off of inside and/or outside corners would make low cost toys. Some of the materials are capable of clinging to flat surfaces, so that such figures can be made to cling to flat walls.

Figure 77:
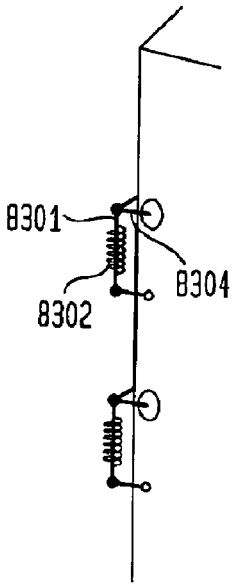
FIG. 77 depicts a "spring jumper" corner climber according to yet another alternate embodiment of the present invention.

FIG. 77 illustrates another concept for a corner climbing system that jumps up the wall. Weight is mounted on spring 8301 on rod 8302 forming the body. Rod 8302 may be tilted and/or curved toward the wall and arms 8304 are configured such that an upward motion of the body releases the grip and a downward motion reengages the grip. Spring 8301 is stretched and the weight released. The weight springs upwards and hits a stop so that the system jumps up and towards the wall where it regrips the corner and the process is repeated. Such a system can be driven by any of a number of motor types or chemical systems such as a gas generator. An example suitable for toys might be caps (as used for cap guns) or a combination and water and Alka-Seltzer® which generates gas.

Figure 78:
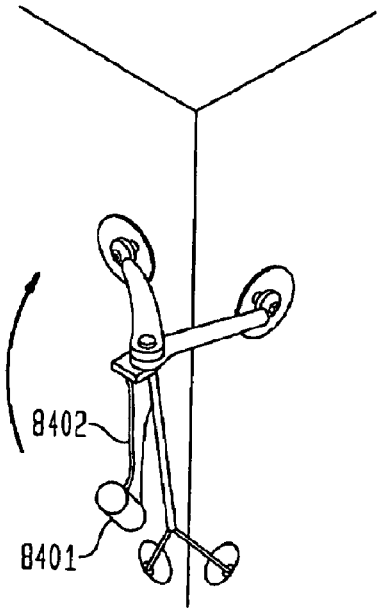
FIG. 78 depicts a "swinging weight" jumping robot corner climber in accordance with yet another alternate embodiment of the present invention.

Yet, another embodiment of the jumping climber is shown in FIG. 78A. This embodiment is based on the motion of swinging weight 8401. Like. the embodiment of FIG. 77, the climber jumps up the wall. In this case, the weight is mounted on arm 8402. The start and end points of the weight control the manner of the jump. A link to arm 8402 can be coupled to the clamp system to time the grip and release to match the timing of the jump. Such actions may be achieved by using the forces produced as the weight moves. Actuation of either of these embodiments can be manual, which can be very suitable for an inexpensive toy, or driven by some actuator and energy storage/supply system.

Figure 79A:
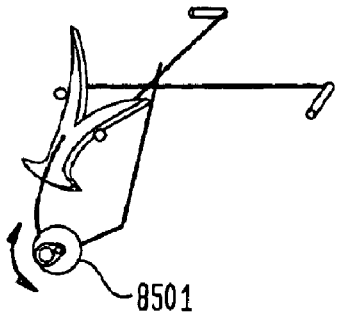
FIGS. 79A-B depict a vibrating jump corner climber according to still another alternate embodiment of the present invention.
Figure 79B:
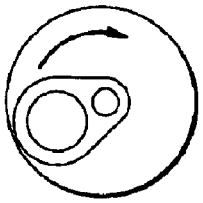

Another embodiment, which is based on a vibratory jumper, is shown in FIGS. 79A-B. Oscillatory motion source 8501 is attached to a grip engagement systems, similar to the cams in FIG. 51, so that the device pulls down, releases, and regrips higher. A toy, for example, will have a cam based grip controller and a spring wound eccentric weight vibrator coupled so that the desired effect is achieved.

Figure 80:
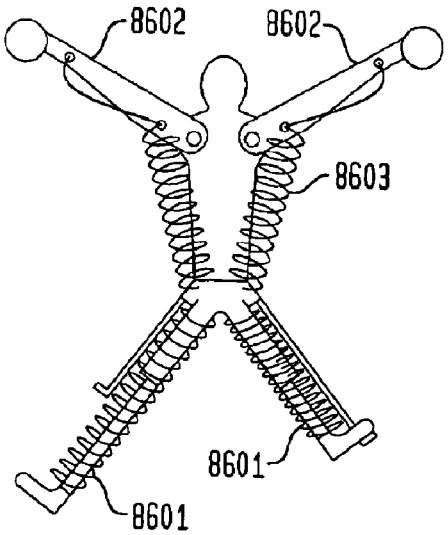
FIG. 80 depicts a spring-loaded anthropomorphic jumper corner climber in accordance with another alternate embodiment of the present invention.
Figure 81A:
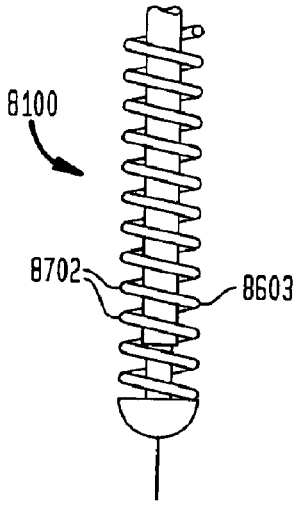
FIG. 81 depicts a detailed representation of a telescoping spring appendage and trigger mechanism of the corner climber of FIG. 80.
Figure 81B:
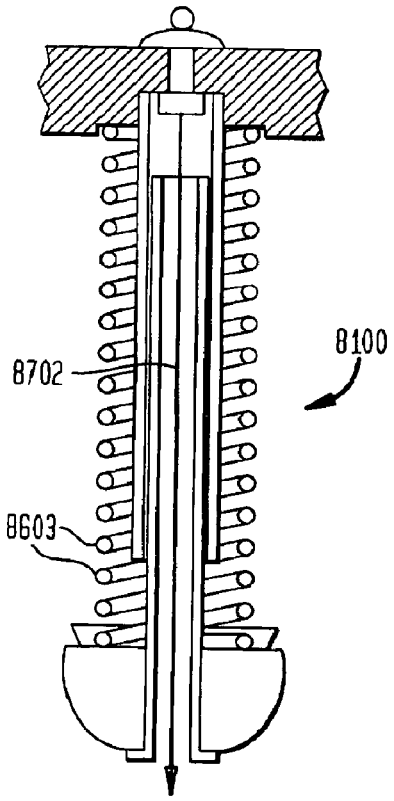
Figure 82:
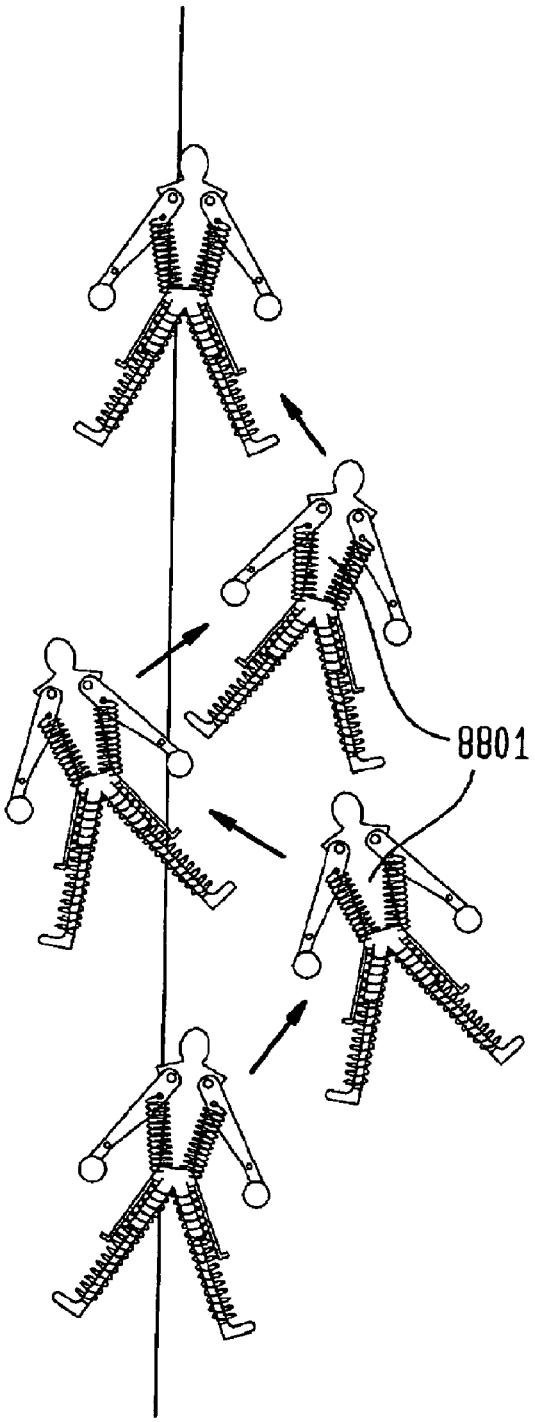
FIG. 82 depicts the path of the anthropomorphic jumper corner climber of FIG. 80 as it climbs an inside corner.

Turning now to FIG. 80, shown is a spring loaded an anthropomorphic jumping inside corner climber. This embodiment jumps diagonally across an inside corner from side to side and upwards using spring loaded legs 8601 and/or arms 8602. One way to operate this embodiment is to toss it at the corner so that it bounces off. Properly thrown, it will bounce off and go up the corner. Adding latches and triggers, springs 8603 can be pre-compressed so that when the foot or arm hits the wall, the trigger releases spring-loaded legs 8601 or arms 8602. Shown in FIGS. 81A-B is the detail of an embodiment of telescoping spring appendage 8100 and trigger mechanism. Spring 8603 and telescoping tubes 8702 are shown. The approximate jumping behavior of a spring-loaded anthropomorphic jumper (as shown in FIG. 80) with spring appendages 8100 is shown in FIG. 82. It is plausible that the jumper 8801 can end its bouncing by lodging in the corner, making such embodiments promising as a toy and/or means of competitive play. Anthropomorphic jumpers may utilize one or any combination of the joint of the human body and/or, like the embodiment of FIG. 82, may use modes of motion that are not natural extensions of human motion.

Figure 83:
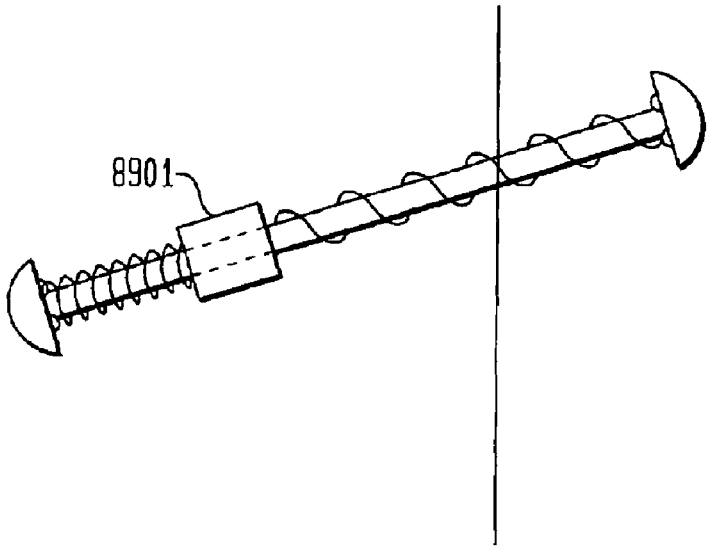
FIG. 83 depicts a "pogo stick" corner climber in accordance with another alternate embodiment of the present invention.
Figure 84:
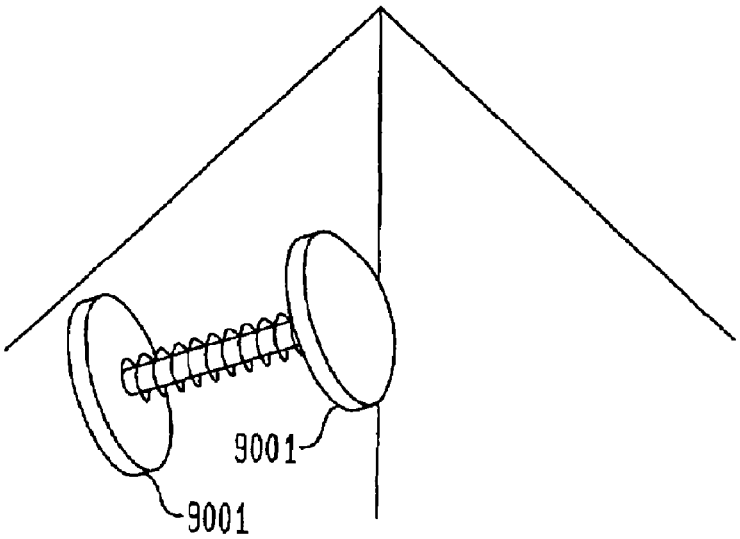
FIG. 84 depicts a wheeled bouncer corner climber in accordance with another alternate embodiment of the present invention.
Figure 85:
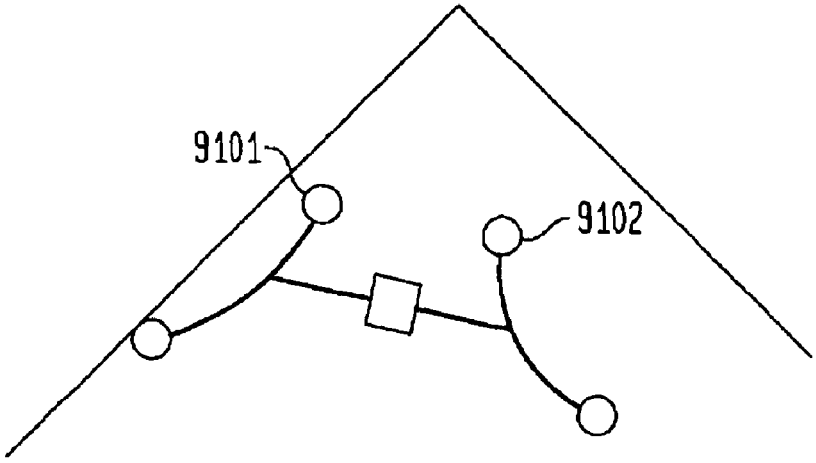
FIG. 85 depicts a stabilized inside bouncer corner climber configuration according to another embodiment of the present invention.
Figure 86:
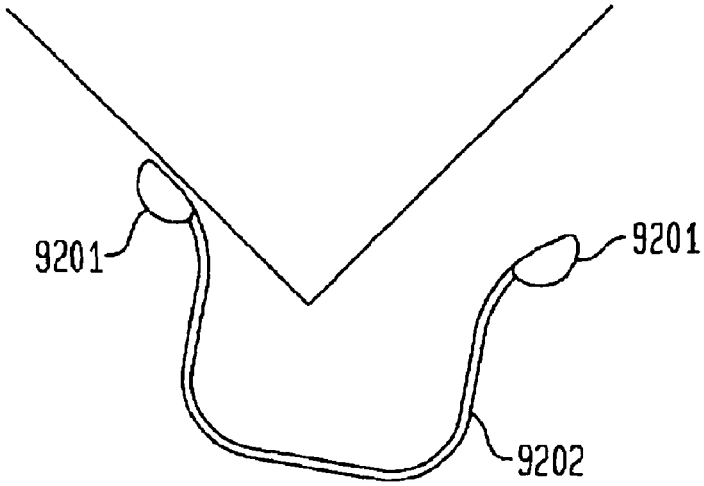
FIG. 86 depicts an outside bouncer corner climber configuration according to another alternate embodiment of the present invention.
Figure 87:
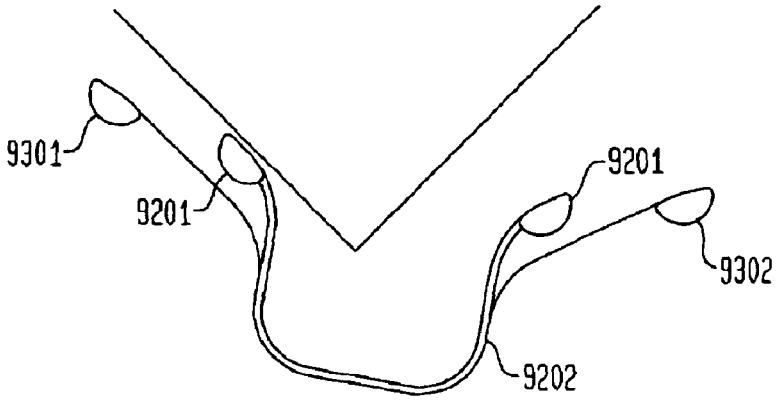
FIG. 87 depicts an outside bouncer corner climber configuration according to another alternate embodiment of the present invention with multiple pads and/or weighting.

Still another corner climber embodiment is shown in FIG. 83. Here, bouncing pogo stick 8901 is shown as a simple climber that will bounce between the walls of an inside corner. Similarly, FIG. 84 wheel shaped ends 9001 may also be used for such a "bouncing" inside corner climber. Optionally, a stabilized configuration that bounces inside corners may be used as shown in FIG. 85. This embodiment includes two pairs of pad 9101 and 9102 to provide extra stability. FIG. 86 shows the possibility of an outside corner-bouncing embodiment with pads 9201 and frame 9202. The addition of more pads 9301 and 9302 and features to the embodiment of FIG. 86, as shown in FIG. 87, that shift the center of gravity closer to the corner allow some control of the dynamics of the bounce to meet behavior objectives of the system.

A corner jumper could be made primarily of an elastic material and bounced off the walls. Such embodiments can be molded at low cost. For instance, many of the high friction polymer materials could be molded into a device that could be bounced between walls of a corner. Even a simple ball or faceted ball like embodiment of high friction material would make an entertaining toy. Controlling the distribution of mass (density) and/or elasticity and or friction characteristics can produce different dynamic behaviors. There are many alternative configurations of the corner jumpers including something as simple as the pogo stick with bouncing weight shown in FIG. 83 or as complex as an actuated system with a power supply and control system.

Figure 88A:
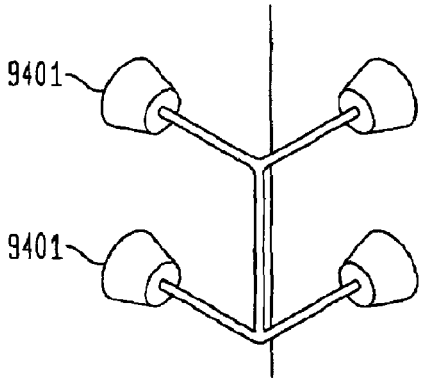
FIG. 88A depicts a wheeled outside corner climber according to another alternate embodiment of the present invention.
Figure 88B:
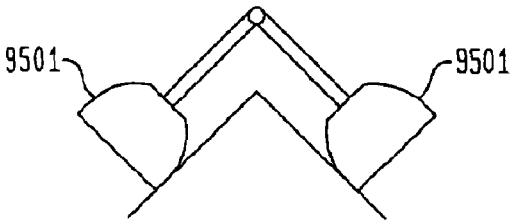
FIG. 88B depicts a top view of the wheeled outside corner climber of FIG. 88A.
Figure 89:
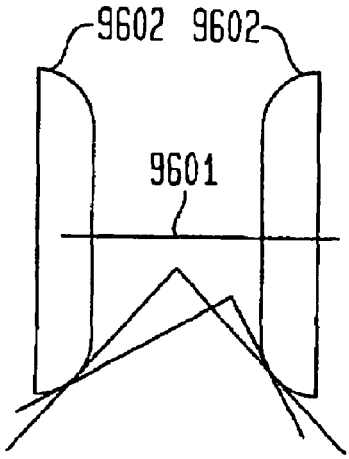
FIG. 89 depicts a single axle crowned wheel corner climber according to another alternate embodiment of the present invention.
Figure 90:
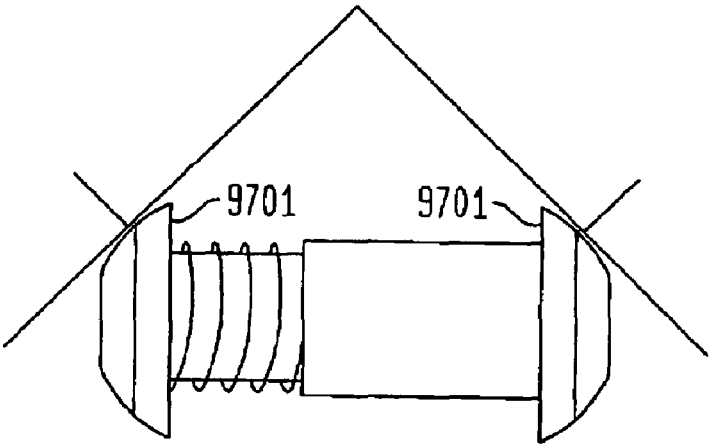
FIG. 90 depicts a top view of a single axle inside corner climber according to an alternate embodiment of the present invention.

Another outside corner climber embodiment is shown in FIGS. 88A-B. An outside corner climber robot shown uses wheeled grippers 9401 so that it can roll in the corner. Wheel grippers 9401 can be steered to maintain position and stability. Such steering can be automated using guides that track the corner and/or wheels can be crowned so that they automatically follow the corner. Steering can be by controlling wheel angle and/or using differential drive. The feature of crowned wheels can be used alone or in addition to steering methods. FIG. 88B, a top view of the climber of 88A, shows crowned wheel grippers 9501 and the change in the wheel radius as the angle in the corner is changed. If both wheel grippers 9501 are driven through a similar angular rotation, the difference in radius causes the wheel gripper with the larger radius to move further than the other. This can be used to realign the device in the corner. FIG. 89 shows modified version of a crowned wheeled system in which the wheel grippers 9602 are mounted on axle 9601. For an outside corner, as shown, wheel grippers 9602 must be large enough to provide the required clearance for axle 9601. For an inside corner implementation, as shown in of FIG. 90, wheel grippers 9701 can be smaller.

Figure 91:
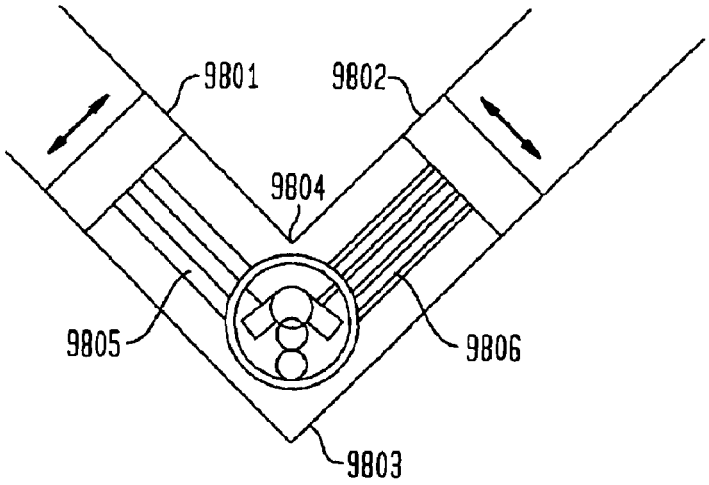
FIG. 91 depicts an angle-wheeled robot corner climber in accordance with another alternate embodiment of the present invention for use on inside or outside corners.
Figure 92:
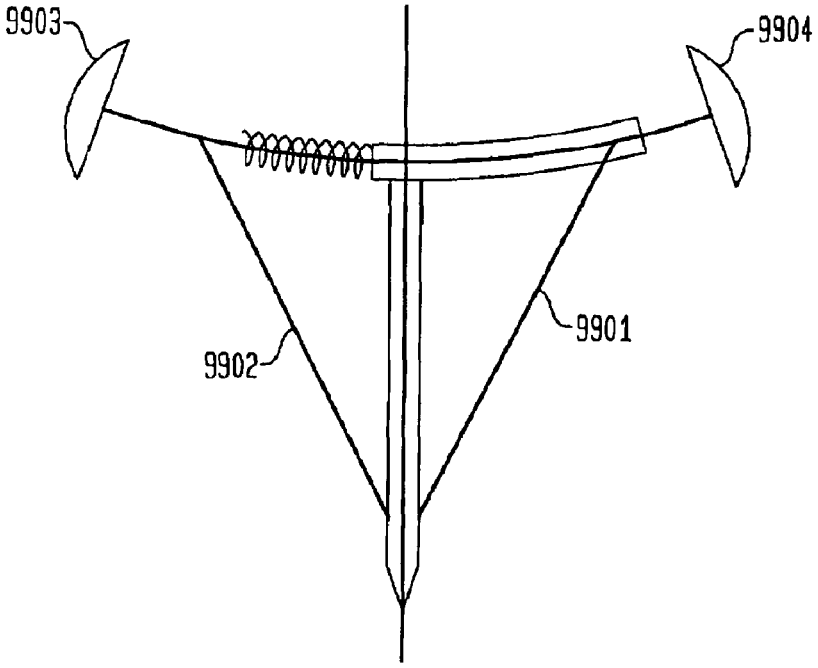
FIG. 92 depicts a corner climber in accordance with another alternate embodiment of the present invention with a flexible axle bracket control.

Alternatively, use of angled axles, as shown in FIG. 91, can provide inside corner 9803 device and/or outside corner 9804 device. In this embodiment, wheel grippers 9801 and 9802 can be crowned symmetrically so that they may work in inside or on outside corners without being modified. Also, axles can be spring-loaded to squeeze the corner. The angle of the axles 9805 and 9806 can be adjusted so that the wheels drive into the corner to load the clamp action on the wheel grippers 9801 and 9802. FIG. 92 depicts a corner climber embodiment having flexible angle bracket control. Angle brackets 9901 and 9902 are exaggerated in the figure for ease of visualization. The corner climber embodiment of FIG. 92 is configured for an inside corner. Note that as wheel grippers 9903 and 9904 roll to climb the wall, they will also pull the device towards the center of the corner. This embodiment also has crowned wheel grippers 9903 and 9904 to maintain a symmetric grip in the corner.

In addition to driving the wheels in a conventional manner, wheeled-systems can utilize oscillatory, vibratory, and/or impulse drives in combination with ratchets on the wheels to produce useful motion. An example is to replace the pads on an inchworm robot with ratcheted and/or clutched wheels to produce a robot that never has to release its grip from the surface to move.

Figure 93A:
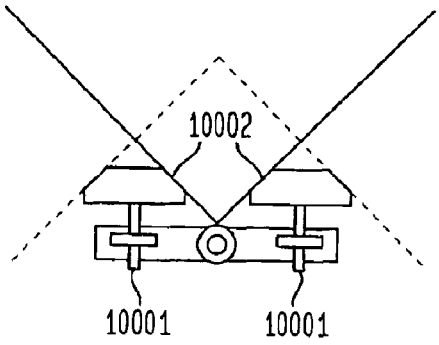
FIG. 93A shows top view of a wheeled corner climber according to another alternate embodiment of the present invention in which the wheel axles are mounted parallel to each other.
Figure 93B:
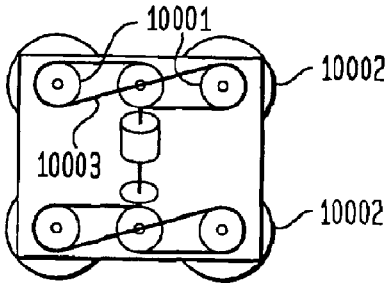
FIG. 93B shows a side view of the wheeled corner climber of FIG. 93A.

Referring next to FIGS. 93A and 93B, shown are top and side views of a wheeled corner-climbing embodiment in which axles 10001 are mounted parallel to each other. In this embodiment, wheel grippers 10002 are driven by belt drives 10003. The wheel grippers 10002 can be made from discrete gripping elements and arms, as could the wheel grippers 10002 for any of the embodiments.

Figure 94:
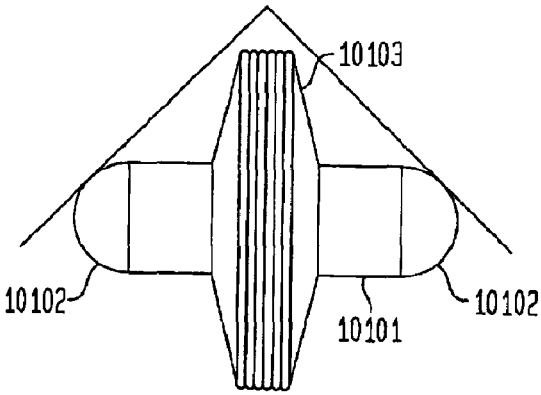
FIG. 94 depicts a reverse yo-yo configuration inside corner climber according to another alternate embodiment of the present invention.

Yet another simple inside corner climber embodiment is shown in FIG. 94. Shown is a reverse yo-yo inside corner climber. This embodiment utilizes spring-loaded axle 10101 with crowned wheel grippers 10102. Disk 10103 approximately at the center of the axle can be rotated to move up or down the corner. If disk 10103 is wrapped with a string, then pulling the string can drive wheels grippers 10102. If the center of contact points of wheels grippers 10102 is outside the string, pulling down on the string can drive the wheels up. A light device can be combined with a weight to make a device that climbs up when the weight is released. A similar arrangement can be configured for an outside corner by using one or more drive disks outside of the wheels. The drive disk system can be replaced by a transmission that provides a gear ratio so that pulling down on a string can drive the wheel or car up. This concept can also be used for any climber. An advantage of such a system is that the user can place the device in a corner and, by pulling down on a string, cause the climber to climb up. This can provide a very inexpensive and lightweight climber that might be made to climb and then maintain position and/or glue or otherwise attach a device. The climbing mechanism could be left in place, climb down, lower itself from the attachment point, or just drop with wings, propeller, parachute, or streamer to slow the fall if desired. Application of this configuration might be suited to mounting surveillance equipment for example, or for a simple toy.

Figure 95A:
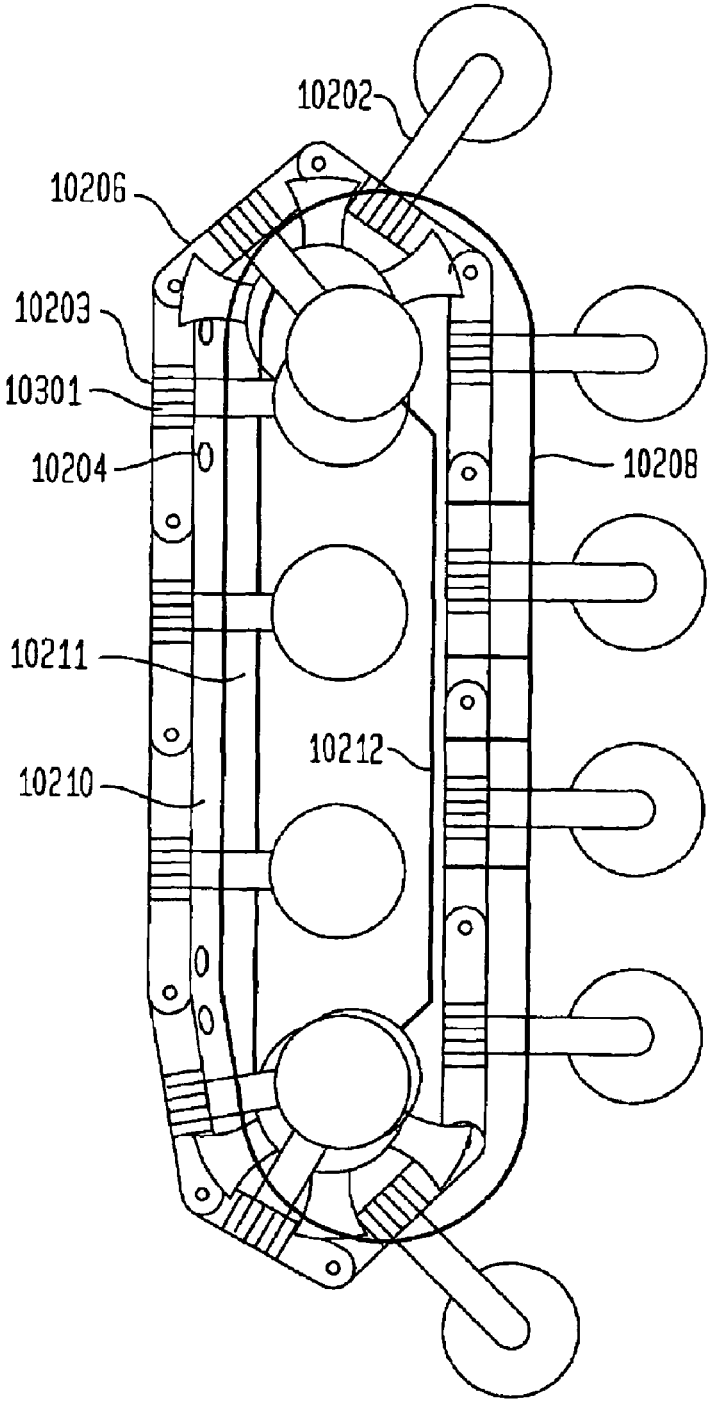
FIG. 95A depicts a side view of a "centipede" corner climber according to another alternate embodiment of the present invention.
Figure 95B:
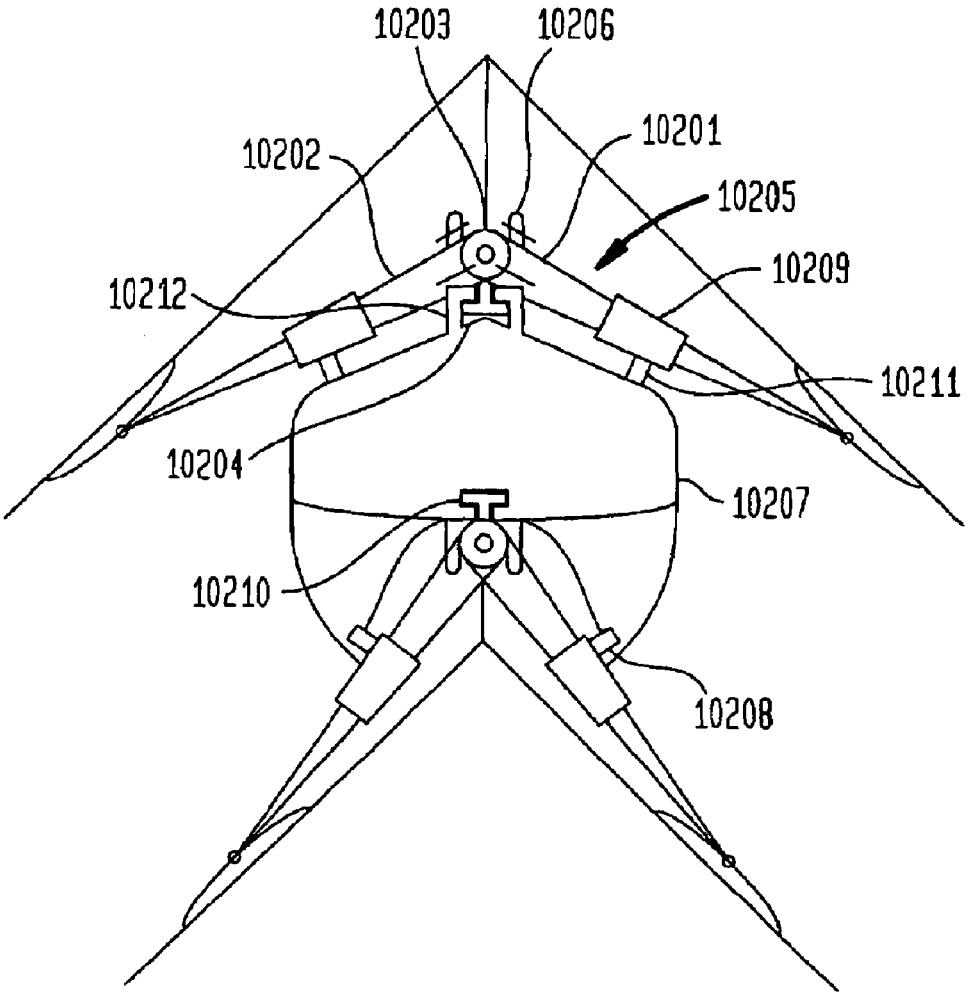
FIG. 95B depicts a top view of the "centipede" corner climber of FIG. 95A.

A centipede-like corner climber embodiment is depicted in FIGS. 95A-B which incorporates a plurality of grippers mounted on backbone-like track. FIG. 95B shows a cross-sectional view across the middle of FIG. 95A. Right and left clamp arm 10201 and 10202 (with pads) are mounted to pivot 10203 that is mounted on a backbone vertebra with T-sliders 10204 to form caterpillar clamp assembly 10205. The vertebrae are connected like links in a chain. The resulting backbone chain is driven and guided by a pair of sprocket pulleys 10206. Each pulley 10206 is mounted on an axle (not visible) that is mounted on body 10207 that supports the axles. Inside corner clamp track 10208 and outside corner clamp track 10211 are mounted to the body and connected by a transition clamp track. The clamp tracks press on roller assembly 10209 mounted on each arm. The backbone links are supported by outside corner backbone guide slide 10210 and inside corner guide slide 10212.

The centipede climber of FIGS. 95A-B grip inside corners with the grippers on the topside in FIG. 95B and with grippers on the left side in FIG. 95A. The centipede climber grips outside corners with grippers on the bottom side in FIG. 95B and with grippers on the right side in FIG. 95A. The centipede is operated by driving sprocket pulley 10206, which rotates the backbone assembly around pulley 10206 and backbone support in a manner similar to a chainsaw drive. The clamp arm assemblies are mounted to the backbone, so that they move. As the assembly moves, clamp tracks 10208 and 10211 guide the clamp arms while backbone 10210 and 10212 travels along T-slider 10204. The pressure of the clamp tracks causes the grippers to grip if there is a corner on one side. The grippers on the other side, with no corner to grip, move freely guided by the clamp track and the backbone guide slide. As the grippers move towards the end of the centipede, the clamp track moves further from the corner so that the grip arms move away from the wall. Grip return springs 10301 open the grips so that they continue to follow the track around the transition clamp track section, around the end of the sprocket and onto the clamp track on the other side. In the transition section the grips are flipped into position to grip on the other side. For the configuration shown, which is designed to grip inside corners on one side and outside corners on the other side, the grips on the left for the inside corner are lifted to allow the turning grips to pass just below before they are flipped to the outside corner position by the transition track.

The clamp tracks press the grip against the wall when the grip is in-line with the other grips and wall. For the embodiment shown in FIG. 95A, there are two grippers on the left side that would be engaging the inside corner on the left side, and the grippers outside those two have been lifted to allow the grippers on the sprocket to clear. On the right side, which is for outside corners, there are four grippers that engage the wall.

There are many variations in the centipede embodiment. For example, the centipede can be made longer to provide more grippers in contact with the wall. The tracks can engage sliders on the grip arms so that the torque required to grip can be applied without using the backbone support and T features. The clamp tracks can be adjustable. The track can be sprung and/or the arms can be sprung or flexible to allow conformance and creep accommodation. Although the embodiment previously shown is for inside corners on one side and outside corners for the other, alternatives include outside only, inside only, and reconfigurable configurations. Several centipedes can be put together to form a snake. A more snake-like snake can be made from the centipede by making a flex-body and flex-spine.

Figure 96A:
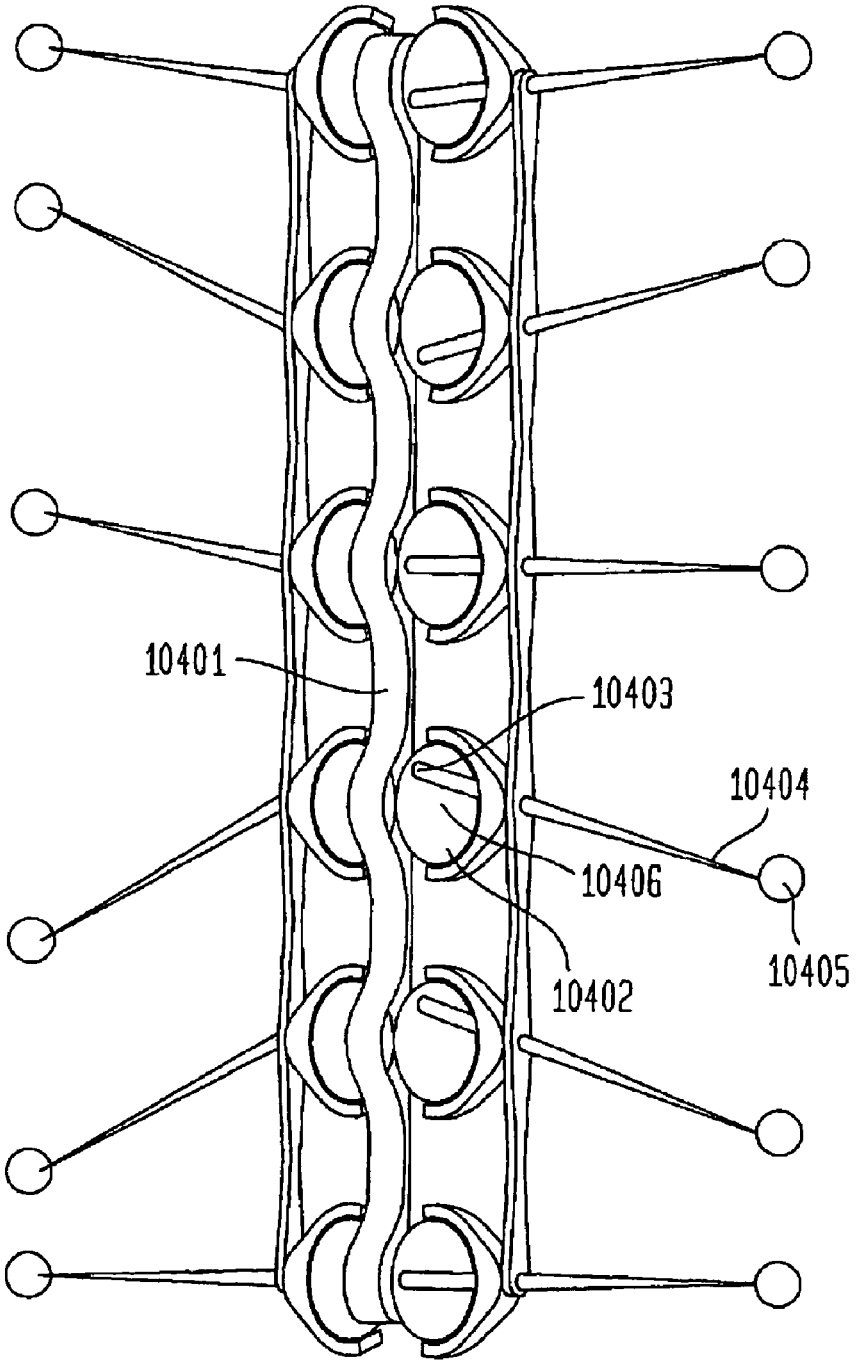
FIG. 96A depicts a side view of a "multilegged caterpillar" configuration corner climber according to another alternate embodiment of the present invention.
Figure 96B:
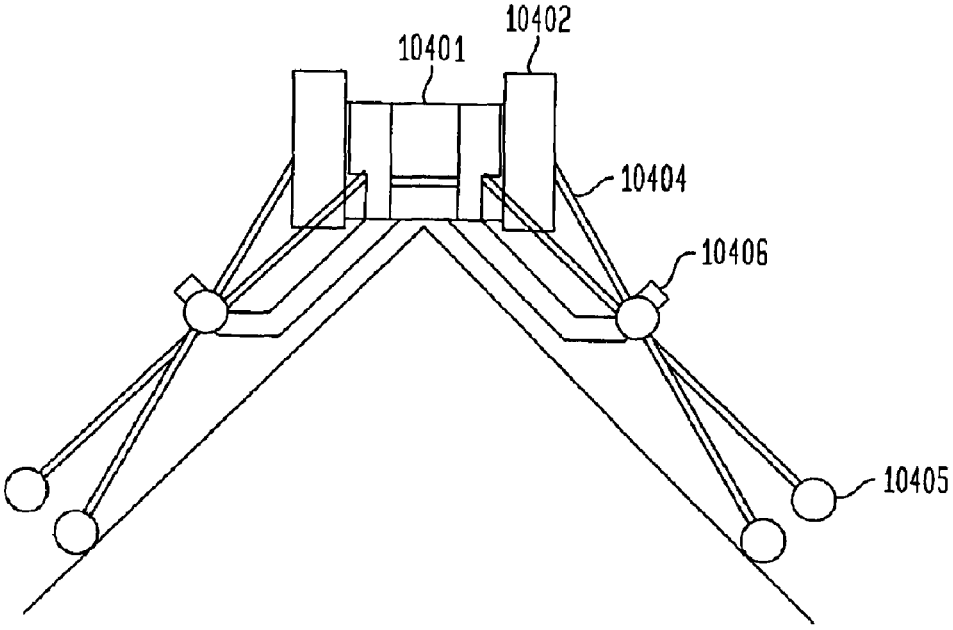
FIG. 96B depicts a top view "multilegged caterpillar" configuration of FIG. 96A.
Figure 97:
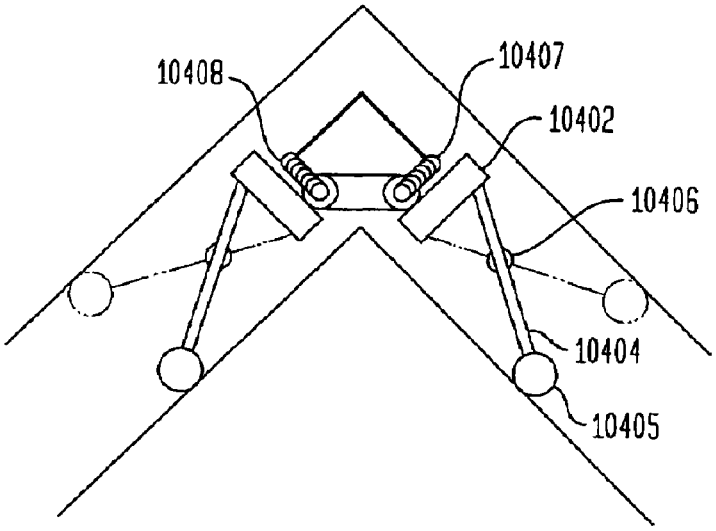
FIG. 97 depicts a top view of a dual-legged worm drive configuration corner climber according to another alternate embodiment of the present invention.

Another centipede embodiment utilizes legs that move much like a centipede. The legs clamp and pull, release and move ahead, clamp and move back, over and over again like a centipede to climb a corner. An embodiment with this configuration is shown in FIG. 96A. In FIG. 96A, belt drive 10401 rotates wheel 10402 with hole 10403 near the edge. The end of leg 10404 is driven by hole 10403 and is mounted like an oar through a non-rotating ball joint oarlock 10406. The far ends of the oars have the grip pads 10405 mounted on them and grip the walls. FIG. 96B shows an end view of one embodiment of this type of centipede with a belt drive 10401, wheels 10402, holes 10403, ball joints 10406, and grip pads 10405. FIG. 97 shows a dual worm drive version of a similar embodiment comprising two belt drives 10407 and 10408, which can work on inside and outside corners. In these configurations, there is intentional flex in the oars 10404 and/or the oar drive, and/or the oar supports to allow the grips 10405 to be sprung against the wall to allow for creep. The axis can be skewed to modify the gripper path. Adding a cam feature allows the path of the grippers 10405 to be controlled and can allow the oars 10404 to be pulled in and out in a favorable manner during the stroke. There are many variations of this type of embodiment including the creation of a snake. The leg motion of this type of embodiment is even more like the actual motion of a centipede with the legs moving in a wave-like manner.

Figure 98A:
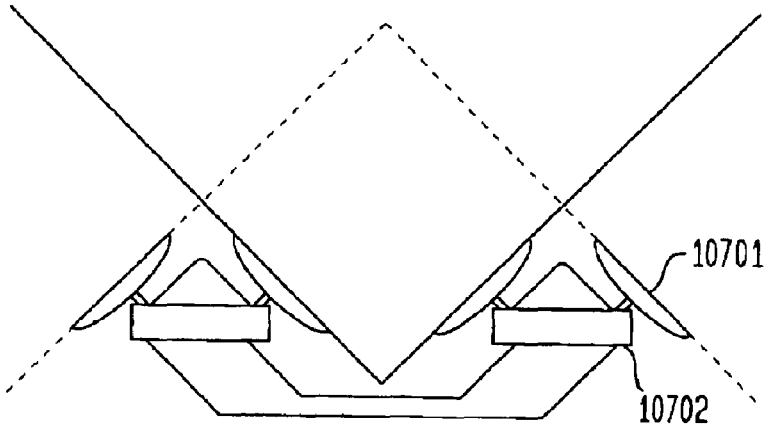
FIG. 98A depicts a top view of a belt-mounted multilegged configuration corner climber according to another alternate embodiment of the present invention.
Figure 98B:
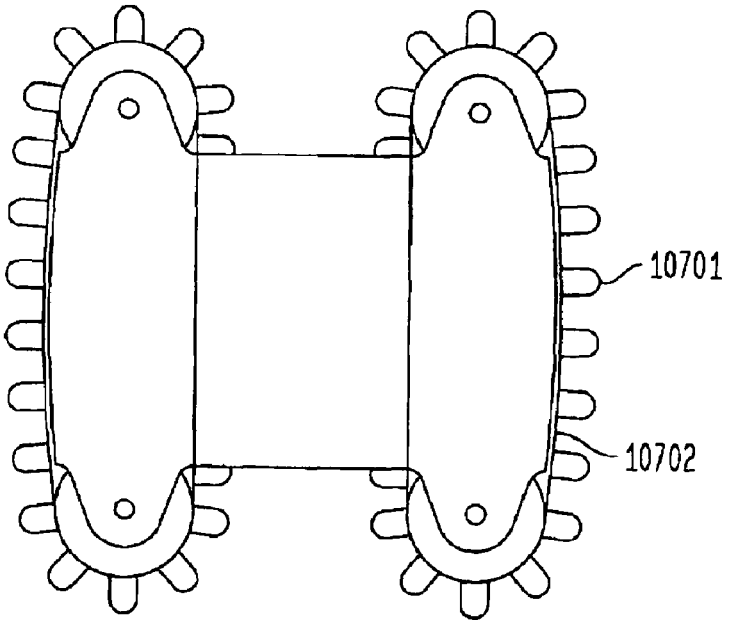
FIG. 98B depicts a side view of the corner climber of FIG. 98A.

Another embodiment related to the multilegged gripper configuration, but more like a tank track system utilizes belt mounted and driven grippers 10701 as shown in FIGS. 98A-B. There are many variations on the belt mounted gripper embodiment including other orientations of belt 10702 and cam surfaces that drive belt 10702 and grippers 10701 into gripping positions as belt 10702 moves along the vehicle.

Figure 99A:
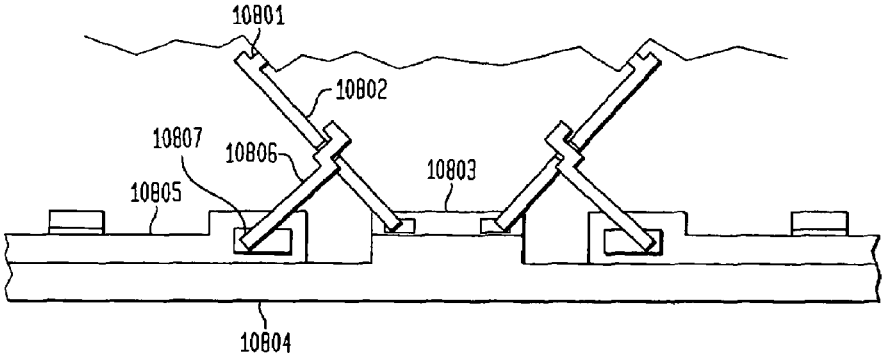
FIG. 99A depicts a Micro Electro Mechanical Systems (MEMS) corner climber clamp assembly according to another alternate embodiment of the present invention.
Figure 99B:
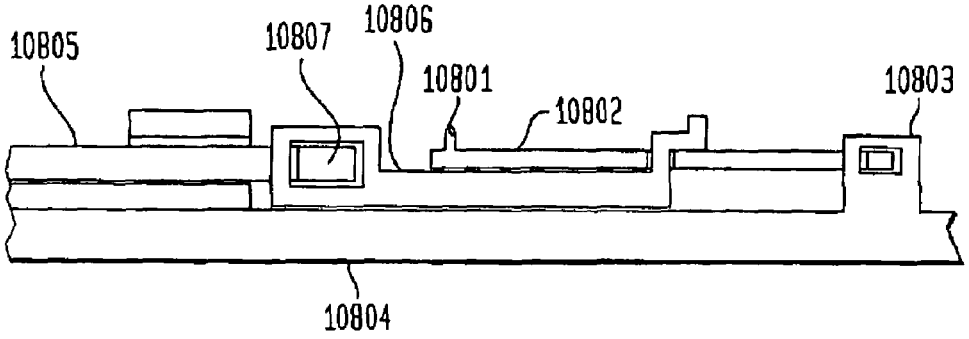
FIG. 99B depicts the MEMS corner climber clamp assembly of FIG. 99A in a folded position.

Still another alternative corner climber according to the invention incorporates Micro Electro Mechanical System (MEMS). A MEMS corner gripper and/or climber can grip many flat surfaces due to the surface roughness, which provides a multitude of corner-like features to grip as well as micro scale grip mechanisms. FIGS. 99A-B show an embodiment for a MEMS gripper. Grip feature 10801 is at the end of grip lever 10802, which is hinged on hinge pad 10803, which is mounted on substrate 10804. MEMS motor output 10805 is attached to clamp push arm 10806 by drive hinge 10807. The clamp push arm 10806 acts on clamp arm 10802 through clamp push hinge 10807. The components identified and described are for left arm 10802, although the right arm is configured in a similar (mirrored) arrangement, as shown. The MEMS components described are shown in a folded position, in FIG. 99A, while they lay nearly flat in FIG. 99B.

Operation of the MEMS clamp occurs by driving motor output 10805 to compress clamp push arm 10806, which pushes clamp arm 10802 to clamp on the surface. Conversely, driving motor output 10805 to produce a pulling force on clamp push arm 10806 unclamps arm 10802 from the surface. Mounting several such clamps and substrates on a larger substrate (or making them on a larger substrate) with linear actuator motors between the clamps provides a means of moving the clamps. Alternatively, many clamps mounted on a single substrate makes a device which can be made to move by having one or more clamps engaged and moving both the right and left clamp arms in the same direction. This motion translates the device. Then another gripper or group of grippers can engage the wall and the previously engaged grippers can be released. The process can be repeated as required to move the device. Having several sets of grippers at various angles on the substrate also allows steering of the device.

The corner climbers described herein can be utilized for many tasks in many ways. If a task is to place and/or hold a payload at a given location, then it is not necessary that the climber take the payload as it climbs. Instead, the climber can leave the payload behind while it climbs, and then hoist it up after it reaches a target position. In this manner, the climber can be smaller, lighter, and/or faster. Once the robot is in position, then it can use all available grip power (or glue itself in place) to hold while the payload lifts itself up (by a wince in the payload for example), or is raised. Note that many of the climber embodiments release and move grips to climb, so when there is no need to climb, substantially more grips can be engaged. The payload may include the batteries for example. In that case, wires or other power transmission means allows substantial sized batteries to be used to climb because the battery weight can be left behind during the climb. It is also possible that the payload could be lifted and secured and the battery left behind, and/or that the robot can climb or jump back down once the payload is secured in place. Thus, the robot could be reused. There are many ways to implement and utilize a climbing system according to the invention, especially since the basic gripping and holding action requires little power.

Much of the discussion to this point has been described in terms of adhesion to one or more surfaces and/or friction based on contact of two grippers. It is noted here that the invention also applies to multiple surfaces and grippers. The use of paired grippers made description simpler and is often the simplest embodiment, but the three/four point grip described for anthropomorphic climbers or any other grip arrangement is part of the present invention. Multiple grips on multiple surfaces, on the wall/wall/ceiling surfaces for a three surface example, are also feasible.

Many of the embodiments described herein utilize springs as energy storage systems and cams as force amplifiers. There are many alternatives for these actuators. Springs may be based on solid or gas springs. Gas generators or charges such as bullet shells can be used for power. TiNiAl alloy or a similar a shape memory alloy can be used in combination with a temperature changing system to provide an actuator. Plastic shape memory alloys and artificial muscles are currently under development and promise additional and possibly lower cost actuators. A spring clamp with actuator retraction system is suited for the shape memory alloy or artificial muscle actuator. Batteries are currently one of the more convenient electric power storage/source options. Fuel cells are becoming more practical as a power source and may be used. Nuclear powered generators of heat and/or electricity could be used in some applications. Engines of various types can be used and photocells could be used to provide a power source.

Any number of linkages such as those used for Vice Grips™, locking pliers, force multiplying pliers, pruning shears, hedge trimmers, and the like can be used to amplify (or de-amplify if desired) actuator force for the clamping system. Pneumatics and hydraulics may also be utilized. Pulleys and purchase arrangements are also convenient for achieving force amplification in some applications.

Most of the concepts of any of the embodiments presented can be applied to any other embodiment in whole or in part. Designs can be coupled to each other to create snake-like trains of systems/couplings with controllable joints allow transitions from one type of corner to one at another angle and/or of another type. There is no limitation on how large or small the invention can be. Very small versions might be made light enough to climb flat walls without corners since some materials are able to stick to a surface if the force pulling away is small. The possibility of climbing free of the corner is also enabled by suction cups or application of adhesives, or if you can climb faster than it slips, then a slipping traction may be adequate. Adhesive technologies such as Post it Notes™ type adhesives with and/or without backing would allow grippers to hold on flat surfaces.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. An apparatus for securely engaging a surface through the application of friction comprising:

a first friction pad comprising a first contact surface and a first backing structure, wherein said first backing structure stabilizes said first contact surface, and wherein said first friction pad is coupled to a first pivot arm;

a second friction pad comprising a second contact surface and a second backing structure, wherein said second backing structure stabilizes said second contact surface, and wherein said second contact surface comprises [said] *a* high friction grip material, and wherein said second friction pad is connected to a second pivot arm;

an outer member comprising a first cavity, a first open end, and a second closed end coupled to said first friction pad through said first pivot arm;

an inner member comprising a second cavity, a third open end, and a fourth closed end coupled to said second friction pad through said second pivot arm, wherein said inner member partially resides within said first cavity of said outer member to provide a first clamping force, wherein said inner member and said outer member each reside on a common longitudinal axis, and wherein said first friction pad is diametrically opposed to said second friction pad and each of said first friction pad and said second friction pad reside on said common longitudinal axis;

a control device for activating said outer member and said inner member to provide said first clamping force; and means for retracting said outer member towards said inner member when said control device is not activated, wherein said control device comprises a plurality of first and second pulley assemblies coupled with a pulley line for controlling movement of said outer and inner members.

2. An apparatus according to claim 1, wherein said first contact surface is attached to said first backing structure in an airtight manner, and further wherein said second contact surface is attached to said second backing surface in an airtight manner.

3. An apparatus according to claim 1, wherein each of said first and said second contact surface comprises a smooth surface.

4. An apparatus according to claim 1, wherein each of said first and said second contact surface comprises surface structures selected from the group consisting of ribs, strips, bumps, and ridges.

5. An apparatus according to claim 1, wherein each of said first and said second friction pad is hollow.

6. An apparatus according to claim 1, wherein each of said first and said second friction pad is in the shape of a boomerang.

7. An apparatus according to claim 1, wherein [said] at least one [friction pad] of said first and said second friction pads is convex.

8. An apparatus according to claim 1, wherein [said] at least one [friction pad] of said first and said second friction pads is concave.

9. An apparatus according to claim 1, wherein [said] at least one [friction pad] of said first and said second friction pads is pliable.

10. An apparatus according to claim 1, wherein [said] at least one [friction pad] of said first and said second friction pads is filled with a substance selected from the group consisting of gases, liquids, foams, gels, structured components, suspension components, and phase change materials.

11. An apparatus according to claim 1, wherein [said] at least one [friction pad] of said first and said second friction pads comprises one or more airtight components.

12. An apparatus according to claim 1, wherein [said] at least one [friction pad] of said first and said second friction pads has a leading edge and trailing edge.

13. An apparatus according to claim 12, wherein said leading edge is longer than said trailing edge.

14. An apparatus according to claim 1, wherein [said] at least one [friction pad] of said first and said second friction pads comprises a series of concentric rings.

15. An apparatus according to claim 1, wherein [said] at least one [friction pad] of said first and said second friction pads comprises a material selected from the group consisting of polyester composite PVC compound, a thermoplastic elastomer, rubber and cyanoacrilate.

16. An apparatus according to claim 1, wherein [said] at least one [friction pad] of said first and said second friction pads comprises a lubricator.

17. An apparatus according to claim 1, wherein [said] at least one [friction pad] of said first and said second friction pads comprises one or more suction cups.

18. An apparatus according to claim 1, wherein [said] at least one [friction pad] of said first and said second friction pads comprises means for providing suction.

19. An apparatus according to claim 1, wherein [said] at least one [friction pad] of said first and said second friction pads comprises a material having a coefficient of friction approximately equal to one.

20. An apparatus according to claim 1, wherein [said] at least one [friction pad] of said first and said second friction pads comprises a material having a coefficient of friction greater than one.

21. An apparatus according to claim 1, wherein an effective center of rotation of said first or second pivot arm is below [said] at least one *of said first and said second* friction [pad] *pads*.

22. An apparatus according to claim 1, wherein circular rotation of [said] at least one [friction pad] of said first and said second friction pads is permitted.

23. An apparatus according to claim 1, wherein circular rotation of [said] at least one [friction pad] of said first and said second friction pads is prohibited.

* * * * *